(12) United States Patent
Schneider

(10) Patent No.: US 11,995,710 B2
(45) Date of Patent: May 28, 2024

(54) MULTIPLE REGION PRICE CHART DISPLAY SYSTEM, METHOD, AND DEVICE

(71) Applicant: Eric Schneider, Delray Beach, FL (US)

(72) Inventor: Eric Schneider, Delray Beach, FL (US)

( * ) Notice: Subject to any disclaimer, the term of this patent is extended or adjusted under 35 U.S.C. 154(b) by 160 days.

(21) Appl. No.: 17/941,398

(22) Filed: Sep. 9, 2022

(65) Prior Publication Data

US 2023/0147658 A1 May 11, 2023

Related U.S. Application Data

(60) Division of application No. 17/352,294, filed on Jun. 19, 2021, now Pat. No. 11,494,834, and a continuation-in-part of application No. 17/351,929, filed on Jun. 18, 2021, now Pat. No. 11,526,941, and a continuation-in-part of application No. 17/342,573, filed on Jun. 9, 2021, now Pat. No. 11,488,216, and a continuation-in-part of application No. 17/338,260, filed on Jun. 3, 2021, now Pat. No. 11,481,820, and a continuation-in-part of application No. 16/937,949, (Continued)

(51) Int. Cl.
*G06Q 30/08* (2012.01)
*G06T 11/20* (2006.01)
*G06Q 30/0204* (2023.01)
*G06Q 30/0283* (2023.01)

(52) U.S. Cl.
CPC ............ *G06Q 30/08* (2013.01); *G06T 11/206* (2013.01); *G06Q 30/0205* (2013.01); *G06Q 30/0284* (2013.01)

(58) Field of Classification Search
CPC ............... G06Q 30/08; G06Q 30/0205; G06Q 30/0284; G06Q 30/0201; G06Q 30/0206; G06Q 30/0283; G06Q 40/04; G06Q 40/06; G06T 11/206; G06F 16/26
See application file for complete search history.

(56) References Cited

U.S. PATENT DOCUMENTS 6,272,474 B1  8/2001 Garcia
7,043,449 B1  5/2006 Li et al.
(Continued)

OTHER PUBLICATIONS

International Search Report dated Nov. 9, 2021 in International Application No. PCT/US2021/046590.
(Continued)

*Primary Examiner* — Ryan R Yang

(57) ABSTRACT

A method for displaying a price chart, the price chart including a plurality of regions includes displaying, by a charting engine, a first region including one or more historical completed price-range-over-time-range-type symbols, displaying, by the charting engine, a second region adjacent to the first region, the second region including a current uncompleted price range-over-an-uncompleted-time-range-type symbol corresponding to an uncompleted time range, and in response to determining that the uncompleted time range has completed, generating and displaying, in the first region, by the charting engine, a new historical completed price-range-over-time-range-type symbol adjacent to the one or more historical completed-price-range-over-time-range-type symbols, and erasing, in the second region, the current uncompleted price-range-over-an-uncompleted-time-range-type symbol.

21 Claims, 47 Drawing Sheets

Related U.S. Application Data filed on Jul. 24, 2020, now Pat. No. 11,348,293, and a continuation-in-part of application No. 16/935,084, filed on Jul. 21, 2020, now Pat. No. 11,321,780, and a continuation-in-part of application No. 16/932,345, filed on Jul. 17, 2020, now Pat. No. 11,282,245, and a continuation-in-part of application No. 16/790,512, filed on Feb. 13, 2020, now Pat. No. 10,755,458.

(56) References Cited

U.S. PATENT DOCUMENTS

| Patent/Pub. No. | Date | Inventor |
|---|---|---|
| 7,212,208 B2 | 5/2007 | Khozai |
| 7,356,501 B2 | 4/2008 | Churquina |
| 7,542,940 B2 | 6/2009 | Burns et al. |
| 7,707,100 B2 | 4/2010 | Hjartberg et al. |
| 7,844,487 B2 | 11/2010 | Chapman |
| 7,882,002 B2 | 2/2011 | Monroe et al. |
| 8,650,115 B1 | 2/2014 | Seiden et al. |
| 8,661,358 B2 | 2/2014 | Duncker et al. |
| 10,037,574 B2 | 7/2018 | Decker et al. |
| 2003/0139989 A1 | 7/2003 | Churquina |
| 2004/0143537 A1 | 7/2004 | Romani |
| 2004/0164983 A1 | 8/2004 | Khozai |
| 2004/0267654 A1 | 12/2004 | Peng et al. |
| 2005/0160021 A1 | 7/2005 | Nesmith et al. |
| 2006/0026114 A1 | 2/2006 | Gregoire et al. |
| 2007/0067233 A1 | 3/2007 | Dalal |
| 2007/0088648 A1 | 4/2007 | Mather et al. |
| 2008/0183639 A1* | 7/2008 | DiSalvo ............. G06Q 40/06 705/36 R |
| 2008/0262955 A1* | 10/2008 | Erdmier ............. G06Q 40/00 705/35 |
| 2009/0192877 A1 | 7/2009 | Chapman |
| 2011/0137822 A1 | 6/2011 | Chapman |
| 2011/0210974 A1* | 9/2011 | Buck ............. G06Q 30/06 345/440 |
| 2013/0066803 A1 | 3/2013 | Worlikar |
| 2013/0080312 A1 | 3/2013 | Kawamura |
| 2013/0080370 A1 | 3/2013 | Zadeh |
| 2013/0187926 A1 | 7/2013 | Silverstein et al. |
| 2013/0191267 A1 | 7/2013 | Rooney |
| 2014/0143115 A1 | 5/2014 | Kono |
| 2015/0066725 A1 | 3/2015 | Cai |
| 2015/0154700 A1 | 6/2015 | Hackett |
| 2015/0242997 A1 | 8/2015 | Sun et al. |
| 2015/0244850 A1 | 8/2015 | Rodriguez et al. |
| 2016/0217526 A1 | 7/2016 | Decker |
| 2016/0300303 A1 | 10/2016 | Seiden et al. |
| 2016/0321747 A1 | 11/2016 | Decker et al. |
| 2017/0018032 A1 | 1/2017 | Chen et al. |
| 2017/0032128 A1 | 2/2017 | Chen et al. |
| 2017/0278136 A1 | 9/2017 | Johnson |
| 2017/0301024 A1 | 10/2017 | Dalal et al. |
| 2018/0189990 A1 | 7/2018 | Cardno et al. |
| 2018/0315123 A1 | 11/2018 | Cohen |
| 2019/0354416 A1 | 11/2019 | Schleifer et al. |
| 2020/0273104 A1 | 8/2020 | Ushman et al. |

OTHER PUBLICATIONS

International Search Report dated Sep. 30, 2020 in International Application No. PCT/US2020/042622.

International Search Report dated Oct. 19, 2021 in International Application No. PCT/US2021/040780.

* cited by examiner

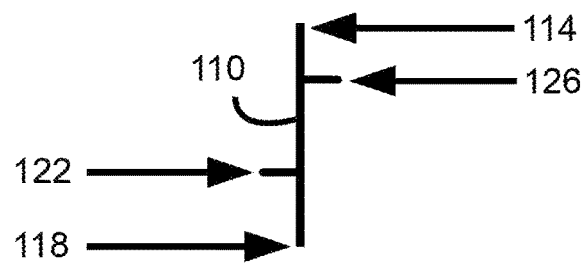
Prior Art
Fig. 1-A
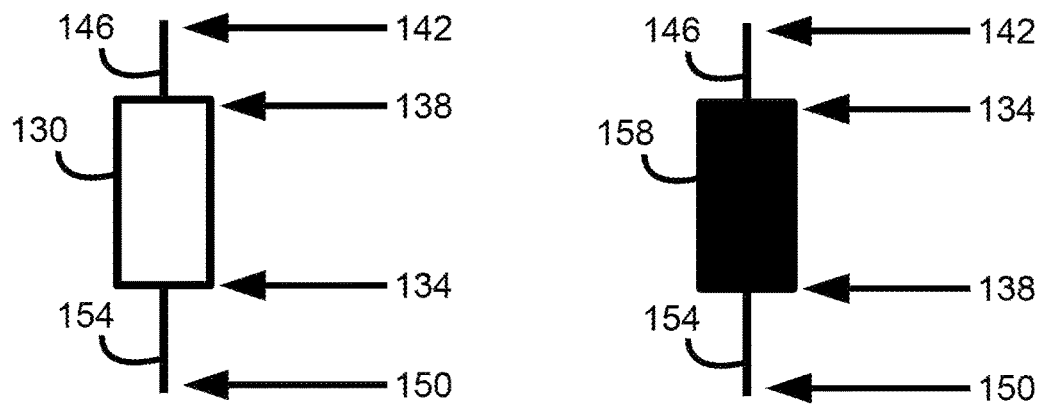
Prior Art
Fig. 1-B
Prior Art
Fig. 1-C
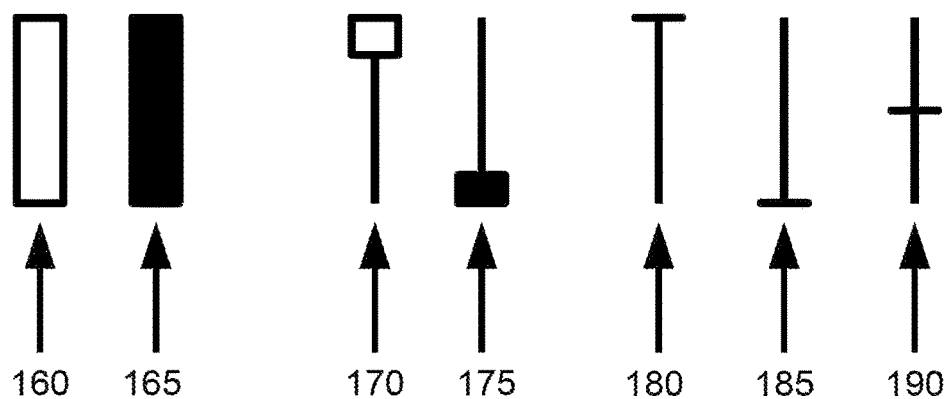
Prior Art
Fig. 1-D Time/Sales Data (345)

| Date/Time | Symbol | Price | Size | Exchange |
|---|---|---|---|---|
| 20200210:0930.12 | XYZ | 99.50 | 120 | NASDAQ |
| 20200210:0930.48 | XYZ | 101.50 | 500 | NASDAQ |
| 20200210:0931.18 | XYZ | 98 | 310 | NASDAQ |
| 20200210:0931.36 | XYZ | 102 | 880 | NASDAQ |
| 20200210:0932.15 | XYZ | 104 | 630 | NASDAQ |
| 20200210:0932.45 | XYZ | 101 | 470 | NASDAQ |

Fig. 4-A

OHLC Data (350)

| Date/Time | 20200210:0930.00 | 20200210:0931.00 | 20200210:0932.00 |
|---|---|---|---|
| Symbol | XYZ | XYZ | XYZ |
| Open | 100 | 101 | 100 |
| High | 101.50 | 102 | 104 |
| Low | 99.50 | 98 | 101 |
| Close | 101 | 99 | 102 |
| Volume | 15000 | 20000 | 25000 |

Fig. 4-B

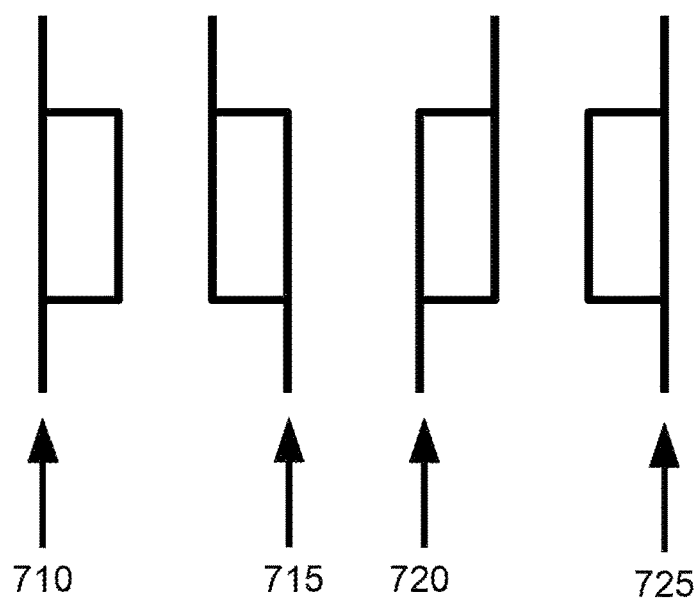
Fig. 7-A
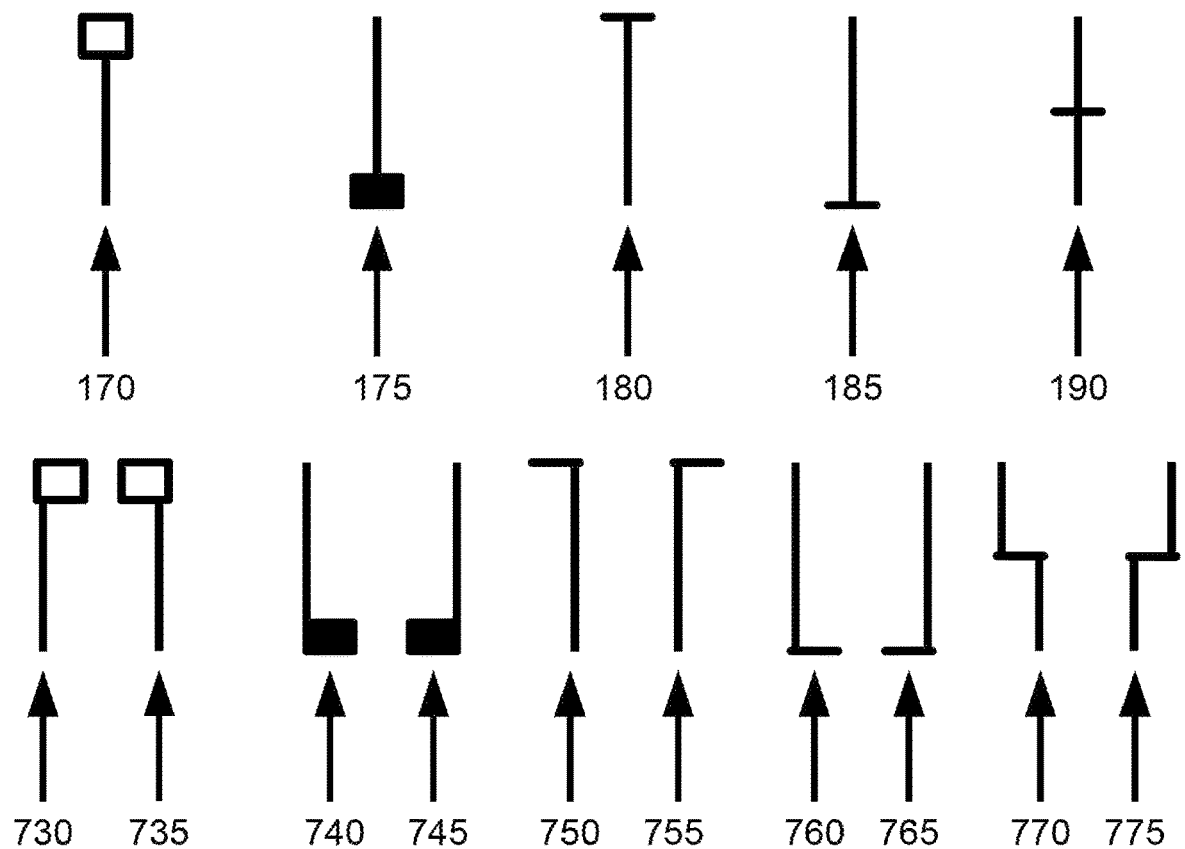
Fig. 7-B

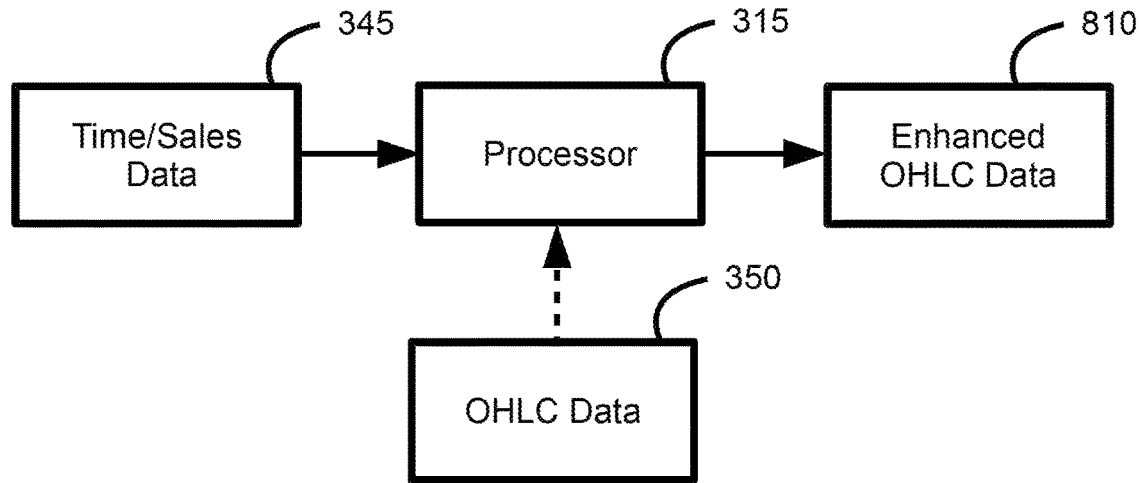
Fig. 8-A
| Date/Time | 20200210:0930.00 | 20200210:0931.00 | 20200210:0932.00 |
|---|---|---|---|
| Symbol | XYZ | XYZ | XYZ |
| Open | 100 | 101 | 100 |
| High | 101.50 | 102 | 104 |
| Low | 99.50 | 98 | 101 |
| Close | 101 | 99 | 102 |
| Volume | 15000 | 20000 | 25000 |
| Time of High | 0930.48 | 0931.36 | 0932.15 |
| Time of Low | 0930.12 | 0931.18 | 0932.45 |
| High Time % | 80 | 60 | 25 |
| Low Time % | 20 | 30 | 75 |
Fig. 8-B

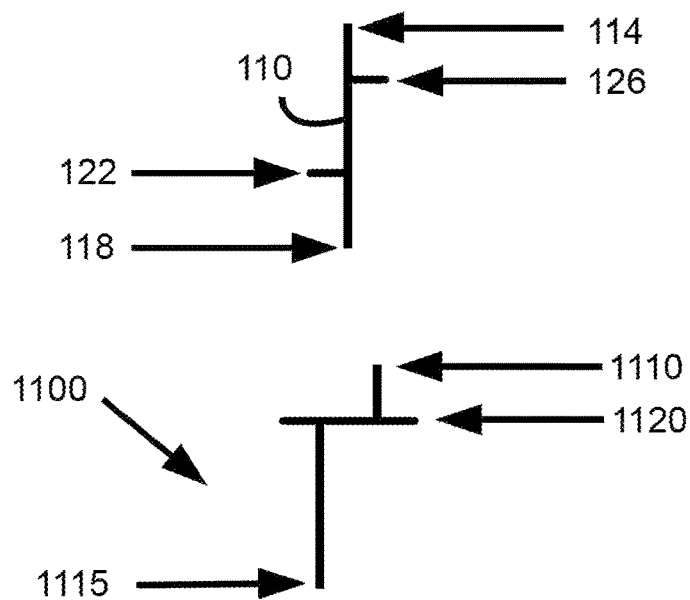
Fig. 11-A
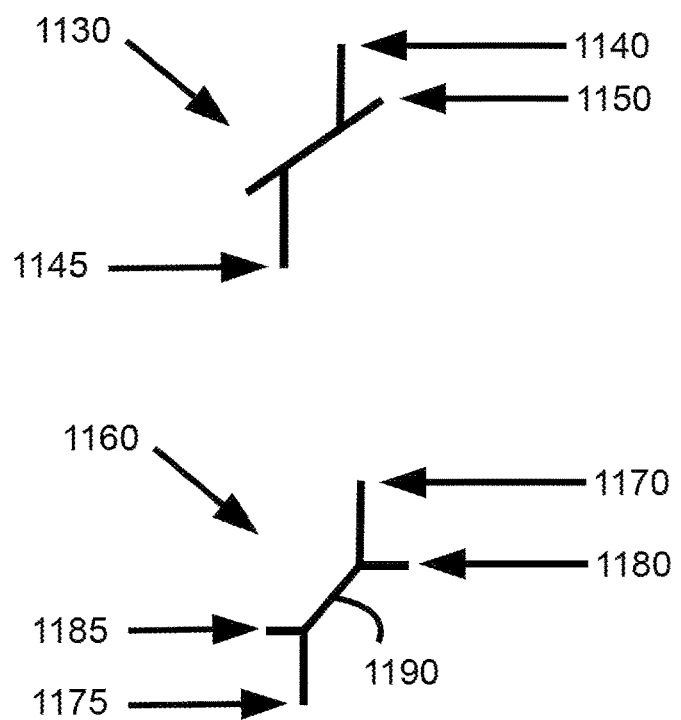
Fig. 11-B

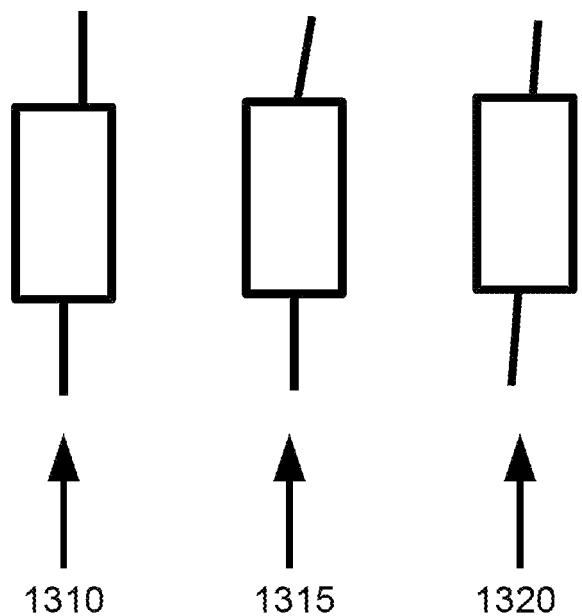
Fig. 13-A
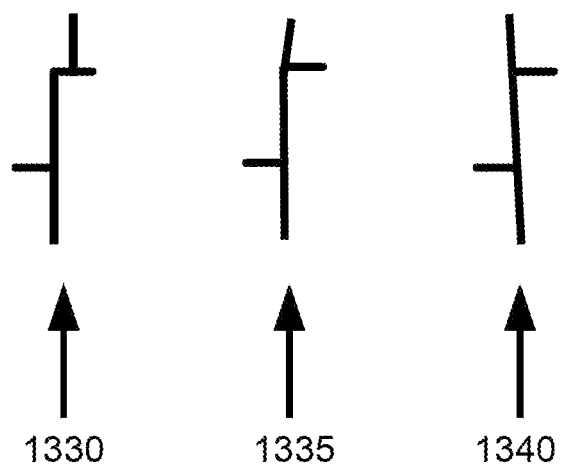
Fig. 13-B

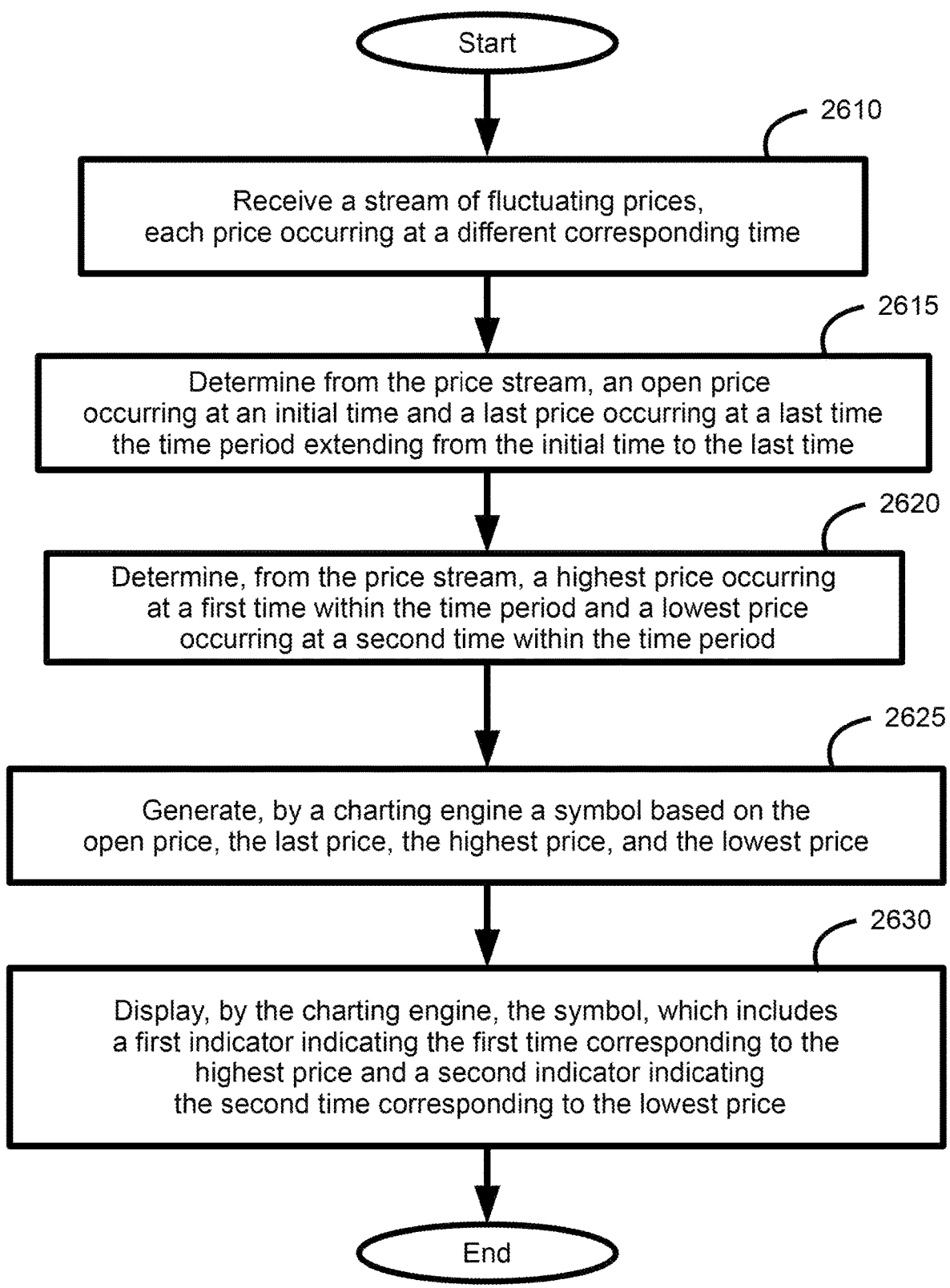
Fig. 26-A

From 2620
Determine, from the price stream, a highest price occurring at a first time within the time period and a lowest price occurring at a second time within the time period

2650
Generate a candle body from the open price and the last price where a height of the candle body indicates a difference between the open price and the last price, and a width of the candle body indicates a difference between the last time and the initial time

2655
Generate an upper wick and a lower wick based on the open price, the last price, the highest price, and the lowest price

2660
Display the symbol, which includes the candle body, the upper wick, and the lower wick, wherein the upper wick extends from an upper surface of the candle body at a first point corresponding to the first time and the lower wick extends from a lower surface of the candle body at a second point corresponding to the second time

End

Fig. 26-B

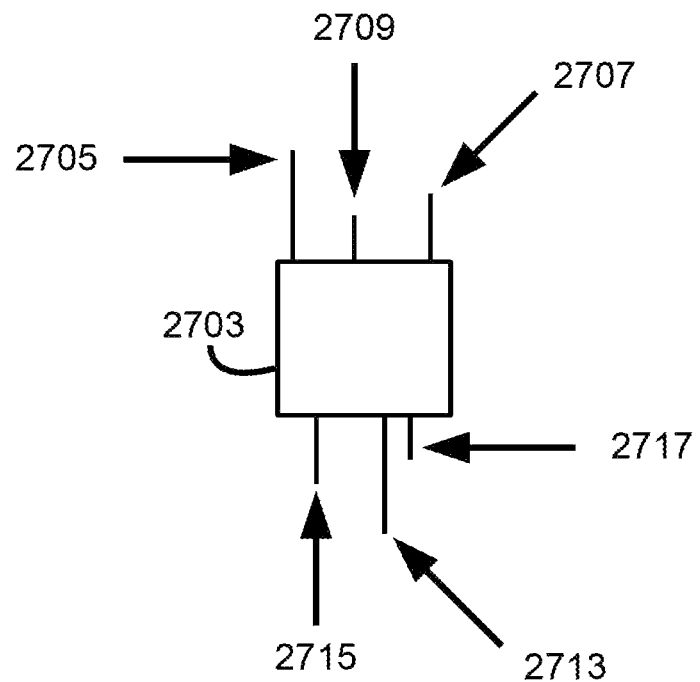
Fig. 27-A

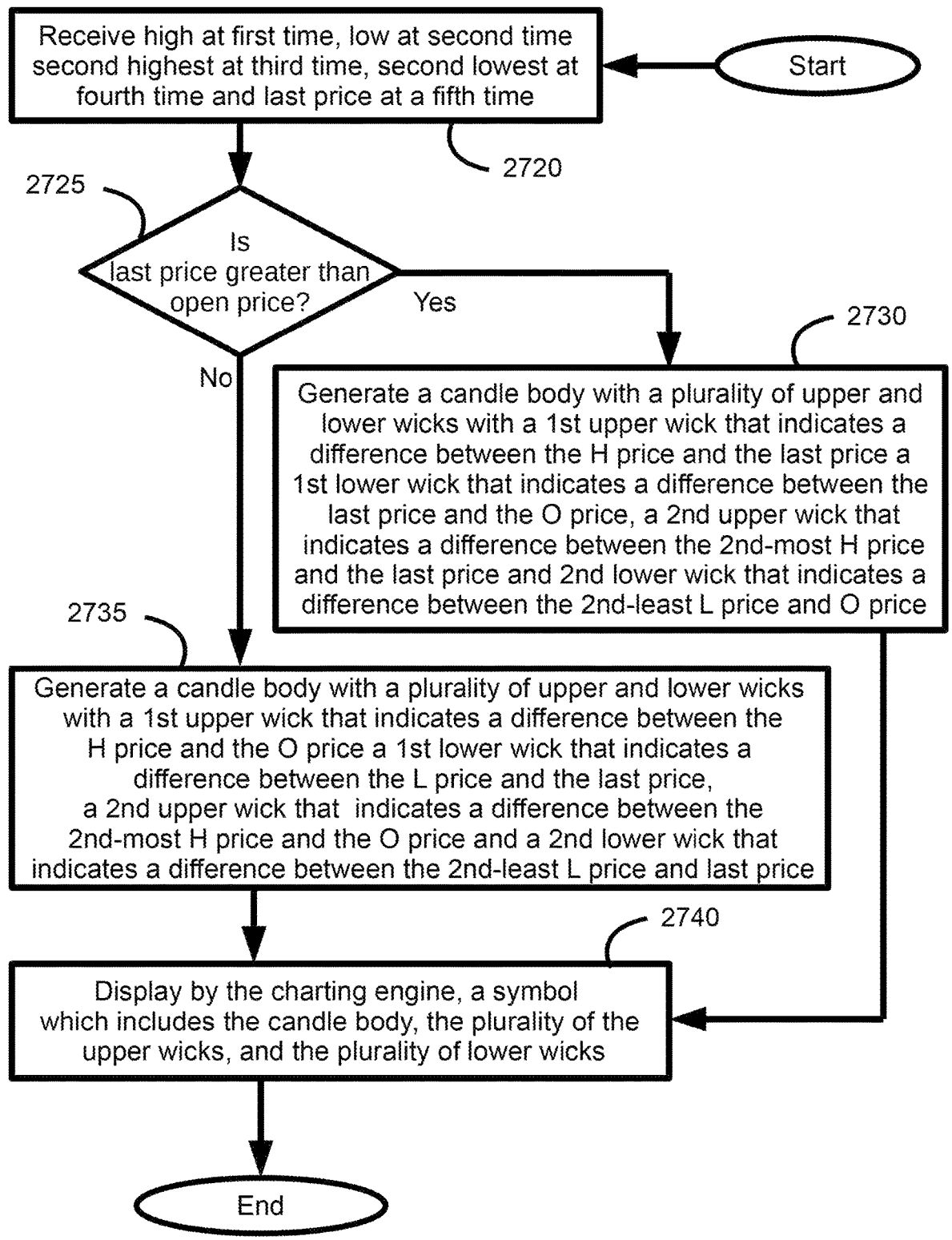
Fig. 27-B

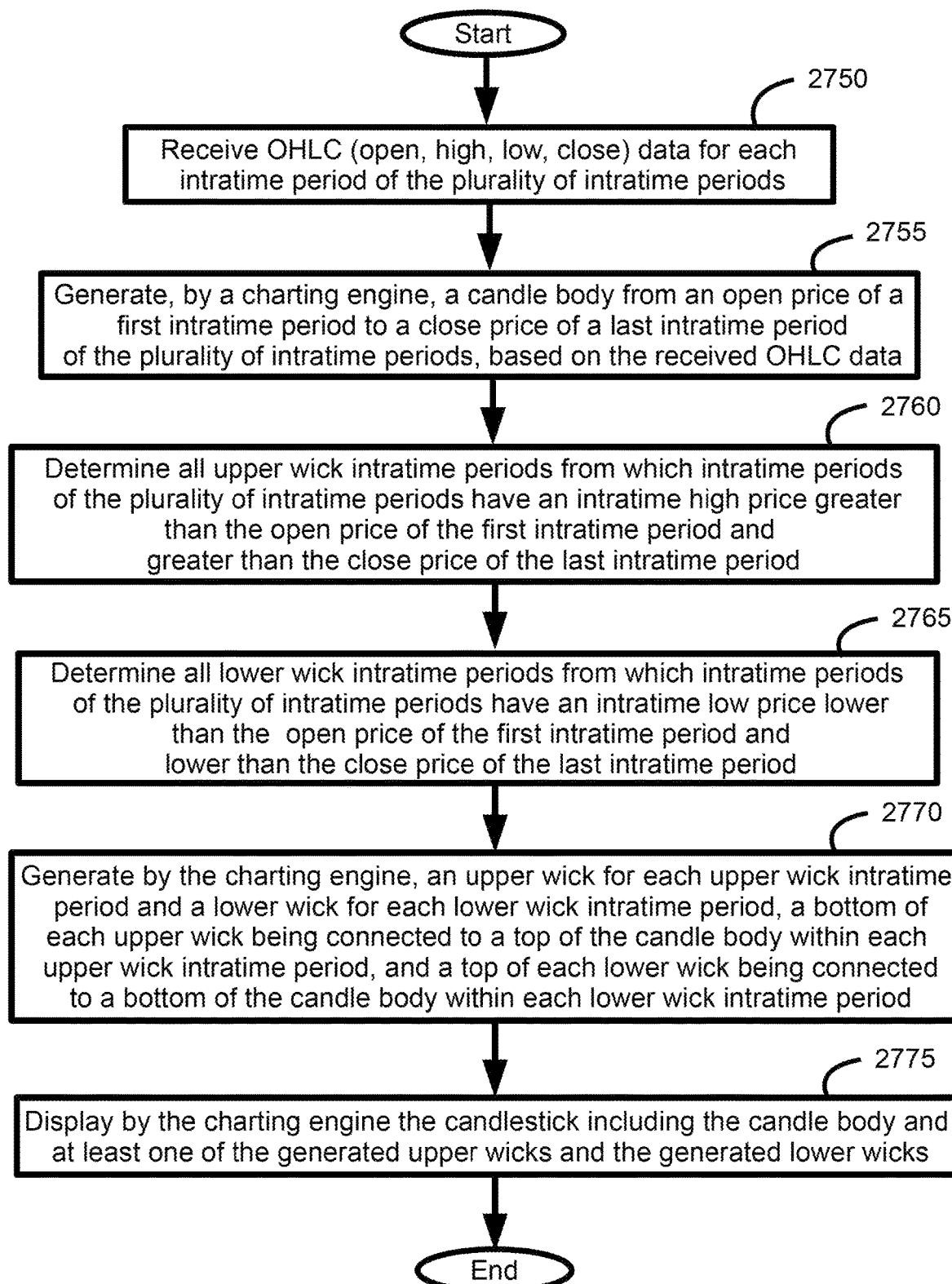
Fig. 27-C

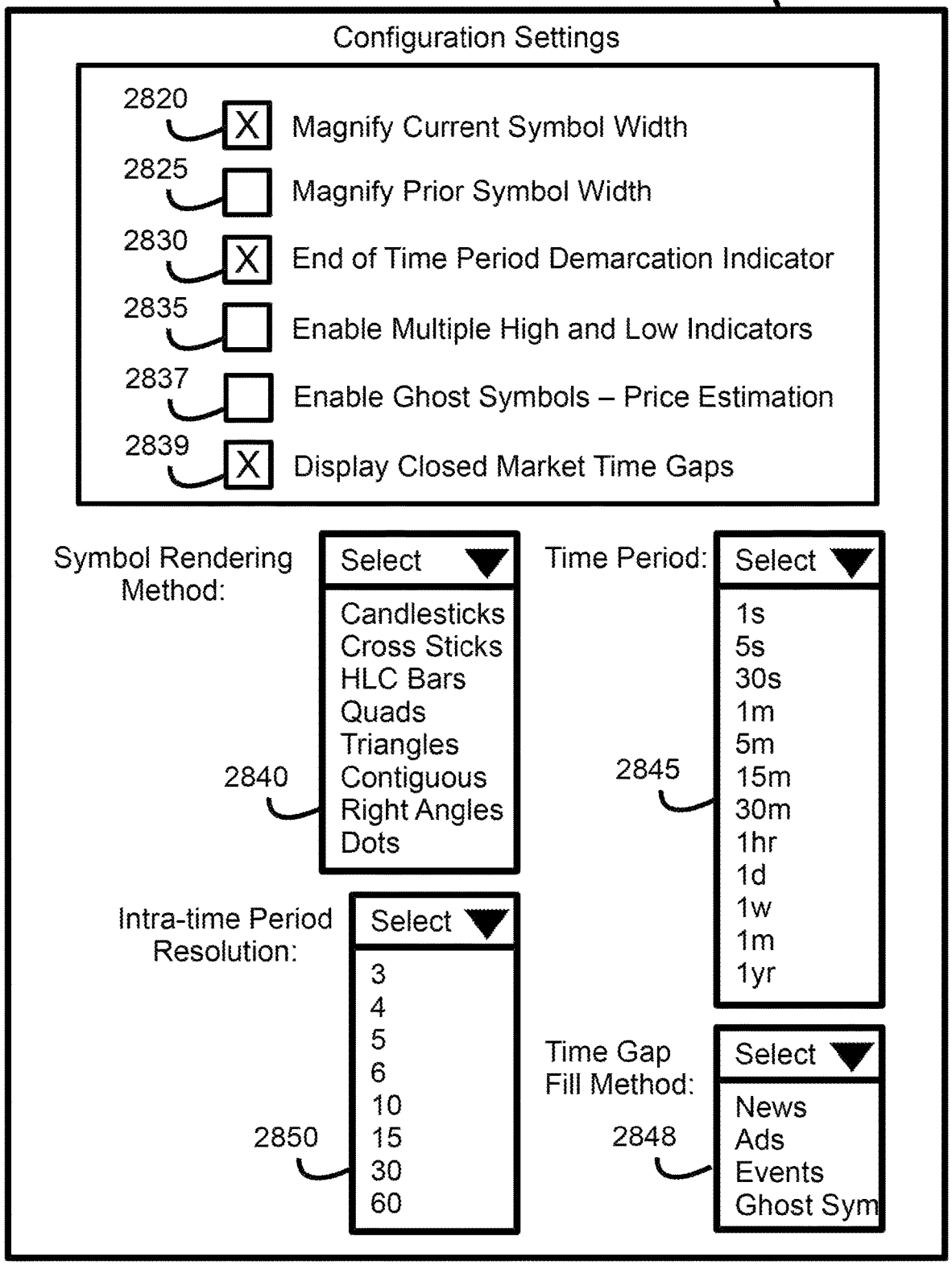
Fig. 28-A

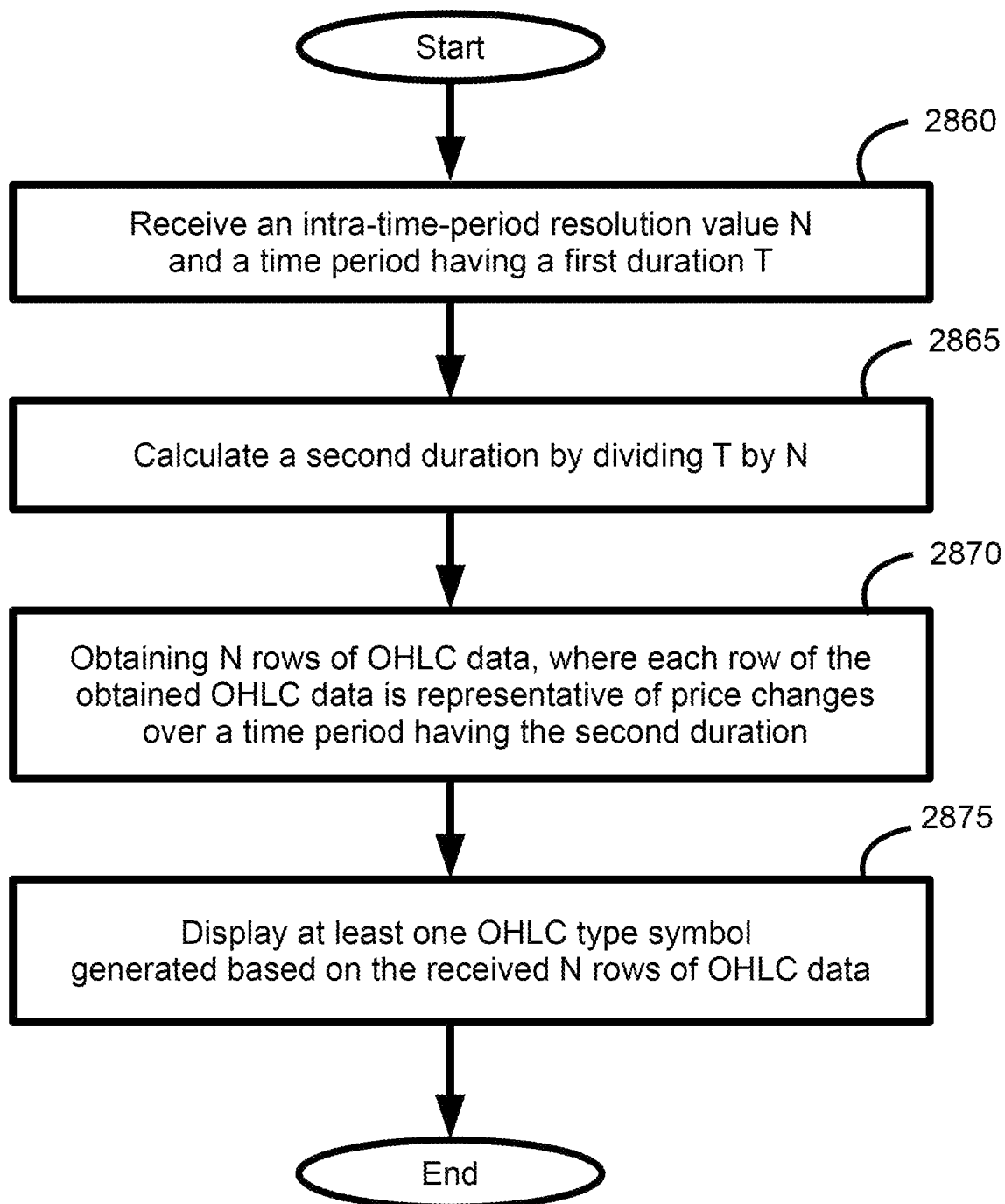
Fig. 28-B

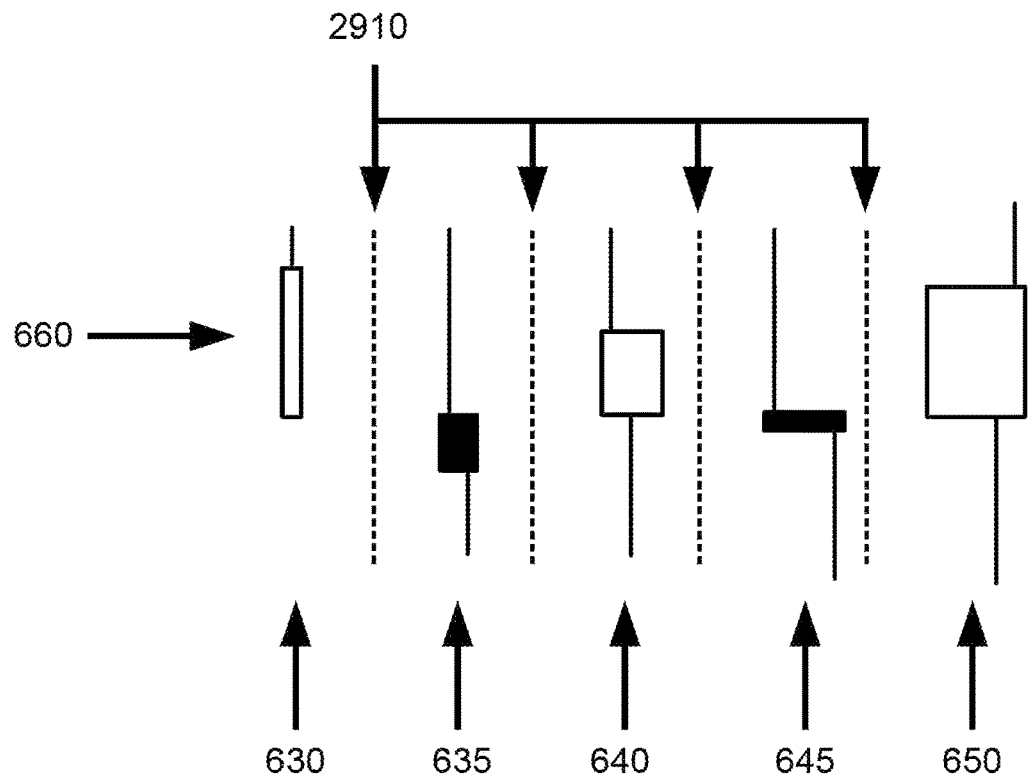
Fig. 29-A
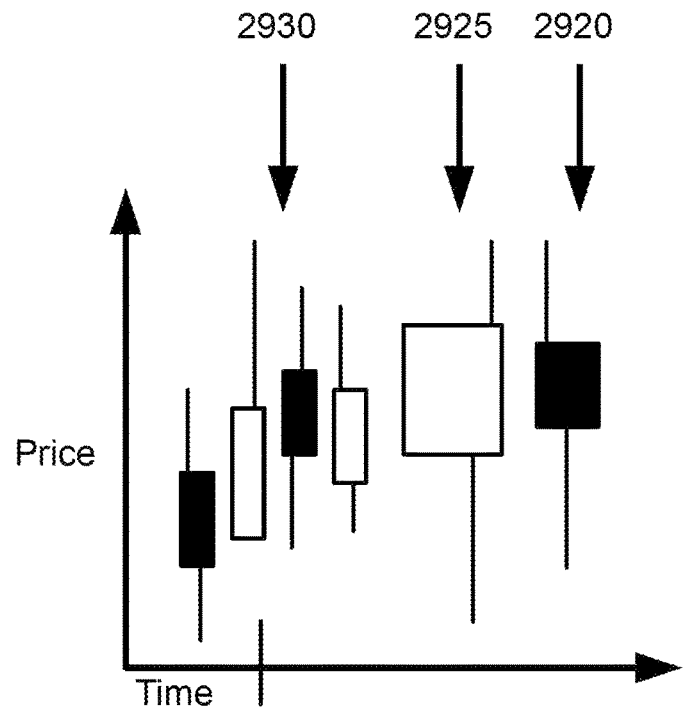
Fig. 29-B

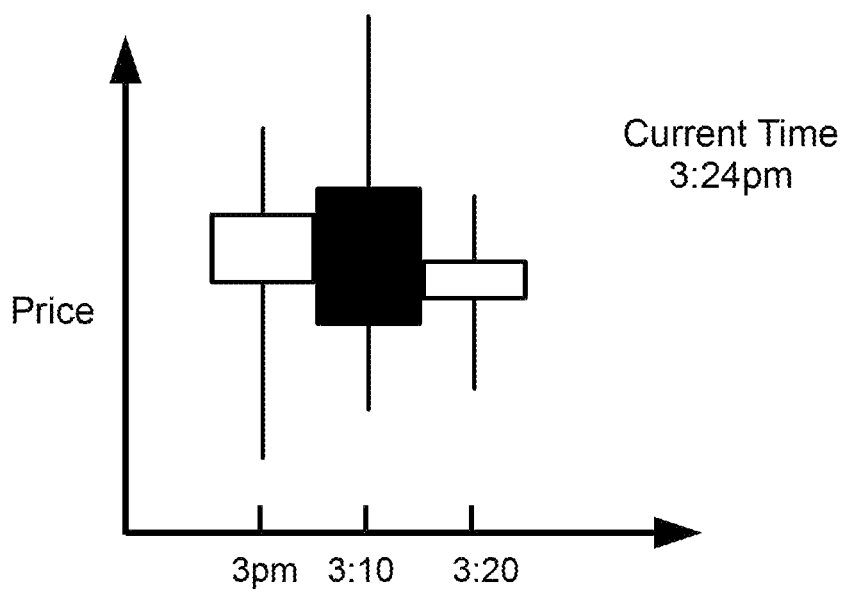
Prior Art
Fig. 29-C
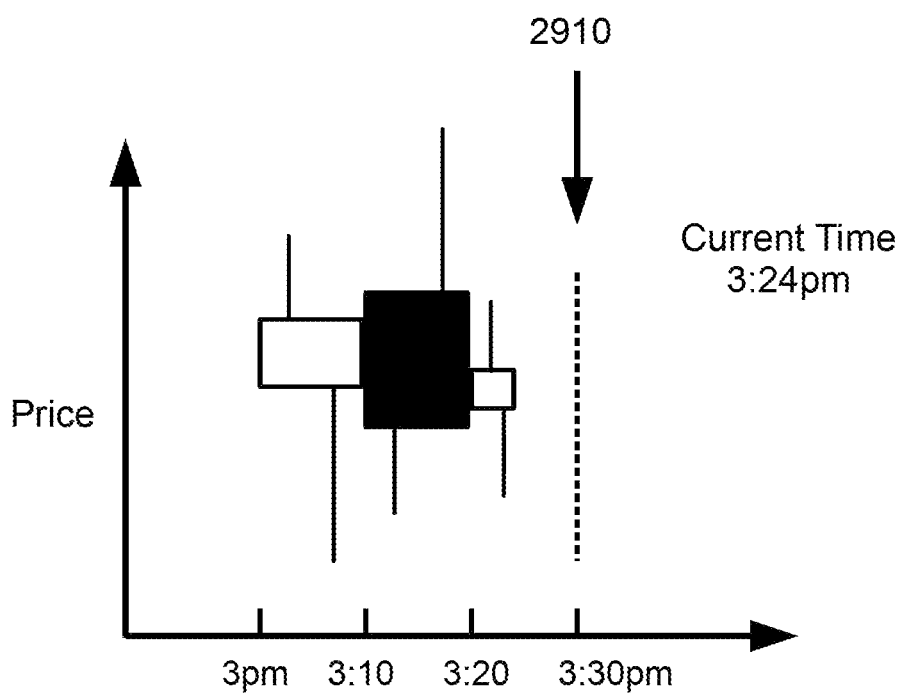
Fig. 29-D

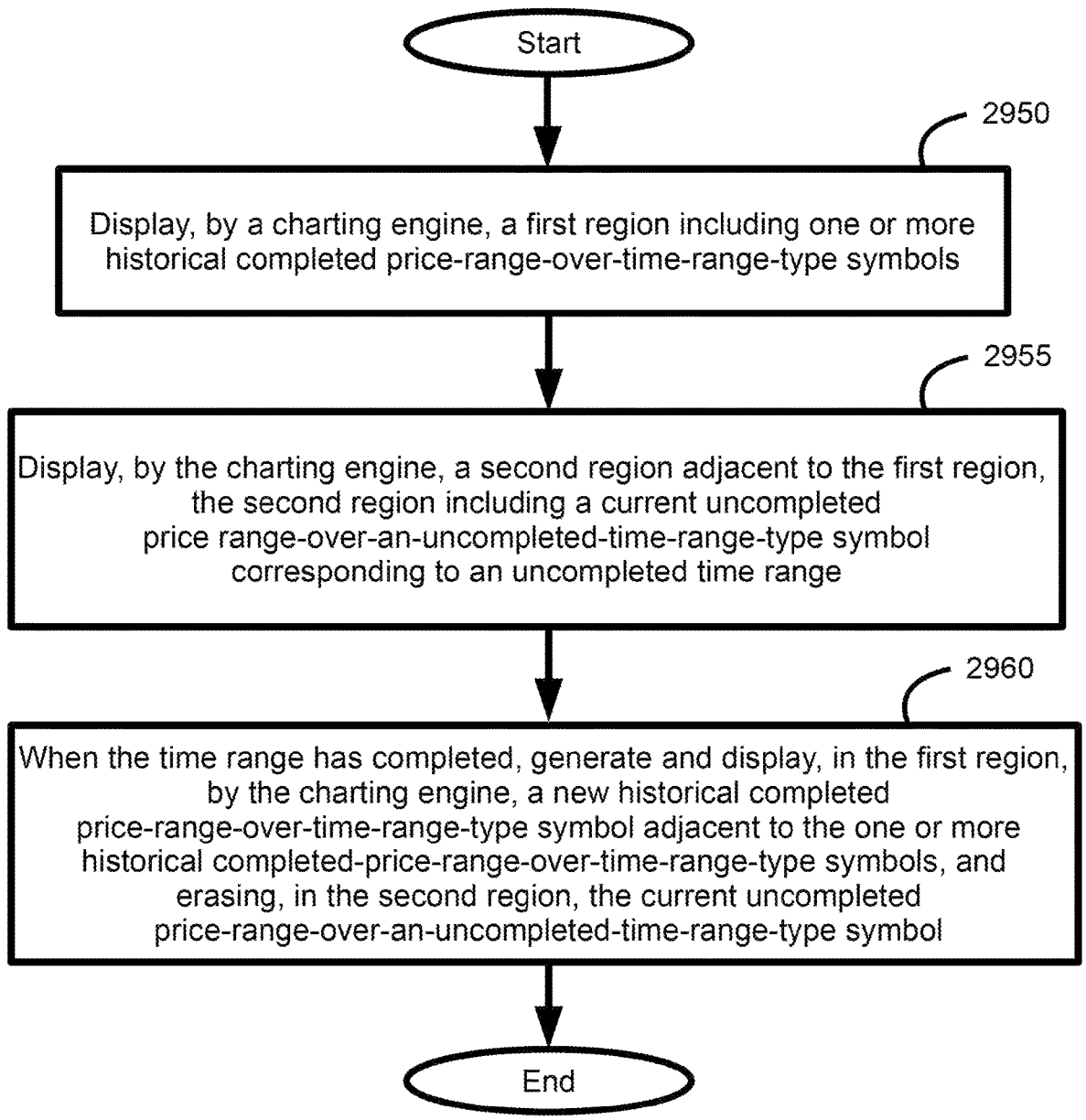
Fig. 29-E

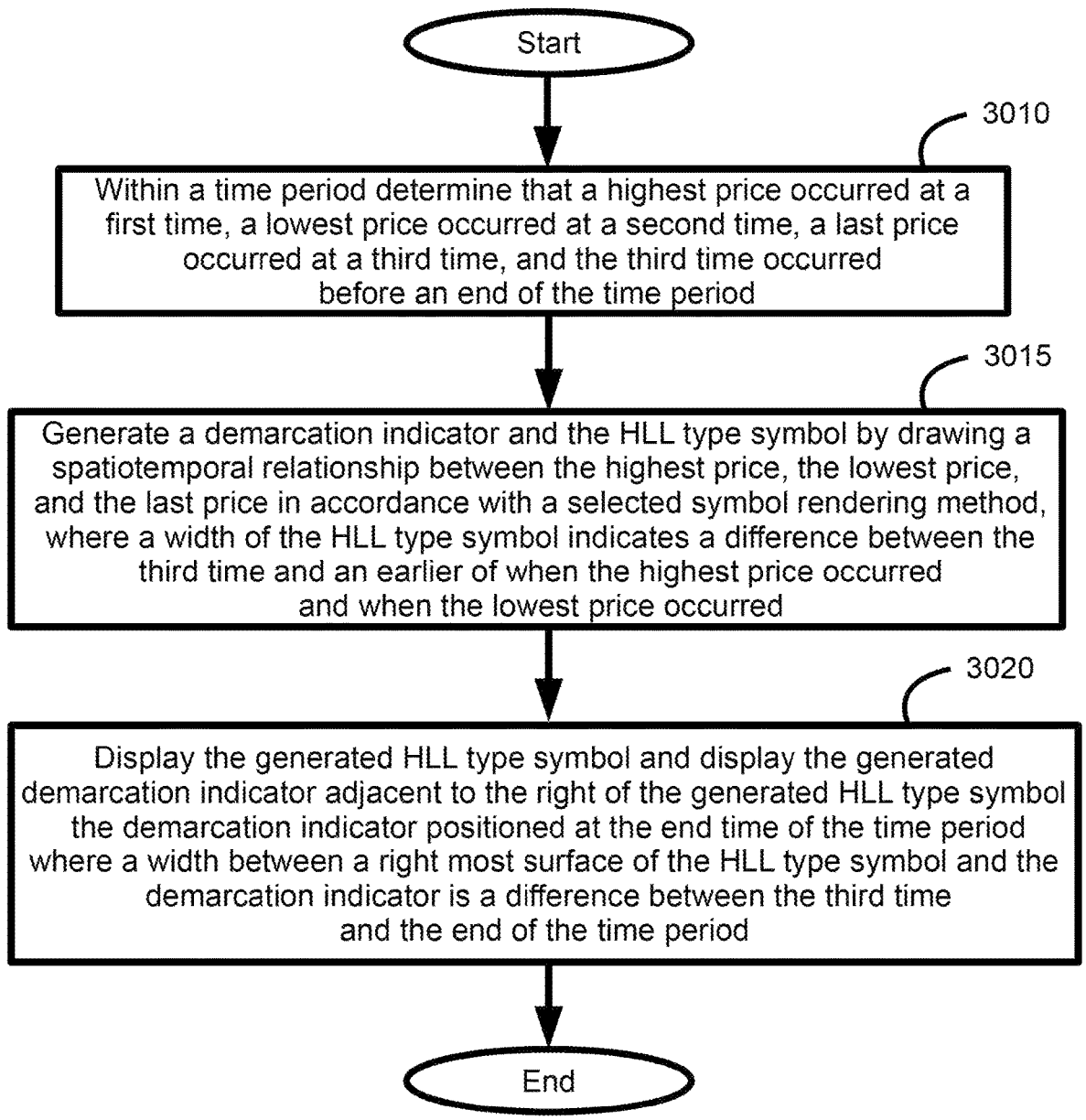
Fig. 30-A

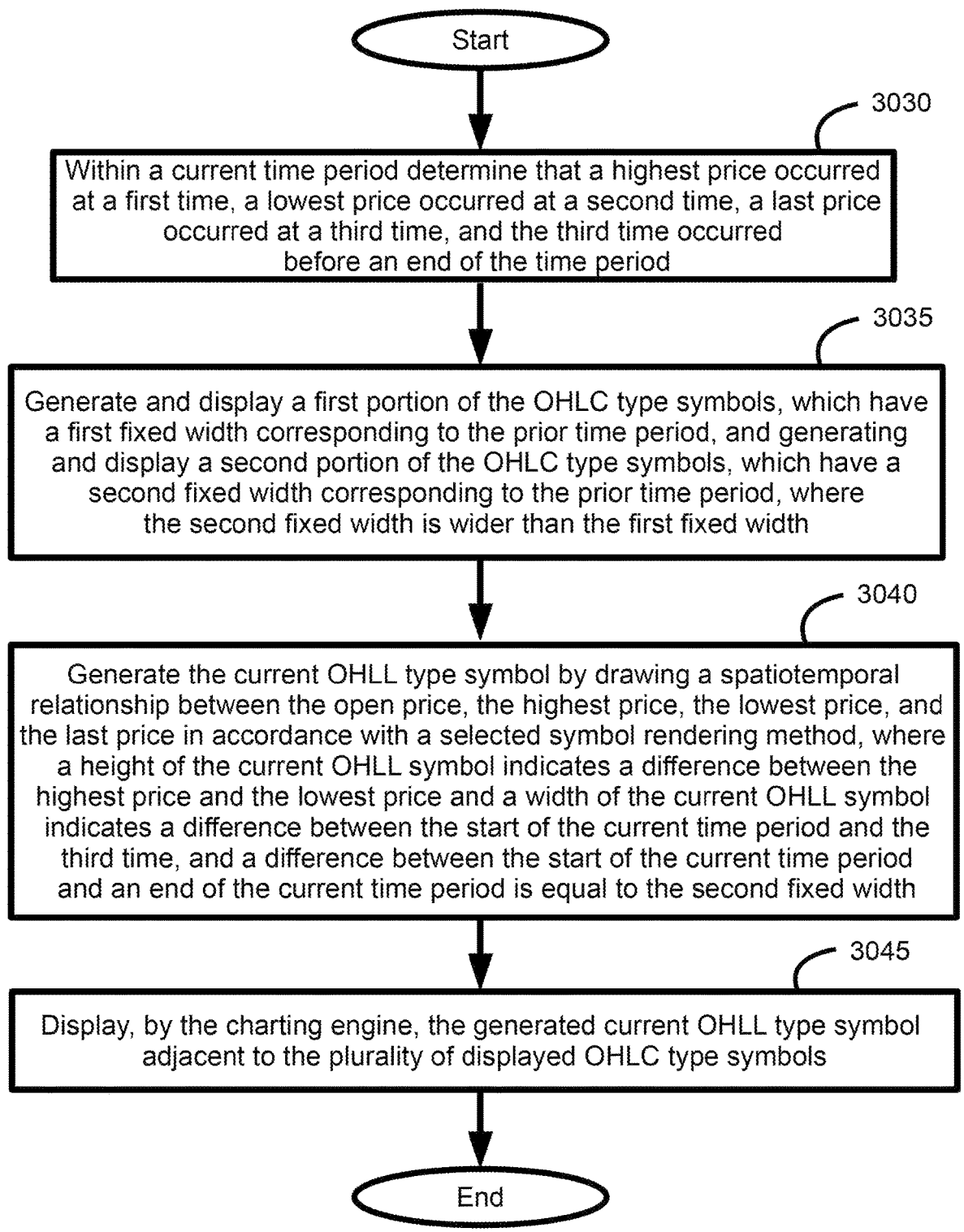
Fig. 30-B

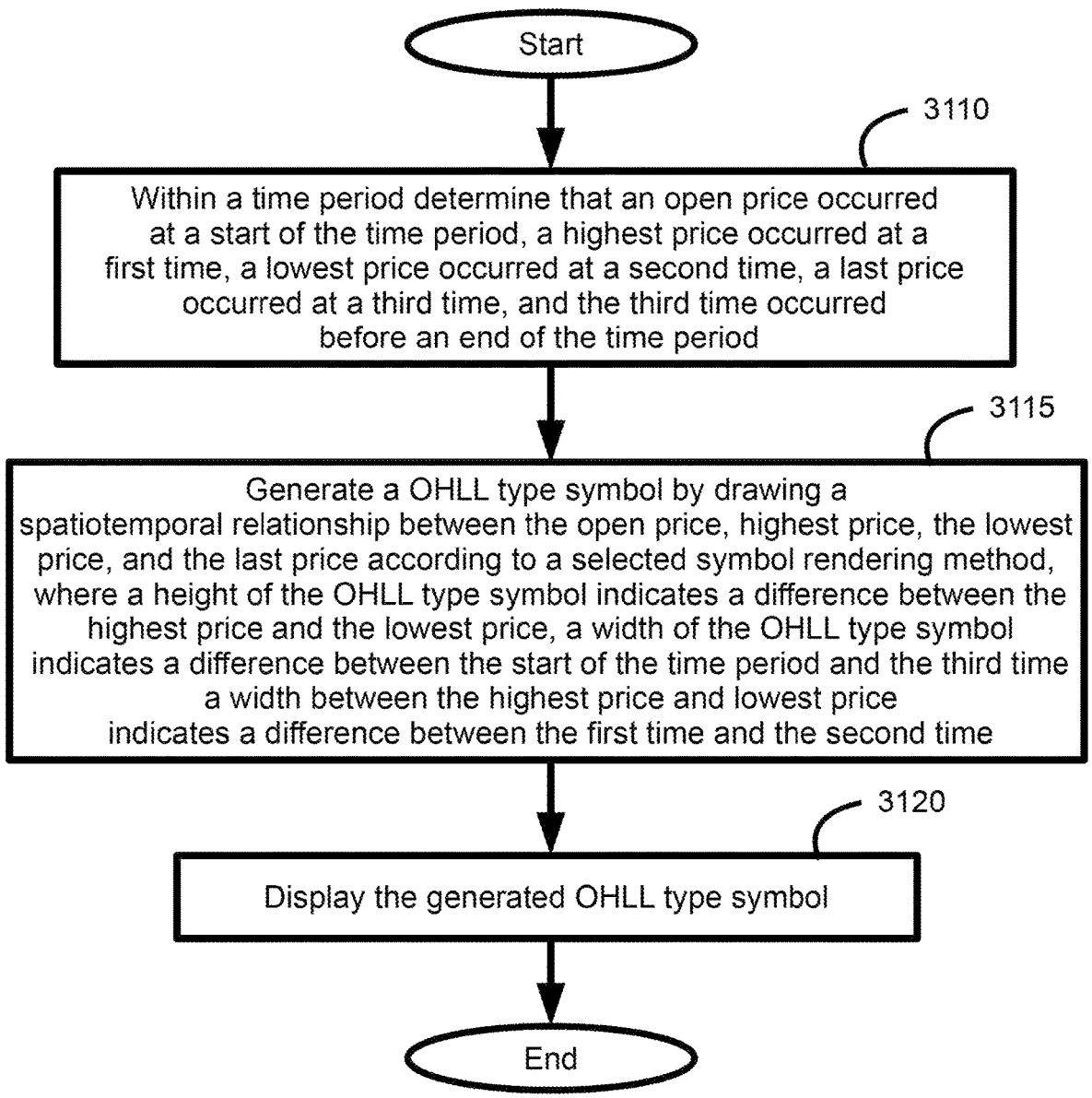
Fig. 31-A

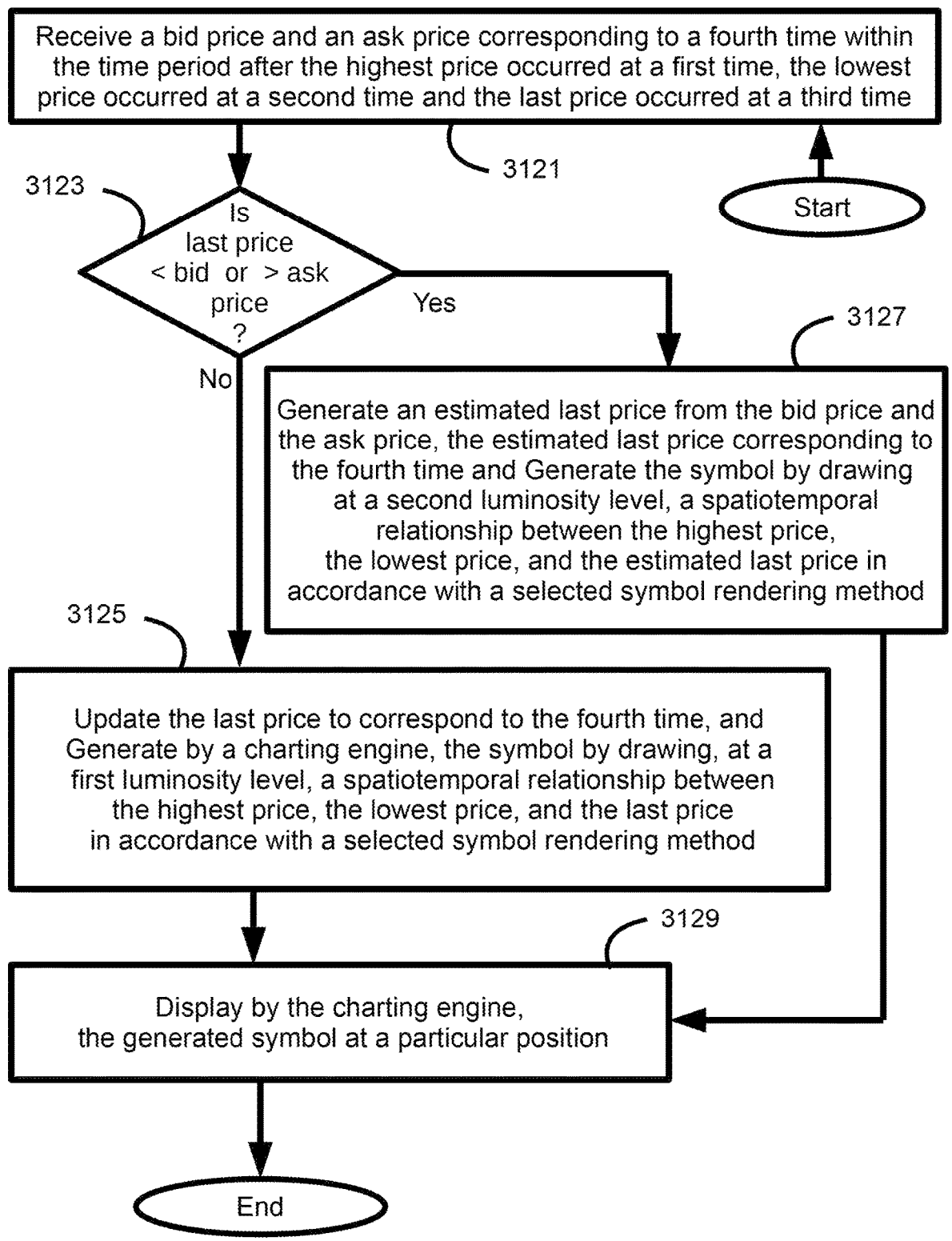
Fig. 31-B

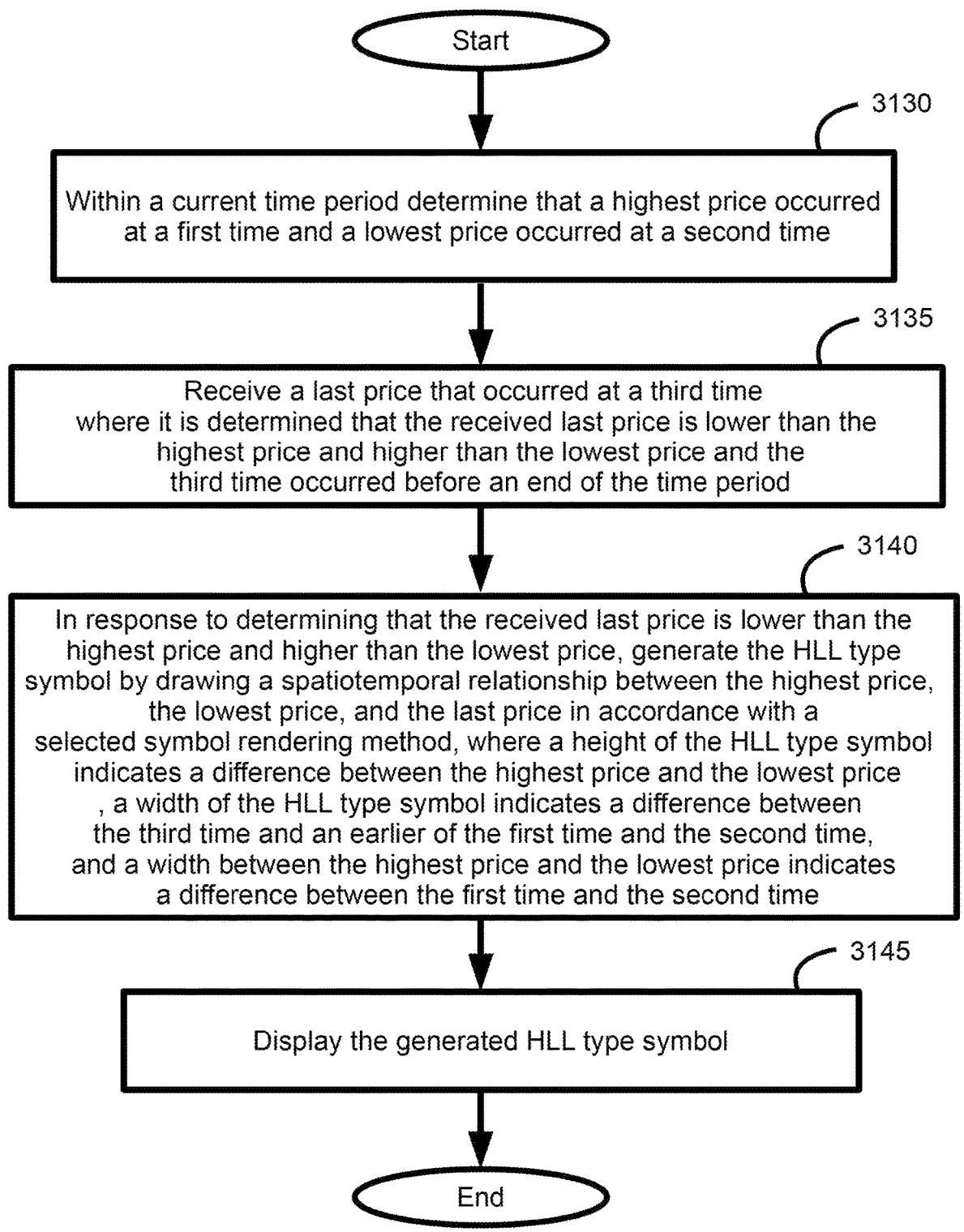
Fig. 31-C

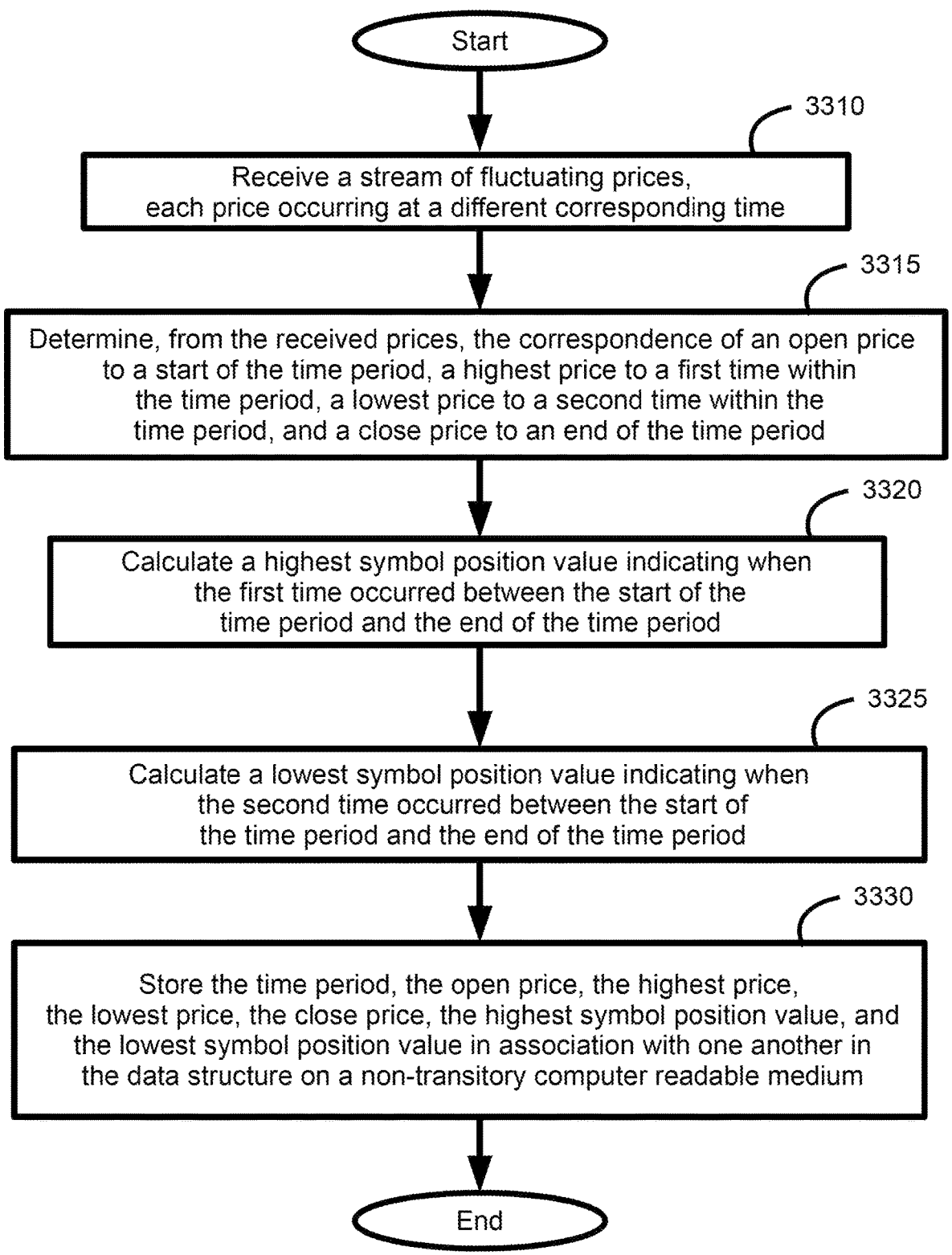
Fig. 33-A

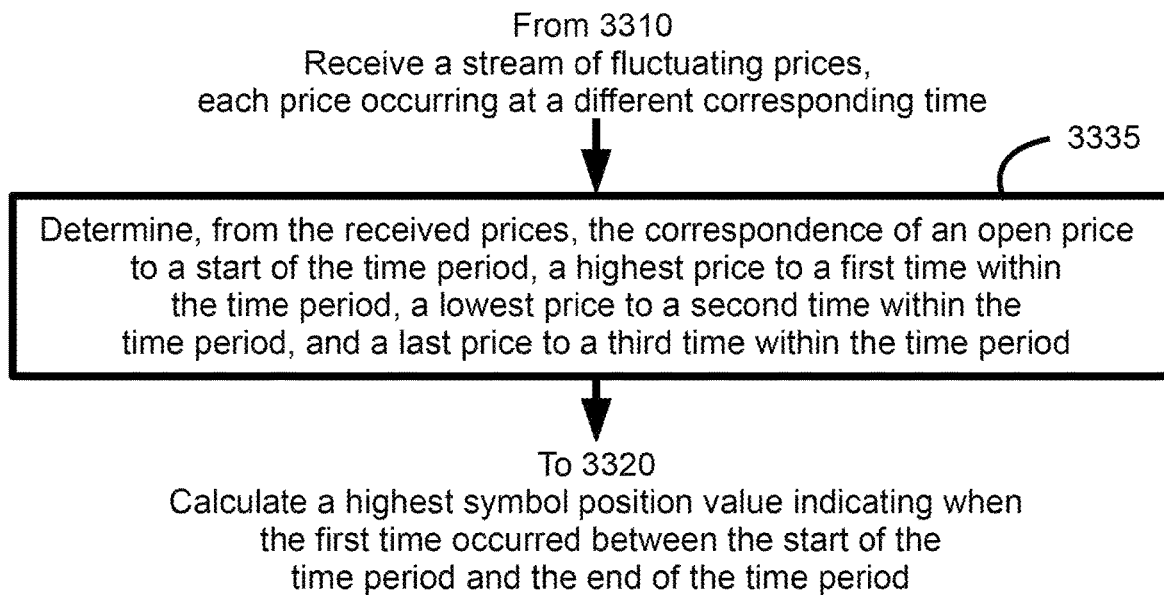
Fig. 33-B
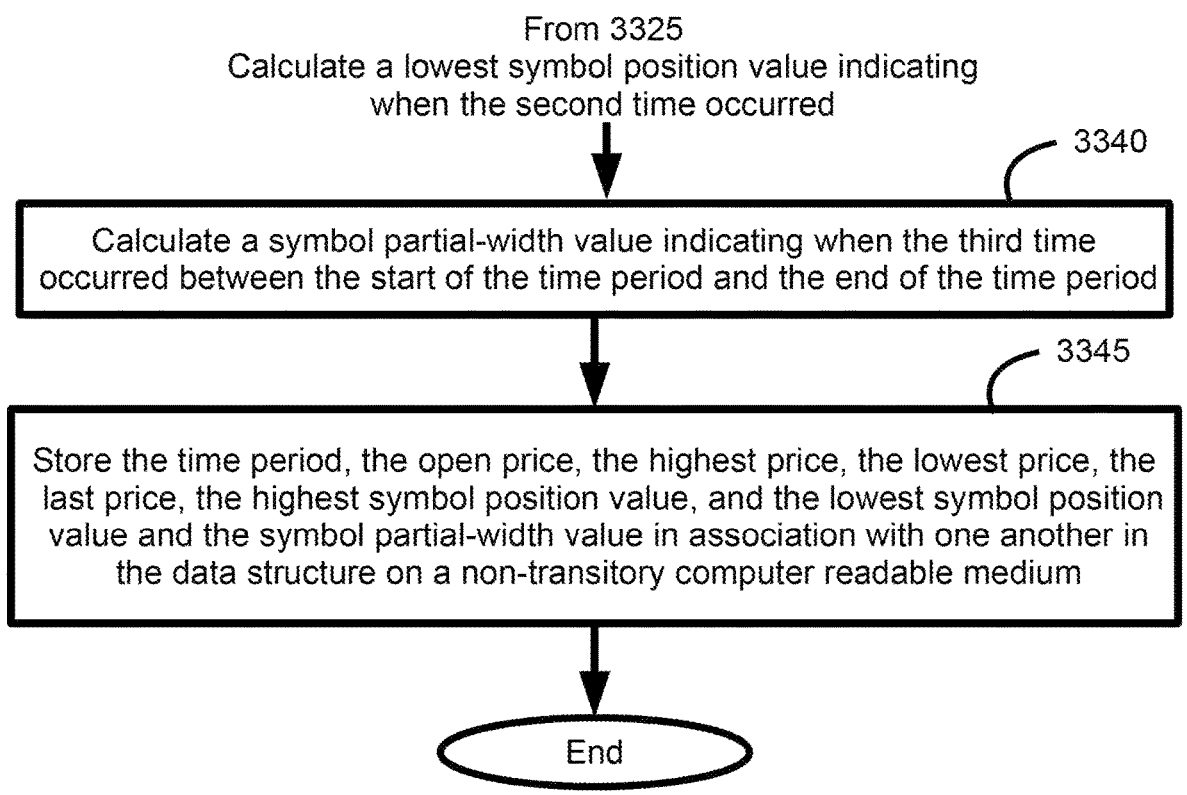
Fig. 33-C

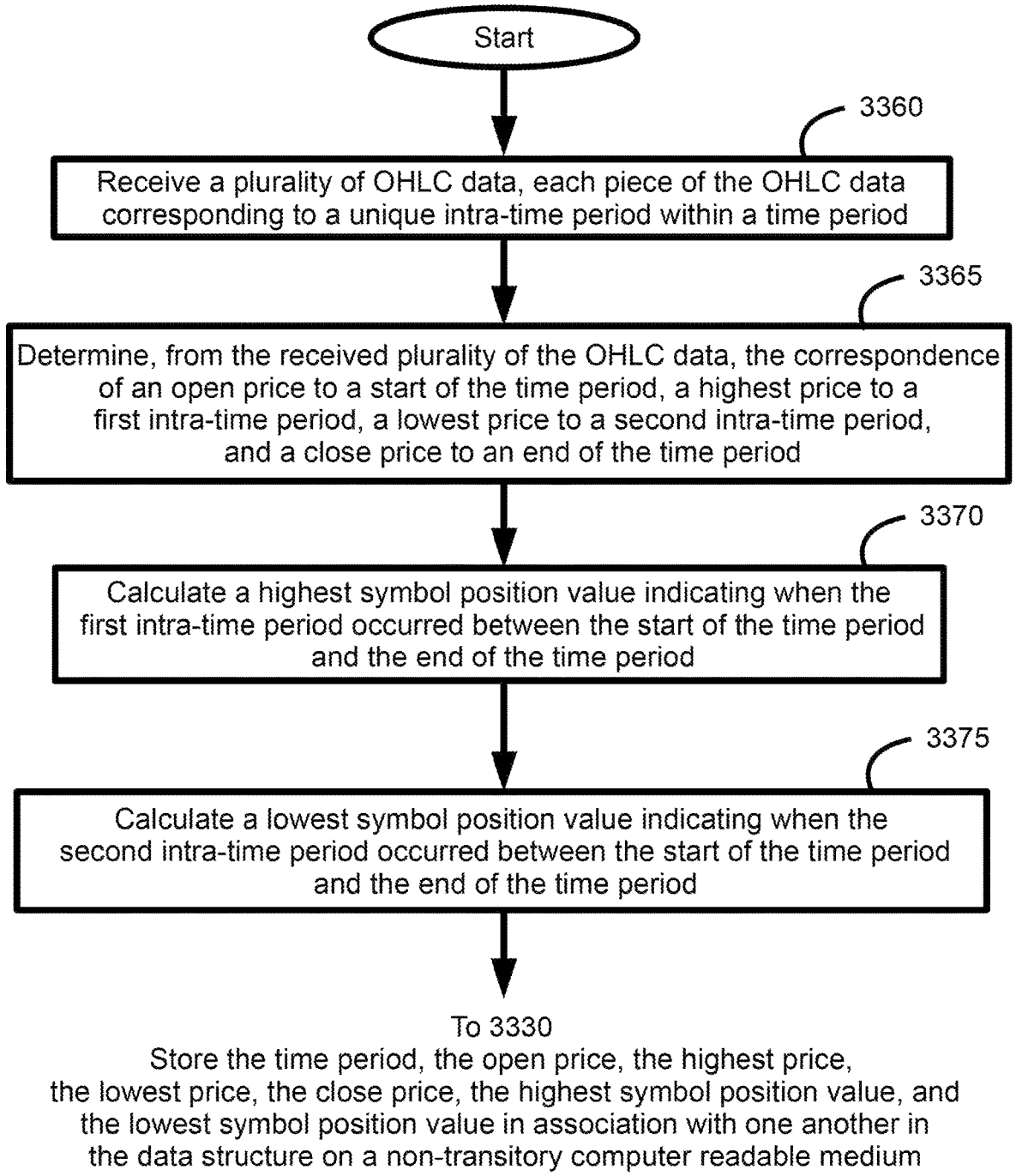
Fig. 33-D

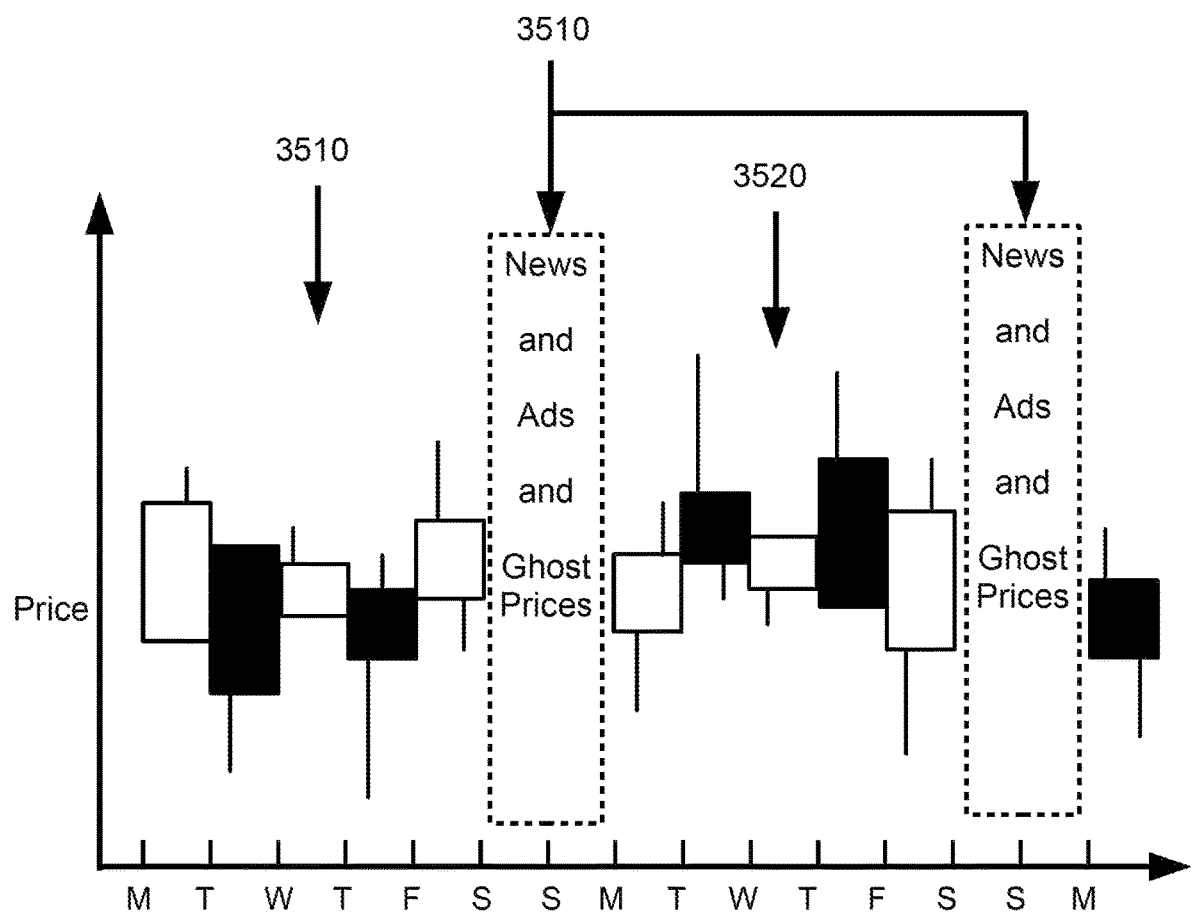
Fig. 35-A

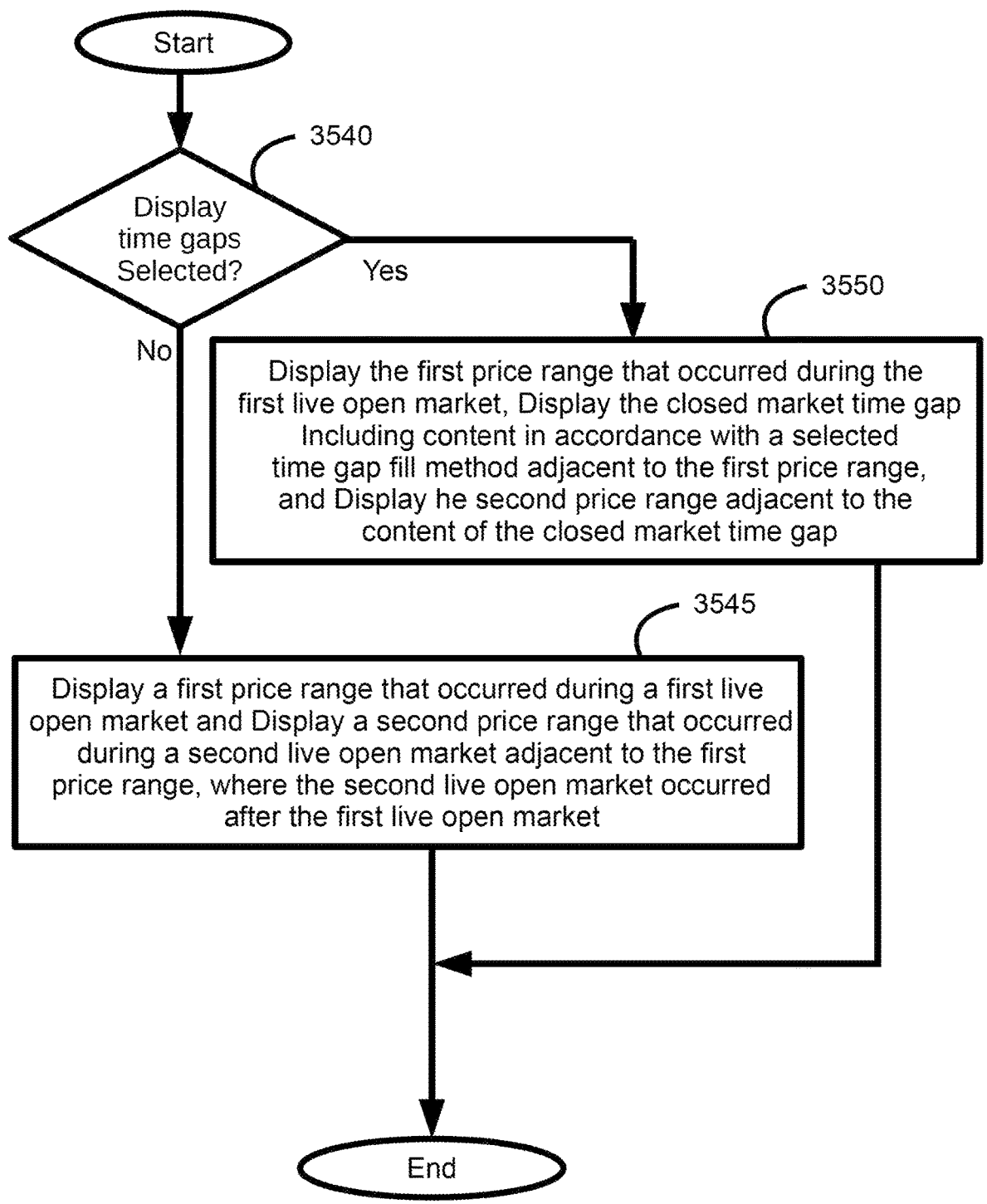
Fig. 35-B

MULTIPLE REGION PRICE CHART DISPLAY SYSTEM, METHOD, AND DEVICE

CROSS REFERENCE TO RELATED APPLICATIONS

This application is a divisional of U.S. patent application Ser. No. 17/352,294, filed Jun. 19, 2021, which is a continuation in part of U.S. patent application Ser. No. 17/351, 929, filed Jun. 18, 2021, which is a continuation in part of U.S. patent application Ser. No. 17/342,573, filed Jun. 9, 2021, which is a continuation in part of U.S. patent application Ser. No. 17/338,260, filed Jun. 3, 2021, which is a continuation in part of U.S. patent application Ser. No. 16/937,949, filed Jul. 24, 2020, which is a continuation in part of U.S. patent application Ser. No. 16/935,084, filed Jul. 21, 2020, which is a continuation in part of U.S. patent application Ser. No. 16/932,345, filed Jul. 17, 2020, which is a continuation in part of U.S. patent application Ser. No. 16/790,512, filed Feb. 13, 2020, now U.S. Pat. No. 10,755, 458, each of which are incorporated by reference herein in its entirety.

FIELD OF THE INVENTION

This invention generally relates to a computer implemented charting method and more specifically relates to a system, method, and device for generating and displaying enhanced price bar type charts representative of a price range of a market traded security during a time period.

BACKGROUND OF THE INVENTION

A bar chart also known as a OHLC (Open, High, Low, Close) chart is a collection of price bars, with each bar showing the price movements for a given time period. As shown in prior art of FIG. 1-A, each bar has a vertical line 110 that shows the highest price 114 and the lowest price 118 reached during the time period. The opening price 122 is marked by a tick mark of a small horizontal line on the left of the vertical line 110, and the closing price 126 is marked by a tick mark of a small horizontal line on the right of the vertical line 110. A bar chart variation might only display a HLC (High, Low, Close) chart including HLC bars that omit the opening price 122 and does not include the tick mark of a small horizontal line on the left of the vertical line 110. Bar charts are very similar to Japanese candlestick charts. The two chart types show the same information but in different ways. Candlesticks also have a vertical line showing the high and low of the period, but the difference between the open and close is represented by a thicker portion called a body. Neither of these charts show more specific information as to when the high price and low price occurred during that given time period nor do these charts even indicate which of a high price and low price came first.

Since the latter part of the nineteenth century far-eastern traders have used candlesticks for charting markets and for analysis based on trends in market psychology. Candlestick patterns are now commonly used in technical analysis to describe price movements of securities (e.g., stocks, bonds, ETFs, mutual funds, etc.), derivatives (e.g., options, forwards, futures, swaps, etc.), indices, or currencies over time. As shown in prior art of FIG. 1-B, the candlestick consists of a rectangular body 130, the height of which represents the difference between a time period's open price 134 and close price 138. A centerline projecting from the top of the rectangle extends upward to the period's high price 142 is known as an upper wick 146 whereas a similar centerline extends from the bottom to the period's low price 150 is known as a lower wick 154. When the closing trade price 138 is higher than its opening trade price 134, the body 130 of the up or bullish candlestick is filled with usually a white or green color. As shown in prior art of FIG. 1-C, as the opening trade price 134 is higher than its closing trade price 138, the body of the down or bearish candlestick is filled 158 with usually a black or red color.

The length of the candlestick varies with the price difference. When the price ranges between the opening trade price and the closing trade price increase, the body will be lengthened. Likewise, the upper or lower wick will be lengthened due to the highest or lowest trade price, respectively. As shown in prior art of FIG. 1-D, candlestick patterns have emerged due to the variety of sizes of both body and wicks. To name a few, a bullish Marubozu 160 and bearish Marubozu 165 have no wicks which occur when the highs and the lows also represent the opening and the closing prices and is considered a continuation pattern. A Hanging Man 170 can be a black or a white candlestick that consists of a small body near the high with a little or no upper wick and a long lower wick. The lower wick should be two or three times the height of the body and is considered a bearish pattern during an uptrend. Similarly, a Shooting Star 175 can be a black or a white candlestick that has a small body, a long upper wick and a little or no lower wick and is considered a bearish pattern in an uptrend.

A Dragonfly Doji 180 is formed when the opening and the closing prices are at the highest of the day. If it has a longer lower wick it signals a more bullish trend. When appearing at market bottoms it is considered to be a reversal signal and a Gravestone Doji 185 is formed when the opening and closing prices are at the lowest of the day. If it has a longer upper wick it signals a bearish trend. When it appears at market top it is considered a reversal signal. Lastly, a Long-Legged Doji 190 consists of a Doji with very long upper and lower wicks indicating strong forces balanced in opposition and possible market indecision. Nearly all candlestick patterns fall into three broad categories, namely bull, bear, and doji categories. There can be a price gap between adjacent candlesticks which occurs when the high and low price range of the first candlestick does not overlap with the high and low price of the second candlestick.

Both price bars and candlestick wicks are displayed along a centerline of a vertical axis to show the high and low price range of a given time period and does not offer more specific information as to when the high price and low price occurred during that given time period. Although an improvement is disclosed in U.S. Pat. No. 7,844,487 issued on Nov. 30, 2010 by Chapman, entitled, "Computer-implemented method for displaying price and value extremes" by adding angled tips to the top and bottom of a price bar to serve as additional visual indicators that show which of the high price and low price came first, such teaching relies on adding additional graphical information and remains silent on displaying more precisely when the high price and low price had occurred in a given time period.

U.S. Patent Application 20040267654 filed on Jun. 26, 2003 by Peng, et al., entitled, "Candlestick and bar charts" similarly discloses the addition of new graphical elements in the form of one or more dotted horizontal lines that yield more information as to price direction near the open and/or close price but is silent as to offering any new information regarding when either the high and low price occurred. Though U.S. Pat. No. 7,356,501 issued on Apr. 8, 2008 by Churquina entitled, "Integrated price and volume display of market traded securities using price-volume bars" does not rely on displaying volume bar separately underneath the candlestick and teaches how to change the shape of the candlestick to reflect the distribution of volume per price range along the Y-axis, it is silent with respect to the distribution of volume per time range along the X-axis.

To date, all known charting programs from trading software, banks, brokers, independents, and third parties similarly dynamically update a current candlestick for display in a candlestick chart during price changes throughout a given time period of the candlestick by rendering and displaying the same full fixed width of the candlestick while updating the height of the body and wicks along the centerline according to each price change leaving a user without any sense of when the time period ends and left waiting to only then view the final candlestick upon learning of the close price for that time period. Analogously, the same holds true for OHLC and HLC price bars where the vertical line depicting the high price and low price remains though changing in height remains static in the same vertical position throughout the time period. The speculative reason for this is that it appears all charting engines and modules are configured to receive market data in the form of OHLC data which does not specify when the high price or low price has occurred during the time period.

Prior art candlesticks are inaccurately drawn due to chart libraries coded to draw a single high price-low price vertical line and then draw a candle body symmetrically atop of the vertical line. The art is silent regarding drawing separate vertical lines to create a separate upper wick and lower wick. Further, the time axis label indicating the start of a time period is inaccurately drawn directly under the high price-low price vertical line. The drawing of the vertical line is indicative of treating it is a single wick, which has set the stage for decades now of developers, users, and the public at large to fail to even recognize that there are much more visually accurate ways to represent the reality of price fluctuations during a given time period.

Accordingly, in light of the above, there is a strong need in the art for systems, methods, and devices to overcome this lack of more specific information and provide a user with more timely and more visually accurate charting information during a given time period.

SUMMARY OF THE INVENTION

The present invention enables more specific information to help a user understand more clearly when a high price and low price occurred during a time period without adding any additional visual indicators. The present invention provides a widening body of a candlestick proportional to the percentage of traversal of the time period. The present invention enables for the replacement of conventional candlesticks with enhanced candlesticks. The present invention enables enhanced OHLC data to assist a user with research, analysis, and back-testing with historical data to visualize enhanced candlestick chart data over longer time periods of years or even decades. The present invention provides enhanced OHLC and HLC bar charts that include a separate upper price bar and lower price bar instead of a conventional centerline high-low price bar and further include an open-close bar and close bar respectively that can widen proportional to the percentage of traversal of the time period. The present invention provides a tilting of a centerline high-low price bar of a candlestick or OHLC bar to determine whether the high price or low price occurred first in the time period as well of the tilting or shifting of either upper and lower wicks or upper and lower price bars as alternate ways to visually depict such distinction without relying upon the overlaying of any graphical elements or other visual indicators. The present invention enables for generation of new alternate HLC and OHLC type price symbols such as the two intersecting lines symbol that represents the intersection of an open-close price line and a high-low price line or a quadrilateral drawn with the open price, high price, low price, close price as vertices.

The present invention provides a candlestick having multiple upper wicks and multiple lower wicks connected to a candle body that can be generated and displayed. The present invention provides a demarcation indicator that enables a user to visually see what portion of the current time period has lapsed and how much time in the current time period remains. The present invention enables the magnification of symbol width of a current or recent symbol so that older symbols remain smaller thereby increasing the number of symbols displayed on a screen, which is helpful on mobile and smartphone devices. The present invention enables a user to select an intra-time period resolution value which increases accuracy of approximate upper and lower wick positions along a symbol body width.

The present invention enables for the calculating and updating of the highest symbol position value, the lowest symbol position value, and the symbol partial-width value as prices fluctuate during the course of a time period as well as the storing of such data values into an enhanced OHLC data structure. The present invention enables ghost price range symbols to be generated and displayed (dimmed to distinguish from actual symbols) to provide more price chart continuity estimating last price in the event of illiquid stocks or options pricing that have infrequent last price data updates. The present invention enables a user to receive news, advertisements, estimated pricing and other context sensitive content displayed in the empty time gaps during closed markets whether overnight, the weekend or holidays.

In general, in accordance with the present invention a computer-implemented method for displaying to a user a candlestick representative of a price range during at least a portion of a time period that includes a plurality of intra-time periods, the method includes receiving a OHLC (open, high, low, close) data of a first intra-time period of the plurality of intra-time periods and a OHLC data of a second intra-time period of the plurality of intra-time periods, a charting engine generating a candle body from an open price of the first intra-time period and a close price of the second intra-time period, determining a highest intra-time period having a highest price from each high price of each of the first and second intra-time periods and a lowest intra-time period having a lowest price from each low price of each of the first and second intra-time periods, the charting engine generating at least one of an upper wick and lower wick, a bottom of the upper wick being connected to a top of the candle body above the determined highest intra-time period and a top of the lower wick being connected to a bottom of the candle body below the determined lowest intra-time period, and the charting engine displaying the candlestick including the candle body and the at least one of the upper wick and lower wick, where the candlestick visually depicts and enables the user to see relative to a width of the candle body, the respective times when the highest price and the lowest price have occurred during the at least a portion of the time period.

In accordance with an aspect of the present invention, a computer-implemented method for displaying to a user a HLC (high, low, close) symbol representative of a price range during at least a portion of a time period including a plurality of intra-time periods, the method includes receiving a HLC data of a first intra-time period of a plurality of intra-time periods and a HLC data of a second intra-time period of a plurality of intra-time periods, a charting engine generating a horizontal close price bar at a close price of the second intra-time period, the close price bar spanning across the first intra-time period and the second intra-time period, determining a highest intra-time period having a highest price from each high price of each of the first and second intra-time periods and determining a lowest intra-time period having a lowest price from each low price of each of the first and second intra-time periods, the charting engine generating at least one of an upper price bar and lower price bar, a bottom of the upper price bar being connected to a top of the close price bar above the highest intra-time period and a top of the lower price bar being connected to a bottom of the close price bar below the lowest intra-time period, and the charting engine displaying the HLC symbol which includes the close price bar and the at least one of the upper price bar and lower price bar, where the HLC symbol visually depicts and enables the user to see relative to a width of the close bar, the respective times when the highest price and the lowest price have occurred during the at least a portion of the time period.

In accordance with another aspect of the present invention, a computer-implemented method for displaying to a user a OHLC (open, high, low, close) symbol representative of a price range during at least a portion of a time period including a plurality of intra-time periods, the method includes receiving a OHLC data of a first intra-time period of a plurality of intra-time periods and a OHLC data of a second intra-time period of a plurality of intra-time periods, a charting engine generating an open-close price bar drawn from an open price of the first intra-time period and a close price of the second intra-time period, determining a highest intra-time period having a highest price from each high price of each of the first and second intra-time periods and a lowest intra-time period having a lowest price from each low price of each of the first and second intra-time periods, the charting engine generating at least one of an upper price bar and lower price bar, a bottom of the upper price bar being connected to a top of the open-close price bar above the determined highest intra-time period and a top of the lower price bar being connected to a bottom of the open-close price bar below the determined lowest intra-time period, and the charting engine displaying the OHLC symbol including the open-close price bar and the at least one of the upper price bar and lower price bar, where the OHLC symbol visually depicts and enables the user to see relative to a width of the open-close bar, the respective times when the highest price and the lowest price have occurred during the at least a portion of the time period.

In accordance with an aspect of the present invention, a computer-implemented method for displaying to a user a OHLC (open, high, low, close) price symbol representative of a price range during a time period, the method includes generating the OHLC price symbol as a quadrilateral including a first vertex representative of an open price at a start of the time period, a second vertex representative of a high price at a first time during the time period, a third vertex representative of a low price at a second time during the time period, and a fourth vertex representative of a close price at an end of the time period, and displaying the OHLC price symbol to the user.

In accordance with another aspect of the present invention, a computer-implemented method for displaying to a user a HLC (high, low, close) price symbol representative of a price range during a time period, the method includes generating the HLC price symbol as a triangle including a first vertex representative of a high price at a first time during the time period, a second vertex of a low price at a second time during the time period, and a third vertex representative of a close price at an end of the time period, and displaying the HLC price symbol to the user.

In accordance with an aspect of the present invention, a computer-implemented method for displaying to a user a OHLC (open, high, low, close) bar representative of a price range during a time period includes a charting engine generating and displaying an open-close price line drawn from an open price to a close price of the time period and the charting engine generating and displaying a high-low price line intersecting the open-close price line wherein the high-low price line is drawn from a high price at a first time during the time period to a low price at a second time during the time period.

In accordance with another aspect of the present invention, a computer-implemented method for displaying to a user a OHLC (open, high, low, close) bar representative of a price range during a time period includes determining whether a low price during the time period occurred before a high price during the time period, a charting engine generating and displaying (1) an open-high price line drawn from an open price at a start of the time period to a high price at a first time of the time period, (2) a high-low price line drawn from the high price at the first time during the time period to a low price at a second time during the time period, and a low-close price line drawn from the low price at the second time during the time period to the close price at an end of the time period when determining that the low price occurred after the high price, and the charting engine generating and displaying an (1) open-low price line drawn from the open price at the start of the time period to the low price at the second time of the time period, (2) a low-high price line drawn from the low price at the second time during the time period to the high price at the first time during the time period, and a (3) high-close price line drawn from the high price at the first time during the time period to the close price at the end of the time period when determining that the low price occurred before the high price.

In accordance with an aspect of the present invention, a computer-implemented method for displaying to a user an OHLC (open, high, low, close) bar representative of a price range during a time period includes determining whether a low price during the time period occurred before the high price during the time period, a charting engine generating and displaying (1) an open price line drawn horizontally from an open price at a start of the time period to perpendicularly connect with a bottom of a vertically drawn high price line of a high price at a first time of the time period and (2) a close price line drawn horizontally from a close price at an end of the time period to perpendicularly connect with a top of a vertically drawn low price line of a low price at a second time of the time period, when determining that the low price occurred after the high price, and the charting engine generating and displaying (1) the open price line drawn horizontally from the open price at the start of the time period to perpendicularly connect with a top of a vertically drawn low price line of the low price at the second time of the time period and (2) the close price line drawn horizontally from the close price at the end of the time period to perpendicularly connect with a bottom of a vertically drawn high price line of the high price at the first time of the time period, when determining that the low price occurred before the high price.

In accordance with another aspect of the present invention a computer-implemented method for displaying to a user a price range of a market traded asset during a time period, the method includes a charting engine displaying a price bar, the price bar having a width representative of the time period, generating an upper price bar and lower price bar, the upper price bar having a height representative of a highest price occurring at a first time during the time period and the lower price bar having a height representative of a lowest price occurring at a second time during the time period, connecting a bottom of the upper price bar to a top of the price bar at a first connection point, the first connection point dividing the top of the price bar into a first top part and a second top part where a ratio between the first top part and the top of the price bar corresponds to a ratio between the first time and the time period and connecting a top of the lower price bar to a bottom of the price bar at a second connection point, the second connection point dividing the bottom of the price bar into a first bottom part and a second bottom part where a ratio between the first bottom part and the bottom of the price bar corresponds to a ratio between the second time and the time period, and the charting engine displaying the price bar, the upper price bar, and the lower price bar, which visually depict and enable the user to see relative to the price bar, respective times when the highest price and the lowest price have occurred during the time period.

In accordance with an aspect of the present invention, a computer-implemented method for displaying, to a user, a HLC (high, low, close) bar representative of a price range of a market traded asset during a time period including a plurality of intra-time periods, the method includes a charting engine displaying a first vertical line having a height representative of a difference between a first high price and a first low price, determined from HLC data of a first intra-time period having a first close price, the charting engine displaying a second vertical line adjacent to the first vertical line, the second vertical line having a height representative of a difference between a second high price and a second low price, determined from HLC data of a second intra-time period having a second close price, determining a highest intra-time period having a highest price from among each high price of each of the plurality of intra-time periods and determining a lowest intra-time period having a lowest price from among each low price of each of the plurality of intra-time periods, generating the HLC bar including a horizontal close bar and an upper bar and lower bar by removing all portions of all vertical lines above and below the second close price from all intra-time periods other than above the second close price of the determined highest intra-time period and below the second close price of the determined lowest intra-time period, and the charting engine displaying the generated HLC bar, wherein the generated HLC bar visually depicts and enables the user to see relative to the horizontal close bar, respective times when the highest price and the lowest price have occurred during the time period.

In accordance with another aspect of the present invention, a computer-implemented method for displaying, to a user, an OHLC (open, high, low, close) bar representative of a price range during a time period including a plurality of intra-time periods, the method includes a charting engine displaying a first vertical line having a height representative of a difference between a first high price and first low price, determined from an OHLC (open, high, low, close) data of a first intra-time period, the charting engine displaying a second vertical line adjacent to the first vertical line, the second vertical line having a height representative of a difference between a second high price and second low price, determined from an OHLC data of a second intra-time period having a close price, determining a highest intra-time period having a highest price from each high price of each of the first and second intra-time periods and determining a lowest intra-time period having a lowest price from each low price of each of the first and second intra-time periods, generating an open-close line from an open price of the time period and the close price of the second intra-time period, and the charting engine generating and displaying the OHLC bar by displaying the open-close line overlayed upon the first vertical line and the second vertical line and generating at least one of an upper bar and lower bar by removing all portions of all vertical lines above and below the open-close line from all of the plurality of intra-time periods other than above the open-close line of the determined highest intra-time period and below the open-close line of the determined lowest intra-time period, wherein the OHLC bar visually depicts and enables the user to see relative to the open-close line, respective times when the upper bar and the lower bar have occurred during the time period.

In accordance with an aspect of the present invention, a computer-implemented method for displaying a candlestick representative of a price range of a market traded security during a time period having a plurality of intra-time periods includes a charting engine displaying a first vertical line having a height representative of a range between a first high price and first low price from a OHLC data of a first intra-time period, the charting engine displaying a second vertical line adjacent to the first vertical line, the second vertical line having a height representative of a range between a second high price and second low price from a OHLC data of a second intra-time period, generating a body from an open price of the time period and a close price of the second intra-time period, determining a highest intra-time period having a highest price from each high price of each intra-time period and a lowest intra-time period having a lowest price from each low price of each intra-time period, and the charting engine generating and displaying the candlestick by displaying the body overlayed upon the first vertical line and the second vertical line and generating at least one of an upper wick and lower wick by removing all portions of all vertical lines outside of the body from all intra-time periods other than above the body from the highest intra-time period and below the body of the lowest intra-time period.

In accordance with another aspect of the present invention, a computer implemented method for displaying a candlestick representative of a price range of a market traded security during a time period includes calculating a size of a body of the candlestick, the body having a width and height where the width is representative of the time period and the height is representative of a range between an open price and a close price during the time period, calculating a size of at least one of an upper wick and lower wick of the candlestick, the upper wick having a height representative of a high price at a first time during the time period and the lower wick having a height representative of a low price at a second time during the time period, a charting engine generating the candlestick by connecting a bottom of the upper wick substantially perpendicular to a top of the body, the connection dividing the top of the body into a first top part and a second top part where the ratio between the first top part and the top of the body corresponds to the ratio between the first time and the time period and connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and displaying the candlestick.

In accordance with an aspect of the present invention, a computer-implemented method includes modifying a display of a candlestick representative of a price range of a market traded security during a time period where the candlestick includes a body and at least one of an upper wick and lower wick, the body having a width and height where the width is representative of the time period and the height is representative of a range between an open price and a close price during the time period, the upper wick having an upper center line projecting from a top of the body having a height representative of a high price at a first time during the time period and the lower wick having a lower center line projecting from a bottom of the body having a height representative of a low price at a second time during the time period, the method includes by a charting engine generating a modified candlestick by moving the upper wick from the centerline to a connection point substantially perpendicular to the top of the body, the connection point dividing the top of the body into a first top part and a second top part where the ratio between the first top part and the top of the body corresponds to the ratio between the first time and the time period and moving the lower wick from the centerline to a connection point substantially perpendicular to the bottom of the body, the connection point dividing the bottom of the body into a first bottom part and a second bottom part where the ratio between the first bottom part and the bottom of the body corresponds to the ratio between the second time and the time period, and the charting engine displaying the modified candlestick.

In accordance with another aspect of the present invention, a computer-implemented method for displaying, to a user, a display of a modified candlestick representative of a price range during a time period wherein a candlestick includes a body and at least one of an upper wick and lower wick, the body having a width and height wherein the width is representative of the time period and the height is representative of a difference between an open price and a close price during the time period, the upper wick having an upper center line projecting from a top of the body having a height representative of a high price at a first time during the time period and the lower wick having a lower center line projecting from a bottom of the body having a height representative of a low price at a second time during the time period, the method includes determining whether the low price occurred before the high price during the time period, a charting engine generating the modified candlestick by one of a (1) at least one of a moving the upper wick to a right of the upper center line to a connection point substantially perpendicular to the top of the body and moving the lower wick to a left of the lower center line to a connection point substantially perpendicular to the bottom of the body when determining that the low price occurred before the high price, and (2) at least one of moving the upper wick to the left of the upper center line to a connection point substantially perpendicular to the top of the body and moving the lower wick to the right of the lower center line to a connection point substantially perpendicular to the bottom of the body when determining that the low price occurred after the high price, and the charting engine displaying the modified candlestick, which visually depicts to the user whether the low price occurred before or after the high price during the time period.

In accordance with an aspect of the present invention, a computer-implemented method for displaying, to a user, a display of a modified candlestick representative of a price range of a market traded asset during a time period wherein the candlestick includes a body and at least one of an upper wick and lower wick, the body having a width and height wherein the width is representative of the time period and the height is representative of a difference between an open price and a close price during the time period, the upper wick having an upper center line projecting from a top of the body having a height representative of a high price at a first time during the time period and the lower wick having a lower center line projecting from a bottom of the body having a height representative of a low price at a second time during the time period, the method includes determining whether the low price occurred before the high price during the time period, a charting engine generating the modified candlestick by one of (1) at least one of tilting a top of the upper wick clockwise from a pivot on the upper center line and tilting a bottom of the lower wick clockwise from a pivot on the lower center line, when determining that the low price occurred before the high price, and (2) at least one of a tilting a top of the upper wick counter-clockwise from the pivot on the upper center line and tilting a bottom of the lower wick counter-clockwise from a pivot on the lower center line when determining that the low price occurred after the high price, and the charting engine displaying the modified candlestick, which visually depicts to the user whether the low price occurred before or after the high price during the time period.

In accordance with another aspect of the present invention, a computer-implemented method for displaying, to a user, a display of a modified OHLC (open, high, low, last) price bar representative of a price range during a time period wherein an OHLC price bar includes a vertical price bar having a center point and a height representative of a difference between a high price and low price during the time period, the method includes determining whether the low price occurred before the high price during the time period, a charting engine generating the modified OHLC price bar by one of (1) tilting the vertical price bar clockwise from the center point of the vertical price bar, when determining that the low price occurred before the high price and (2) tilting the vertical price bar counter-clockwise from the center-point of the vertical price bar, when determining that the low price occurred after the high price, and the charting engine displaying the modified OHLC price bar, which visually depicts to the user, whether the low price occurred before or after the high price during the time period.

In accordance with an aspect of the present invention, a method of displaying, to a user, a symbol representative of changes in a price of an asset during a time period, the method includes receiving a plurality of prices, each price occurring at a different corresponding time, determining, from the received plurality of the prices, an open price occurring at an initial time and a last price occurring at a last time, the time period extending from the initial time to the last time, determining, from the received plurality of prices, a highest price occurring at a first time within the time period and a lowest price occurring at a second time within the time period, generating, by a charting engine, a symbol, based on the open price, the last price, the highest price, and the lowest price, and displaying, by the charting engine, the symbol, which includes a first indicator indicating the first time corresponding to the highest price and a second indicator indicating the second time corresponding to the lowest price.

In accordance with another aspect of the present invention, a method of displaying, to a user, a symbol representative of changes in a price of an asset during a time period, the method includes receiving a plurality of prices, each price occurring at a different corresponding time, determining, from the received plurality of the prices, an open price occurring at an initial time and a last price occurring at a last time, the time period extending from the initial time to the last time, determining, from the received plurality of prices, a highest price occurring at a first time within the time period and a lowest price occurring at a second time within the time period, generating, by a charting engine, a candle body from the open price and the last price, wherein a height of the candle body indicates a difference between the open price and the last price, and a width of the candle body indicates a difference between the last time and the initial time, generating, by the charting engine, an upper wick and a lower wick based on the open price, the last price, the highest price, and the lowest price, and displaying, by the charting engine, the symbol, which includes the candle body, the upper wick, and the lower wick, wherein the upper wick extends from an upper surface of the candle body at a first point corresponding to the first time and the lower wick extends from a lower surface of the candle body at a second point corresponding to the second time.

In accordance with an aspect of the present invention, a method of displaying, to a user, a symbol representative of changes in a price of an asset during a time period, the method includes receiving a plurality of prices, each price occurring at a different corresponding time, determining, from the received plurality of the prices, an open price occurring at an initial time and a last price occurring at a last time, the time period extending from the initial time to the last time, determining, from the received plurality of prices, a highest price occurring at a particular time within the time period, generating, by a charting engine, a candle body from the open price and the last price, wherein a height of the candle body indicates a difference between the open price and the last price, and a width of the candle body indicates a difference between the last time and the initial time, generating, by the charting engine, an upper wick based on the open price, the last price, and the highest price, and displaying, by the charting engine, the symbol, which includes the candle body and the upper wick, wherein the upper wick extends from an upper surface of the candle body at a particular point corresponding to the particular time.

In accordance with another aspect of the present invention, a method of displaying, to a user, a symbol representative of changes in a price of an asset during a time period, the method includes receiving a plurality of prices, each price occurring at a different corresponding time, determining, from the received plurality of the prices, an open price occurring at an initial time and a last price occurring at a last time, the time period extending from the initial time to the last time, determining, from the received plurality of prices, a lowest price occurring at a particular time within the time period, generating, by a charting engine, a candle body from the open price and the last price, wherein a height of the candle body indicates a difference between the open price and the last price, and a width of the candle body indicates a difference between the last time and the initial time, generating, by the charting engine, a lower wick based on the open price, the last price, and the lowest price, and displaying, by the charting engine, the symbol, which includes the candle body and the lower wick, the lower wick extends from a lower surface of the candle body at a particular point corresponding to the particular time.

In accordance with an aspect of the present invention, a method of displaying, to a user, a symbol representative of changes in a price of an asset during a time period, the method includes receiving, for each intra-time period of a plurality of intra-time periods in the time period, intra-time price data including an intra-time open price, an intra-time high price, an intra-time low price, and an intra-time close price corresponding to the intra-time period, determining, from the received intra-time price data for the plurality of intra-time periods, an open price, which is an intra-time open price of an initial intra-time period of the plurality of intra-time periods, determining, from the received intra-time price data for the plurality of intra-time periods, a close price, which is an intra-time close price of a last intra-time period of the plurality of intra-time periods, determining, from the intra-time high price of each of the plurality of intra-time periods, a highest price occurring within a first intra-time period of the plurality of intra-time periods, determining, from the intra-time low price of each of the plurality of intra-time periods, a lowest price occurring within a second intra-time period of the plurality of intra-time periods, generating, by a charting engine, a candle body from the open price and the close price, wherein a height of the candle body indicates a difference between the open price and the close price, and a width of the candle body indicates a difference between a start time of the time period and an end time of the time period, generating, by the charting engine, an upper wick and a lower wick based on the open price, the close price, the highest price, and the lowest price, and displaying, by the charting engine, the symbol, which includes the candle body, the upper wick, and the lower wick, wherein the upper wick extends from an upper surface of the candle body at a first point corresponding to the first intra-time period and the lower wick extends from a lower surface of the candle body at a second point corresponding to the second intra-time period.

In accordance with another aspect of the present invention, a computer-implemented method for displaying a candlestick type symbol representative of a price range during a time period wherein an open price occurred at a start of the time period, a highest price occurred at a first time within the time period, and a lowest price occurred at a second time within the time period, the method includes receiving a second-most highest price that occurred at a third time within the time period and a second-least lowest price that occurred at a fourth time within the time period wherein the second-most highest price is lower than the highest price and the second-least lowest price is higher than the lowest price, receiving a last price that occurred at a fifth time within the time period, wherein the last price is lower than the second-most highest price and higher than the second-least lowest price, determining whether the last price is greater than or less than the open price, generating, by a charting engine, a candle body from the open price and the last price, wherein a height of the candle body indicates a difference between the open price and the last price and a width of the candle body indicates a difference between the start of the time period and the fifth time within the time period, generating, by the charting engine, a plurality of upper wicks and a plurality of lower wicks, including a first upper wick having a height that indicates a difference between the highest price and the last price, a first lower wick having a height that indicates a difference between the lowest price and the open price, a second upper wick having a height that indicates a difference between the second-most highest price and the last price, and a second lower wick having a height that indicates a difference between the second-least lowest price and the open price, in response to determining that the last price is greater than the open price, generating, by the charting engine, the plurality of upper wicks and the plurality of lower wicks, including the first upper wick having a height that indicates a difference between the highest price and the open price, the first lower wick having a height that indicates a difference between the lowest price and the last price, the second upper wick having a height that indicates a difference between the second-most highest price and the open price, and the second lower wick having a height that indicates a difference between the second-least lowest price and the last price, in response to determining that the last price is less than the open price, and displaying, by the charting engine, a candlestick type symbol, which includes the candle body, the plurality of the upper wicks, and the plurality of lower wicks.

In accordance with an aspect of the present invention, a computer-implemented method for displaying a candlestick representative of a price range during a time period that includes a plurality of intra-time periods, the method includes receiving OHLC (open, high, low, close) data for each intra-time period of the plurality of intra-time periods, generating, by a charting engine, a candle body from an open price of a first intra-time period of the plurality of intra-time periods to a close price of a last intra-time period of the plurality of intra-time periods, based on the received OHLC data, determining all upper wick intra-time periods from which intra-time periods of the plurality of intra-time periods have an intra-time high price greater than the open price of the first intra-time period and greater than the close price of the last intra-time period, determining all lower wick intra-time periods from which intra-time periods of the plurality of intra-time periods have an intra-time low price lower than the open price of the first intra-time period and lower than the close price of the last intra-time period, generating, by the charting engine, an upper wick for each upper wick intra-time period and a lower wick for each lower wick intra-time period, a bottom of each upper wick being connected to a top of the candle body within each upper wick intra-time period, and a top of each lower wick being connected to a bottom of the candle body within each lower wick intra-time period, and displaying, by the charting engine, the candlestick including the candle body and at least one of the generated upper wicks and the generated lower wicks.

In accordance with another aspect of the present invention, a method of displaying an HLL (high, low, last) type symbol representative of changes in price during a time period in which a highest price occurred at a first time within the time period, a lowest price occurred at a second time within the time period, a last price occurred at a third time within the time period, and the third time occurred before an end of the time period, the method includes generating, by a charting engine, a demarcation indicator and the HLL type symbol by drawing a spatiotemporal relationship between the highest price, the lowest price, and the last price in accordance with a selected symbol rendering method, wherein a width of the HLL type symbol indicates a difference between the third time and an earlier of when the highest price occurred and when the lowest price occurred, and displaying, by the charting engine, the generated HLL type symbol and displaying the generated demarcation indicator adjacent to the right of the generated HLL type symbol, the demarcation indicator positioned at the end time of the time period wherein a width between a right most surface of the HLL type symbol and the demarcation indicator is a difference between the third time and the end of the time period.

In accordance with an aspect of the present invention, a method of displaying a plurality of OHLC (open, high, low, close) type symbols, each symbol having a prior time period of equal duration and a current OHLL (open, high, low, last) type symbol representative of changes in price during a current time period of equal duration to the prior time period in which an open price occurred at a start of the current time period, a highest price occurred at a first time within the current time period, a lowest price occurred at a second time within the current time period, and a last price occurred at a third time within the current time period, the method includes generating and displaying, by a charting engine, a first portion of the OHLC type symbols, which have a first fixed width corresponding to the prior time period, and generating and displaying a second portion of the OHLC type symbols, which have a second fixed width corresponding to the prior time period, wherein the second fixed width is wider than the first fixed width, generating, by the charting engine, the current OHLL type symbol by drawing a spatiotemporal relationship between the open price, the highest price, the lowest price, and the last price in accordance with a selected symbol rendering method, wherein a height of the current OHLL symbol indicates a difference between the highest price and the lowest price and a width of the current OHLL symbol indicates a difference between the start of the current time period and the third time, and a difference between the start of the current time period and an end of the current time period is equal to the second fixed width, and displaying, by the charting engine, the generated current OHLL type symbol adjacent to the plurality of displayed OHLC type symbols.

In accordance with another aspect of the present invention, a method of displaying an OHLL (open, high, low, last) type symbol representative of changes in price during a time period in which an open price occurred at a start of the time period, a highest price occurred at a first time within the time period, a lowest price occurred at a second time within the time period, a last price occurred at a third time within the time period and the third time occurred before an end of the time period, the method includes generating, by a charting engine, the OHLL type symbol by drawing a spatiotemporal relationship between the open price, the highest price, the lowest price, and the last price in accordance with a selected symbol rendering method, wherein a height of the OHLL type symbol indicates a difference between the highest price and the lowest price, a width of the OHLL type symbol indicates a difference between the start of the time period and the third time, a width between the highest price and the lowest price indicates a difference between the first time and the second time, and displaying, by the charting engine, the generated OHLL type symbol.

In accordance with an aspect of the present invention, a method of displaying an HLL (high, low, last) type symbol representative of changes in price during a time period in which a highest price occurred at a first time within the time period, and a lowest price occurred at a second time within the time period, the method includes receiving a last price corresponding to a third time within the time period wherein it is determined that the received last price is lower than the highest price and higher than the lowest price and the third time occurred before an end of the time period, in response to determining that the received last price is lower than the highest price and higher than the lowest price, generating, by a charting engine, the HLL type symbol by drawing a spatiotemporal relationship between the highest price, the lowest price, and the last price in accordance with a selected symbol rendering method, wherein a height of the HLL type symbol indicates a difference between the highest price and the lowest price, a width of the HLL type symbol indicates a difference between the third time and an earlier of the first time and the second time, and a width between the highest price and the lowest price indicates a difference between the first time and the second time, and displaying, by the charting engine, the generated HLL type symbol.

In accordance with an aspect of the present invention, a method of displaying an HLL (high, low, last) type symbol representative of changes in price during a time period in which a highest price occurred at a first time within the time period, and a lowest price occurred at a second time within the time period, the method includes receiving a last price corresponding to a third time within the time period, comparing the last price to the highest price and the lowest price, in response to the comparing step, updating the highest price with the last price and updating the highest price to correspond to the third time if the last price is greater than or equal to the highest price and updating the lowest price with the last price and updating the lowest price to correspond to the third time if the last price is less than or equal to the lowest price, generating, by a charting engine, the HLL type symbol by drawing a spatiotemporal relationship between the highest price, the lowest price, and the last price in accordance with a selected symbol rendering method, wherein a height of the HLL type symbol indicates a difference between the highest price and the lowest price and a width of the HLL type symbol indicates a difference between the third time and an earlier of when the highest price occurred and the lowest price occurred, and displaying, by the charting engine, the generated HLL type symbol at a particular position.

In accordance with another aspect of the present invention, a method for generating a data structure, the data structure being used to generate an HLC or OHLC type symbol, the method includes receiving a plurality of prices, each price corresponding to a unique time within a time period, determining, from the received plurality of the prices, an open price corresponding to a start of the time period, a highest price corresponding to a first time within the time period, a lowest price corresponding to a second time within the time period, and a close price corresponding to an end of the time period, calculating a highest symbol position value indicating when the first time occurred between the start of the time period and the end of the time period, calculating a lowest symbol position value indicating when the second time occurred between the start of the time period and the end of the time period, and storing the time period, the open price, the highest price, the lowest price, the close price, the highest symbol position value, and the lowest symbol position value in association with one another in the data structure on a non-transitory computer readable medium.

In accordance with an aspect of the present invention, a method for generating a data structure, the data structure being used to generate an HLL or OHLL type symbol, the method includes receiving a plurality of prices, each price corresponding to a unique time within a time period, determining, from the received plurality of the prices, an open price corresponding to a start of the time period, a highest price corresponding to a first time within the time period, a lowest price corresponding to a second time within the time period, and a last price corresponding to a third time within the time period, calculating a highest symbol position value indicating when the first time occurred between the start of the time period and the end of the time period, calculating a lowest symbol position value indicating when the second time occurred between the start of the time period and the end of the time period, calculating a symbol partial-width value indicating when the third time occurred between the start of the time period and the end of the time period, and storing the time period, the open price, the highest price, the lowest price, the last price, the highest symbol position value, the lowest symbol position value, and the symbol partial-width value in association with one another in the data structure on a non-transitory computer readable medium.

In accordance with another aspect of the present invention, a method for generating a data structure, the data structure being used to generate an HLC or OHLC type symbol, the method includes receiving a plurality of OHLC data, each piece of the OHLC data corresponding to a unique intra-time period within a time period, determining, from the received plurality of the OHLC data, an open price corresponding to a start of the time period, a highest price corresponding to a first intra-time period, a lowest price corresponding to a second intra-time period, and a close price corresponding to an end of the time period, calculating a highest symbol position value indicating when the first intra-time period occurred between the start of the time period and the end of the time period, calculating a lowest symbol position value indicating when the second intra-time period occurred between the start of the time period and the end of the time period, and storing the time period, the open price, the highest price, the lowest price, the close price, the highest symbol position value, and the lowest symbol position value in association with one another in the data structure on a non-transitory computer readable medium.

In accordance with an aspect of the present invention, an apparatus includes processing circuitry configured to receive, from a requestor, a request to obtain OHLC data representative of a time period, access, for each intra-time period of a plurality of intra-time periods in the time period, intra-time price data including an intra-time open price, an intra-time high price, an intra-time low price, and an intra-time close price corresponding to the intra-time period, determine, from the accessed intra-time price data for the plurality of intra-time periods, an open price, which is an intra-time open price of an initial intra-time period of the plurality of intra-time periods and a close price, which is an intra-time close price of a last intra-time period of the plurality of intra-time periods, determine, from the intra-time high price of each of the plurality of intra-time periods, a highest price occurring within a first intra-time period of the plurality of intra-time periods and from the intra-time low price of each of the plurality of intra-time periods, a lowest price occurring within a second intra-time period of the plurality of intra-time periods, generate a first normalization value indicative of a positional relationship between the first intra-time period and the time period and a second normalization value indicative of a positional relationship between the second intra-time period and the time period, and send, to the requestor, a response including the determined open price, the determined highest price, the determined lowest price, the determined close price, the generated first normalization value, and the generated second normalization value.

In accordance with an aspect of the present invention, a method of displaying a symbol representative of changes in price during a time period in which a highest price occurred at a first time within the time period, a lowest price occurred at a second time within the time period, and a last price occurred at a third time within the time period, in which the last price is lower than the highest price and higher than the lowest price, the method includes receiving a bid price and an ask price corresponding to a fourth time within the time period, wherein there is no new last price corresponding to the fourth time, determining whether the last price is lower than the bid price or higher than the ask price, in response to the determining that the last price is not lower than the bid price and not higher than the ask price, updating the last price to correspond to the fourth time, and generating, by a charting engine, the symbol by drawing, at a first luminosity level, a spatiotemporal relationship between the highest price, the lowest price, and the last price in accordance with a selected symbol rendering method, in response to the determining that the last price is lower than the bid price or higher than the ask price, generating an estimated last price from the bid price and the ask price, the estimated last price corresponding to the fourth time, and generating, by a charting engine, the symbol by drawing, at a second luminosity level, a spatiotemporal relationship between the highest price, the lowest price, and the estimated last price in accordance with a selected symbol rendering method, and displaying, by the charting engine, the generated symbol at a particular position.

In accordance with another aspect of the present invention, a method of displaying an OHLC (open, high, low, close) type symbol representative of changes in price during a time period, the time period having a first duration T, the method includes receiving an intra-time-period resolution value N, calculating a second duration by dividing T by N, obtaining N rows of OHLC data, wherein each row of the obtained OHLC data is representative of price changes over a time period having the second duration, and displaying at least one OHLC type symbol generated based on the received N rows of OHLC data.

In accordance with an aspect of the present invention, a method for labeling a time period on a time axis of an OHLC or OHLL type symbol, the method includes labeling a start of the time period positioned vertically below a left-most point or surface of the OHLC or OHLL type symbol.

In accordance with another aspect of the present invention, a method for displaying a price chart, the price chart including a plurality of regions, the method includes displaying, by a charting engine, a first region including one or more historical completed price-range-over-time-range-type symbols, displaying, by the charting engine, a second region adjacent to the first region, the second region including a current uncompleted price range-over-an-uncompleted-time-range-type symbol corresponding to an uncompleted time range, and in response to determining that the uncompleted time range has completed, generating and displaying, in the first region, by the charting engine, a new historical completed price-range-over-time-range-type symbol adjacent to the one or more historical completed-price-range-over-time-range-type symbols, and erasing, in the second region, the current uncompleted price-range-over-an-un-completed-time-range-type symbol.

In accordance with an aspect of the present invention, a method of displaying changes in price, the method including determining whether a configuration option to include a display of one or more closed market time gaps is selected, in response to determining that the configuration option to include the display of the one or more closed market time gaps is not selected, displaying a first price range that occurred during a first live open market and displaying a second price range that occurred during a second live open market adjacent to the first price range, wherein the second live open market occurred after the first live open market, and in response to determining that the configuration option to include the display of the one or more closed market time gaps is selected, displaying the first price range that occurred during the first live open market, displaying the closed market time gap including content in accordance with a selected time gap fill method adjacent to the first price range, and displaying the second price range adjacent to the content of the closed market time gap.

In accordance with an aspect of the present invention, an article of manufacture including a non-transitory computer readable medium having instructions stored thereon, the instructions configured to cause a computer to perform operations including one or more a computer implemented methods listed above.

In accordance with another aspect of the present invention, an apparatus includes a memory element of a computer configured to store computer readable instructions in operative association with a processor for the computer configured to read and execute the computer readable instructions stored in the non-transitory computer readable medium listed above.

BRIEF DESCRIPTION OF THE DRAWINGS

FIG. 1-A is a prior art illustration of a bullish OHLC price bar.

FIG. 1-B is a prior art illustration of a bullish candlestick.

FIG. 1-C is a prior art illustration of a bearish candlestick.

FIG. 1-D is a prior art illustration of different types of candlesticks.

FIG. 4-A is a prior art depiction of a portion of a data structure for market data such as time/sales data.

FIG. 4-B is a prior art depiction of a portion of a data structure for market data such as OHLC data.

FIG. 7-A is an illustration of enhanced candlesticks having both an upper wick and lower wick that can be generated in accordance with the present invention.

FIG. 7-B is an illustration of more enhanced candlesticks that can be generated in accordance with the present invention.

FIG. 8-A is a block diagram of a processor used to produce enhanced OHLC data in accordance with the present invention.

FIG. 8-B is a depiction of a portion of a data structure for the enhanced OHLC data in accordance with the present invention.

FIG. 11-A is an illustration of an enhanced HLC price bar that can be generated in accordance with the present invention.

FIG. 11-B is an illustration of enhanced OHLC price bars that can be generated in accordance with the present invention.

FIG. 13-A is an illustration of alternate enhanced candlesticks that can be generated in accordance with the present invention.

FIG. 13-B is an illustration of alternate enhanced OHLC price bars that can be generated in accordance with the present invention.

FIG. 26-A is a flowchart illustrating the steps performed for generating and displaying a price range symbol in accordance with the present invention.

FIG. 26-B is a flowchart illustrating the steps performed for generating and displaying a candlestick in accordance with the present invention.

FIG. 27-A is an illustration of an enhanced candlestick including a plurality of upper and lower wicks that can be generated in accordance with the present invention.

FIG. 27-B is a flowchart illustrating the steps performed for generating and displaying a candlestick including a second upper wick and second lower wick in accordance with the present invention.

FIG. 27-C is a flowchart illustrating the steps performed for generating and displaying a candlestick including a plurality of upper wicks and lower wicks in accordance with the present invention.

FIG. 28-A is a diagram depicting an exemplary configuration settings interface in accordance with the present invention.

FIG. 28-B is a flowchart illustrating the steps performed for generating and displaying an OHLC type symbol from obtained OHLC data in accordance with the present invention.

FIG. 29-A is an illustration of an end of time period demarcation indicator in accordance with the present invention.

FIG. 29-B is an illustration of a price chart including price range symbols with a plurality of fixed widths in accordance with the present invention.

FIG. 29-C is a prior art illustration of a candlestick price chart with time axis labels in the middle of each time period.

FIG. 29-D is an illustration of a candlestick price chart with time axis labels at the start of each time period in accordance with the present invention.

FIG. 29-E is a flowchart illustrating the steps performed for generating and displaying a price chart including a plurality of regions in accordance with the present invention.

FIG. 30-A is a flowchart illustrating the steps performed for generating and displaying a demarcation indicator in accordance with the present invention.

FIG. 30-B is a flowchart illustrating the steps performed for generating and displaying a magnified width of a portion of a plurality of price range symbols in accordance with the present invention.

FIG. 31-A is a flowchart illustrating the steps performed for generating an OHLL type symbol in accordance with the present invention.

FIG. 31-B is a flowchart illustrating the steps performed for generating a ghost symbol in accordance with the present invention.

FIG. 31-C is a flowchart illustrating the steps performed for generating an HLL type symbol in accordance with the present invention.

FIG. 33-A is a flowchart illustrating the steps performed for generating a data structure used to generate a HLC or OHLC type symbol in accordance with the present invention.

FIG. 33-B is a flowchart illustrating the steps performed for generating a data structure used to generate a HLL or OHLL type symbol in accordance with the present invention.

FIG. 33-C is a flowchart illustrating the steps performed for calculating a symbol partial-width value based upon when the last price occurred during a time period in accordance with the present invention.

FIG. 33-D is a flowchart illustrating the steps performed for generating a data structure corresponding to a plurality of intra-time periods used to generate a HLC or OHLC type symbol in accordance with the present invention.

FIG. 35-A is an illustration of a OHLC type price chart including time gaps during a closed market in accordance with the present invention.

FIG. 35-B is a flowchart illustrating the steps performed displaying content within closed market time gaps in accordance with the present invention.

DETAILED DESCRIPTION OF THE INVENTION

Figure 2:
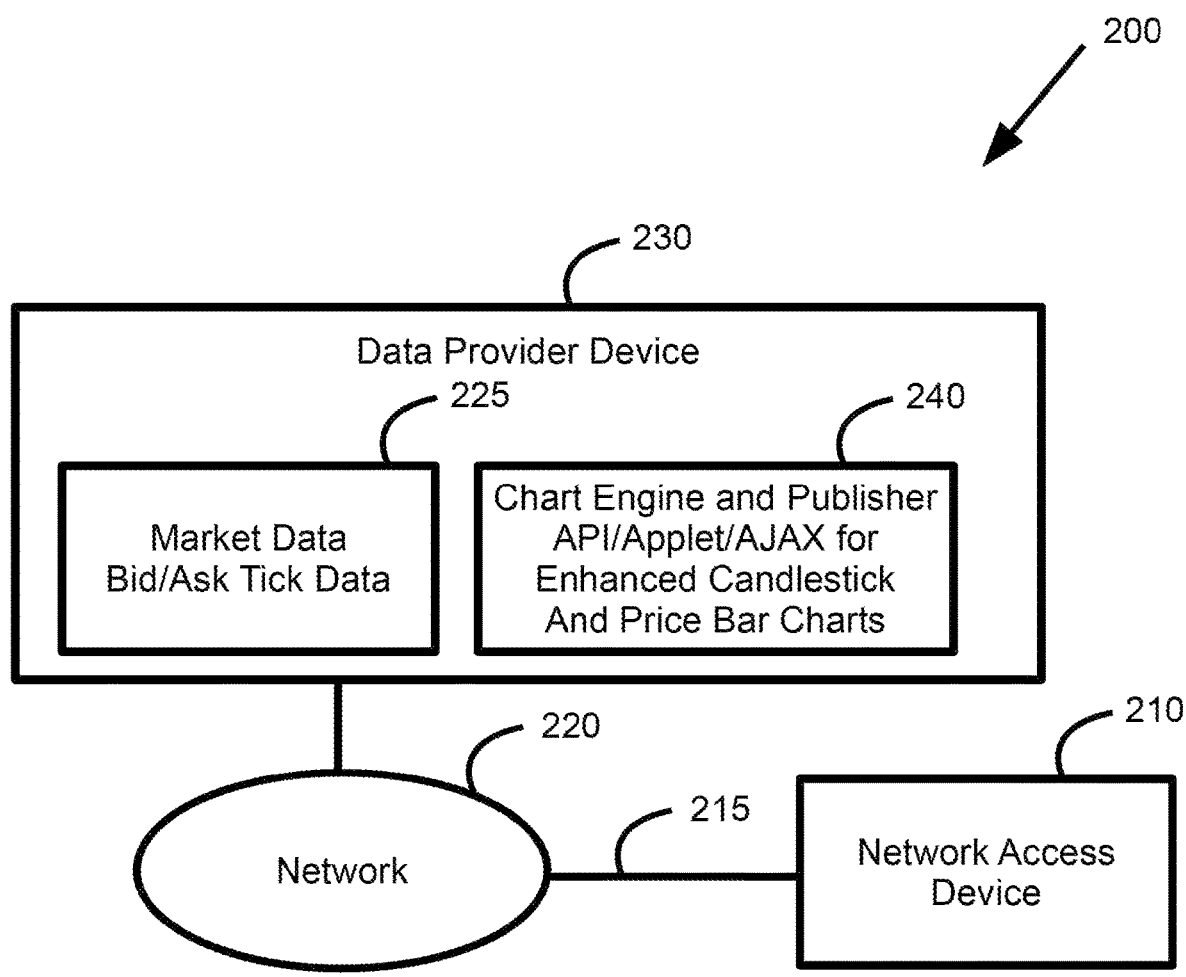
FIG. 2 is a block diagram of an exemplary distributed computer system in accordance with the present invention.

The present invention will now be described with reference to the drawings, wherein like reference numerals are used to refer to like elements throughout.

FIG. 2 illustrates an exemplary system for providing a distributed computer system 200 in accordance with one aspect of the present invention and includes one or more network access devices such as device of a user 210, connected 215 via a network 220. The network 220 may use Internet communications protocols (IP) to allow network access devices 210 communicate with each other to communicate securities, derivatives, and currencies, and digital asset market data 225 stored and streamed from the cloud via at least one data provider device 230, for example. Such market data can include tick data and more particularly bid/ask tick data. Such network access devices 210 and data provider devices 230 can be configured as client/server, peer-to-peer, publish-subscribe, processing agent, ad-hoc, and the like. It is understood that a single network access device 210 and a data provider device 230 may be configured to perform both the client/server or publisher/subscriber roles.

The communication device of such network access device may include a transceiver, a modem, a network interface card, or other interface devices to communicate with the electronic network 220 and may further be operatively coupled to and/or include a Global Positioning System (GPS) via a GPS receiver (not shown). The modem may communicate with the electronic network 220 via a line 215 such as a telephone line, an ISDN line, a coaxial line, a cable television line, a fiber optic line, or a computer network line. Alternatively, the modem may wirelessly communicate with the electronic network 220. The electronic network 220 may provide an on-line service, an Internet service provider, a local area network service, a wide area network service, a cable television service, a wireless data service, an intranet, a satellite service, or the like.

Such network access devices may be hand held devices, palmtop computers, personal digital assistants (PDAs), tablets, notebook, laptop, portable computers, desktop PCs, workstations, and/or larger/smaller computer systems. It is noted that the network access devices may have a variety of forms, including but not limited to, a general purpose computer, a network computer, an internet television, a set top box, a web-enabled telephone, an internet appliance, a portable wireless device, a game player, a video recorder, and/or an audio component, for example.

Each network access device may typically include one or more memories 310, processors 315, and input/output devices 320. An input device may be any suitable device for the user to give input, for example: a keyboard, a 10-key pad, a telephone key pad, a light pen or any pen pointing device, a touchscreen, a button, a dial, a joystick, a steering wheel, a foot pedal, a mouse, a trackball, an optical or magnetic recognition unit such as a bar code or magnetic swipe reader, a voice or speech recognition unit, a remote control attached via cable or wireless link to a game set, television, and/or cable box. A data glove, an eye-tracking device, or any MIDI device may also be used. A display device may be any suitable output device, such as a display screen, text-to-speech converter, printer, plotter, fax, television set, or audio player. Although the input device is typically separate from the display device, they may be combined; for example: a display with an integrated touchscreen, a display with an integrated keyboard, or a speech-recognition unit combined with a text-to-speech converter.

Those skilled in the art will appreciate that the computer environment 200 shown in FIG. 2 is intended to be merely illustrative. The present invention may also be practiced in other computing environments. For example, the present invention may be practiced in multiple processor environments wherein the network access device includes multiple processors. Moreover, the network access device need not include all of the input/output devices 320 as discussed above and may also include additional devices. Those skilled in the art will appreciate that the present invention may also be practiced via Intranets and more generally in distributed environments in which a network access device requests resources from another network access device.

Figure 3:
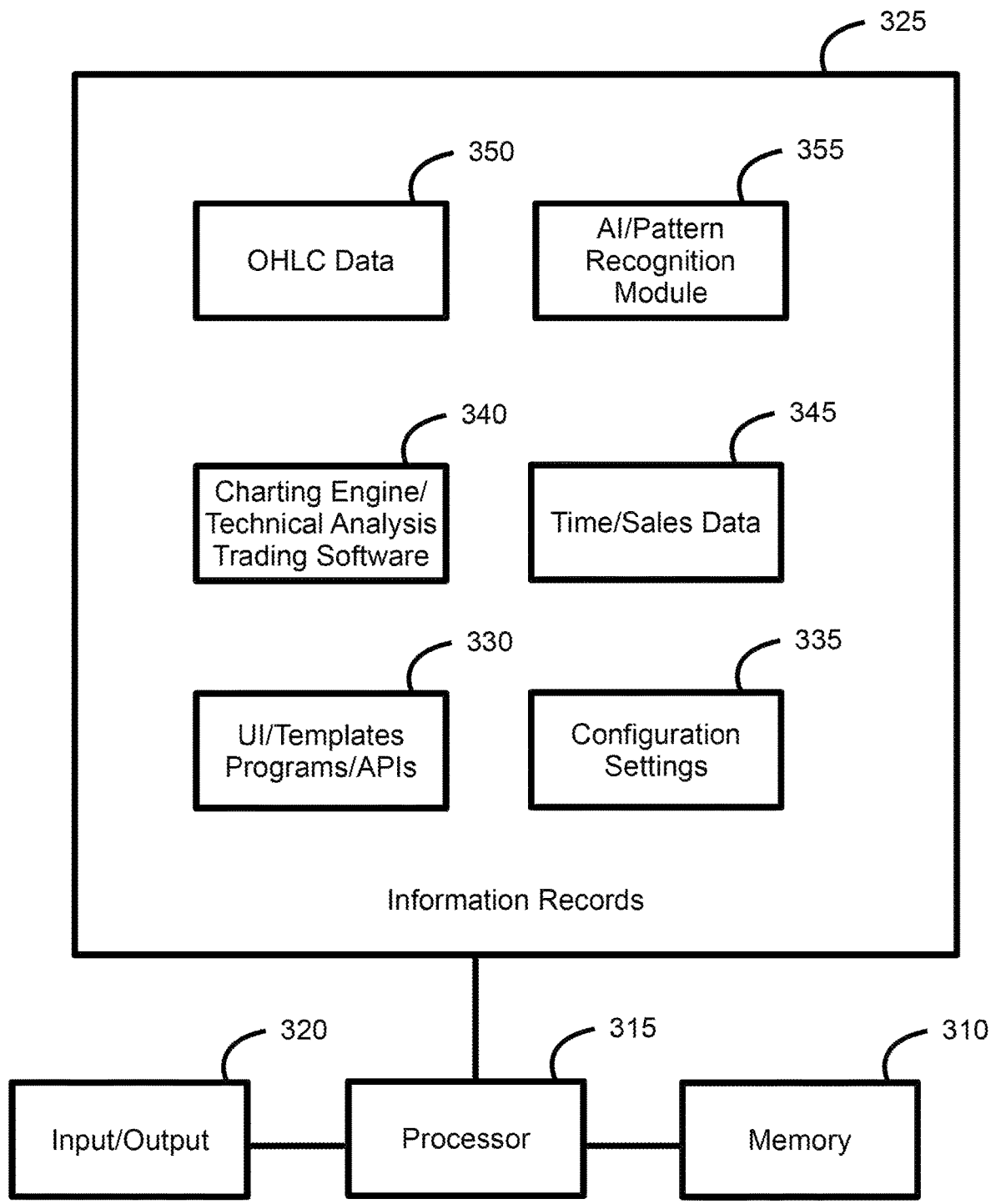
FIG. 3 is a block diagram illustrating exemplary information records stored in memory in accordance with the present invention.

FIG. 3 illustrates a block diagram of a storage device such as memory 310 in operative association with a processor 315. The processor 315 is operatively coupled to input/output devices 320 in network access devices for users and market participants of market data 225 such as traders, investors, market makers, brokers, bankers, analysts, researchers, and the like. Stored in memory 310 may be information records 325 having any combination of exemplary content such as lists, files, relational pointers, programs, interfaces, engines, modules, templates, rule sets, libraries, and databases. Such records may include for example: user interface/templates/programs/APIs (application programming interface) 330, configuration settings 335, charting engine and technical analysis module and trading software 340, time/sales data 345, OHLC data 350, and AI/pattern recognition module 355. These information records may be further introduced and discussed in more detail throughout the disclosure of this invention.

FIG. 4-A illustrates a portion of a data structure for market data 225 such as time/sales data 345. The data structure can include data fields such as a date/time 410, security or derivative symbol 415, sales price 420, size (e.g., number of shares or contracts, etc.) of the sale 425, and the exchange 430 that the sale took place.

FIG. 4-B illustrates a portion of a data structure for market data 225 such as OHLC data 350. The data structure can include data fields 440 such as a date/time 410, open price 134, high price 142, low price 150, close price 138, and volume. Each data record is representative of such data for a given time period and in turn used to represent a plurality of intra-time periods within a larger given time period. For instance, each data record shows the OHLC data for a one minute interval based on the time data which can define a first intra-time period 445, a second intra-time period 450, a third intra-time period 455, and can continue (not shown) to an endless number of intra-time periods up to a last or final intra-time period. For instance, if the given time period of interest is a five minute interval then five data records of one minute intervals would be used to as five intra-time periods.

Those skilled in the art will appreciate that the correspondence and operative association between data fields and/or data files can take on one-to-one, one-to-many, many-to-one, and many-to-many relationships. Relationships of data structures can take the form of delimited files, lists, tables, arrays, hashes, database records, objects, trees, graphs, rings, hub-spoke, and the like.

Candlestick patterns are commonly used in technical analysis to describe price movements over time of traded objects of value such as securities (e.g., stocks, bonds, ETFs, mutual funds, etc.), derivatives (e.g., options, forwards, futures, swaps, etc.), indices, commodities, or currencies further including cryptocurrencies as a class of digital asset. Other digital assets can include tokens, non-fungible tokens (NFTs), and the tokenization of contracts, physical assets such as real property, intangible property, and intellectual property. Such candlestick symbols and patterns can further depict the ratio of price movements between a plurality of assets, currency pairs including cryptocurrency pairs and token pairs, or traded objects of value.

Figure 5:
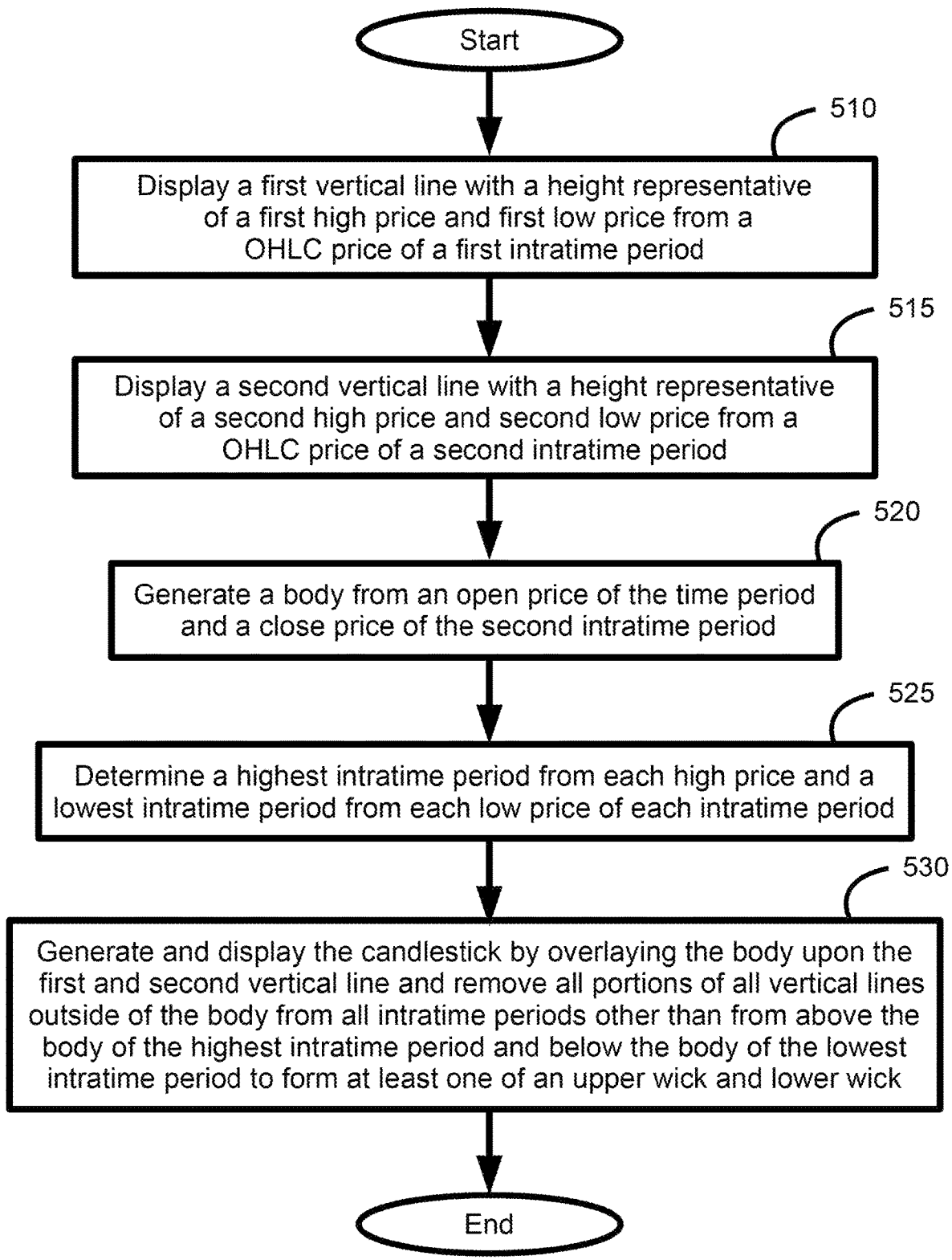
FIG. 5 is a flowchart illustrating the steps performed for processing an order in accordance with the present invention.

FIG. 5 is a flowchart illustrating the steps performed for generating and displaying a candlestick in accordance with the present invention. When a network access device 210 receives asset type market data 225 including OHLC data 350 a device processor 315 in operative communication with a charting engine 340 can generate and display in step 510 a first vertical line with a height representative of a range between a first high price and first low price from the OHLC data of a first intra-time period and then generate and display in step 515 a second vertical line with a height representative of a range between a second high price and second low price from a OHLC data of a second intra-time period.

A body from an open price of the time period and a close price of the second intra-time period can be generated in step 520 and a highest intra-time period from each high price and a lowest intra-time period from each low price of each intra-time period can be determined in step 525. The candlestick can be generated and displayed in step 530 by overlaying the body upon the first and second vertical line and removing all portions of all vertical lines outside of the body from all intra-time periods other than from above the body of the highest intra-time period and below the body of the lowest intra-time period to form at least one of an upper wick and lower wick, respectively.

Figure 6:
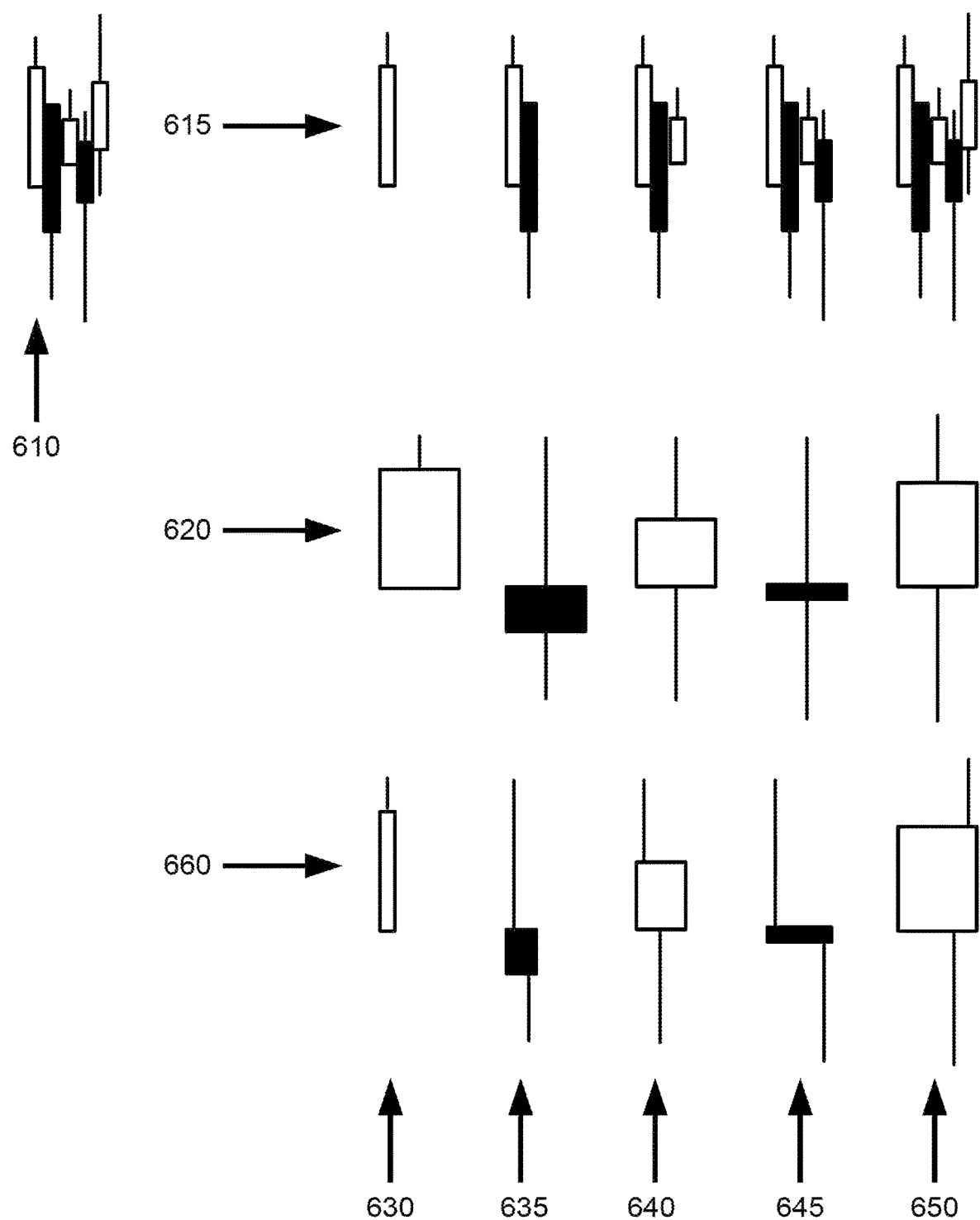
FIG. 6 is an illustration of how different kinds of candlesticks can be generated in accordance with the present invention.

FIG. 6 is an illustration of how different types of candlesticks can be generated in accordance with the present invention. A series of five OHLC prices are shown in 610 in this case shown in the form of candlesticks. For the sake of example each candlestick represents a one minute time period. The illustration shows what a prior art five minute candlestick would look like in row 620 when rendering it through known conventional techniques as each of the five OHLC prices having one minute intervals are processed. Each column represents a different one minute intra-time period of the five minutes. The first column representing a first intra-time period 630, a second column representing a second intra-time period 635, a third column representing a third intra-time period 640, a fourth column representing a fourth intra-time period 645, and a fifth column representing a fifth intra-time period 650.

Adjacent to the right of the five one minute candlesticks 610 shown in aggregate are the progressive sequence 615 of the same candlesticks shown as each intra-time period passes. For instance, after the second intra-time period 635 one can view the first two one minute candlesticks in the series of five candlesticks 610, after the third intra-time period 640 one can view the first three one minute candlesticks in the series of five candlesticks 610 and so forth. One can observe the changing height of the prior art single five minute candlestick shown in row 620. In all cases the single candlestick has the same fixed width body and includes a centerline for displaying upper and lower wicks similar to how all known charting programs would render candlesticks from OHLC prices. The other drawback is that there is no way to tell how much of the five minute period has progressed from viewing the prior art candlestick.

However, a clear distinction can be shown in the last row 660, as each intra-time period progresses (630, 635, 640, 645, 650) the width of the candlestick widens as wide as the width of the current and prior intra-time periods rather than being a fixed width during the entire five minute time period as shown above. This gives a user a visual sense of how much time has passed during the five minute time period. The other exemplary distinction in accordance with the present invention is that the widening candlestick shows more accurately when the high price or low price has occurred based on rendering the upper wick in the highest known intra-time period and the lower wick in the lowest known intra-time period. By modifying where the wicks are positioned along the body width of the candlestick provides more specific information as to when a high and low price have occurred without adding any additional graphic information.

The steps as shown in FIG. 5 can be repeated for a plurality of intra-time periods for the given time period. By so doing, a widening candlestick can be dynamically generated and displayed (see 660) by repetitively displaying a current vertical line from a OHLC data of a current intra-time period adjacent to all prior generated vertical lines of all prior intra-time periods and repetitively generating a current body and at least one of a current upper wick and lower wick where the width of the current body is equal to the sum of the width of the current intra-time period and each width of all the prior intra-time periods. This can continue until a final candlestick is generated and displayed having a final body and at least one of a final upper wick and lower wick where the width of the final body is equal to the width of the time period in this case a five minute time period having five one minute intra-time periods.

For example, a user may wish to view a chart rendering candlesticks in one hour intervals having access to one minute OHLC data where the body is sixty pixels wide. All known charting programs will take an hour to change the shape of a candlestick having a sixty pixel wide body once each minute. However, by employing the methods of the instant invention, a new vertical line one pixel wide is drawn each minute representing the high/low price range of an intra-time period. So after thirty minutes, the candlestick generated will be thirty pixels wide because of the thirty vertical lines drawn adjacent to each other in succession with a thirty pixel wide body overlayed and all pixels removed to leave in place the upper and lower wick in their respective columns to visually indicate when the highest price and lowest price during the thirty minutes had been discovered. In this example, it could be determined at the end of the time period that the high price occurred at the tenth minute of the hour in the tenth intra-time period and a low price occurred at the twenty fifth minute of the hour in the twenty fifth intra-time period and as a result an upper wick would be displayed in the tenth pixel column representative of the tenth intra-time period and the lower wick would be displayed in the twenty fifth pixel column representative of the twenty fifth intra-time period.

If there are price gaps between two adjacent vertical lines they can get filled when the body is overlayed across those lines. In a bullish candle where the close price is higher than the open price, the body is filled white to remove all pixels inside the body frame. Most of the body is already technically drawn because each column of pixels representing each vertical line for each intra-time period are drawn adjacent to each other.

Further a given time period and/or intra-time period can scale from the execution of a single sale price known as tick data to a batch or group of ticks data to an interval of a second to seconds or minute to minutes or hour to hours or day to days or week to weeks or month to months or year to years and beyond. Time period is used primarily throughout due to most charting examples shown are time period based price charts and bar charts. However, it is understood to one of ordinary skill of the art that similar charts can be based on intervals other than time such as a predetermined number of ticks or a predetermined amount of volume or a predetermined range of price, to name a few. Essentially, there is a category of data-based chart intervals that enable market participants to view charts that are driven by factors other than time. Therefore, time period can be further extended to also mean a predetermined interval of units other than time such as ticks, volume, and price range and charts can be further extended to mean charts other than price charts and bar charts and can also reference volume charts, tick charts, range bar charts, three line break charts, point and figure charts, kagi charts, and renko charts, for example.

In the alternative, if dynamic generation of a widening enhanced candlestick requires too much computing resources then configuration settings 335 can be used to only display the final enhanced candlestick at the end of the last intra-time period which is the same time as the end of the time period itself. So it is possible to show prior art centerline candlesticks corresponding to price changes during the time period before showing the permanent final enhanced candlestick representative of the whole time period at the end of the time period.

When the trading interface including the charting engine is closed, cached data is automatically saved to the local database such that the next time a user requests a chart, the data is loaded from the cache or database first, then missing historical data and real-time data are requested from the data provider.

FIG. 7-A is an illustration of enhanced candlesticks having both an upper wick and lower wick that can be generated in accordance with the present invention. In the simplest example take a given time period of 2 minutes using one minute OHLC data, the following are basic examples of what an enhanced candlestick that includes both an upper wick and lower wick can look like. A new enhanced candlestick called a Morning Candle 710 can be formed when both a high price and low price is found in a first intra-time period. A new enhanced candlestick called a Falling Candle 715 can be formed when a high price is found in a first intra-time period and a low price found in the second intra-time period. A new enhanced candlestick called a Rising Candle 720 can be formed when a low price is found in a first intra-time period and a high price found in the second intra-time period. A new enhanced candlestick called an Evening Candle 710 can be formed when both a high price and low price is found in the second intra-time period. As the intra-time periods increase so do the number of combinations of new enhanced candlesticks that can be generated. Configuration settings 335 can be used to provide options whether the upper and lower wicks are displayed at the start, middle, or end of the intra-time period. For instance, the middle was selected for both upper and lower wicks the wick lines would render at either the 25% or the 75% along the width of the body.

FIG. 7-B is an illustration of more enhanced candlesticks that can be generated in accordance with the present invention. Now that it is shown how and why wicks of candlesticks can be moved to create enhanced candlesticks that more accurately indicate when a high price and low price has occurred in a given time period a closer look at prior art candlesticks can be reviewed and shown how they can be enhanced to create newer types of candlesticks. For instance the Hanging Man 170 can broaden into at least two new enhanced candle sticks such as an Early Hanging Man 730 and a Late Hanging Man 735 or a Shooting Star 175 can broaden into at least two new enhanced candlesticks such as a Morning Shooting Star 740 and an Evening Shooting Star 745 or a Dragonfly Doji 180 can broaden into at least two new enhanced candlesticks such as a Morning Dragonfly Doji 750 and an Evening Dragonfly Doji 755 or a Gravestone Doji 185 can broaden into at least two new enhanced candlesticks such as a Morning Gravestone Doji 760 and an Evening Gravestone Doji 765 or lastly, a Long-Legged Doji 190 can broaden into at least two new enhanced candlesticks such as a Falling Long-Legged Doji 770 and a Rising Long-Legged Doji 775. One can visually see why such Long-Legged Dojis would be described as Falling and Rising respectively as they visually depict whether the high price or low price came first and serve as more of a leading indicator as to the degree or nature of indecision that is typically attributed to Doji type candlesticks.

Those skilled in the art will appreciate that scores of enhanced candlesticks can be named by the use of the techniques described in this instant invention which may offer greater degree of granularity and insight toward those speculators applying technical analysis of trends and reversals based on such new visual information. Further, a single enhanced candlestick can serve as a visual summary or substitute for more complex conventional candlestick patterns of a plurality of candlesticks across multiple intra-time periods.

FIG. 8-A is a block diagram of a processor used to produce enhanced OHLC data in accordance with the present invention. A device processor 315 can receive time/sales data 345 and parse through all sales for a given time period. The first sale of the period is the open price and last sale of the period is the close price. After all sales are parsed it can be determined which sale at what time had the highest price as well as which sale at what time had the lowest price. OHLC data 350 of prior art is usually produced this way from time/sales data. However such OHLC data 350 format only discloses price and volume for a time period and neglects to include the absolute time of the high and low price and also neglects to include a percentage of time relative to the time period of the high and low price. Enhanced OHLC data 810 can be generated by the processor and stored to include the absolute time of the highest price and absolute time of the lowest price for the time period which can be stored as a data record or delimited list. Newly packaged enhanced OHLC data makes adoption to enhanced candlestick charts quicker and easier.

When time/sales data is not available, enhanced OHLC data 810 can also be generated by the processor 315 from known OHLC data 350. For instance, investors may not be as concerned with hourly price fluctuations and might only wish to chart a security with daily OHLC data. Since there are three hundred ninety minutes in a trading day, the processor 315 can parse through intraday OHLC data in one minute intervals to determine which minute of the day had the highest price and which intra-time period of the day had the lowest price. In one example, those intra-time periods can be coded as values of daily percentage of time of the high price and daily percentage of time of the low price which could be stored as part of the enhanced OHLC daily data 810.

FIG. 8-B is a depiction of a portion of a data structure for the enhanced OHLC data in accordance with the present invention. Additional fields such as time of high price 820, time of low price 825, high price time percentage 830, and low price time percentage 835 can be generated as referenced above and included in the data structure to enhance OHLC data 810. Each record shows an absolute time and can also include percentage of time relative to the intra-time period to make it quicker and easier for charting engines to generate enhanced candlesticks as referenced throughout this instant invention.

Figure 9:
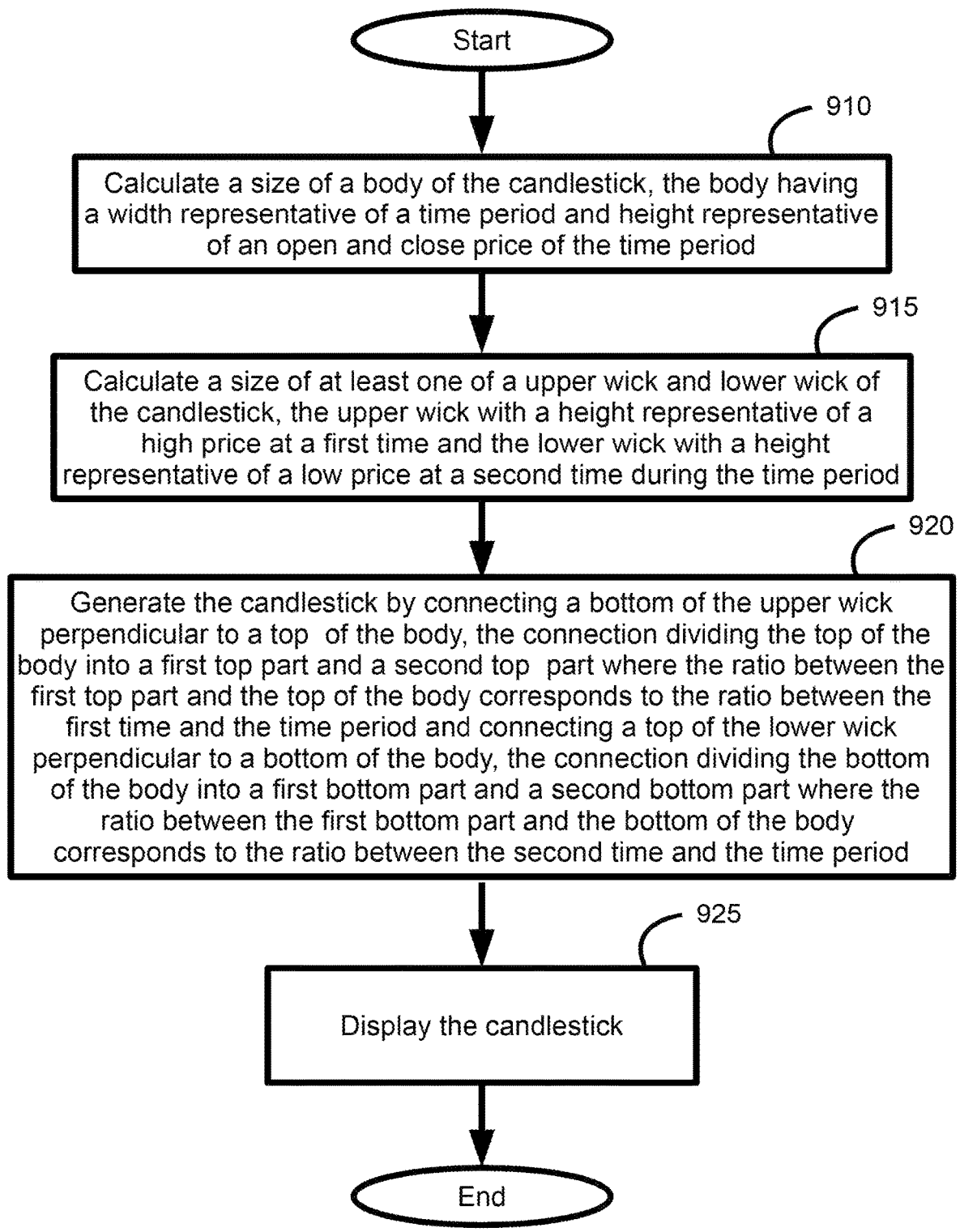
FIG. 9 is a flowchart illustrating the steps performed for generating and displaying a candlestick in accordance with the present invention.

FIG. 9 is a flowchart illustrating the steps performed for generating and displaying a candlestick in accordance with the present invention. When a network access device 210 receives security market data 225 including enhanced OHLC data 810 a device processor 315 in operative communication with a charting engine 340 can calculate in step 910 a size of a body of the candlestick, the body having a width and height where the width is representative of the time period and the height is representative of a range between an open price and a close price during the time period and calculate in step 915 a size of at least one of an upper wick and lower wick of the candlestick, the upper wick having a height representative of a high price at a first time during the time period and the lower wick having a height representative of a low price at a second time during the time period. After such calculations the candlestick can be generated in step 920 by connecting a bottom of the upper wick substantially perpendicular to a top of the body, the connection dividing the top of the body into a first top part and a second top part where the ratio between the first top part and the top of the body corresponds to the ratio between the first time and the time period and by connecting a top of the lower wick substantially perpendicular to a bottom of the body, the connection dividing the bottom of the body into a first bottom part and a second bottom part where the ratio between the first bottom part and the bottom of the body corresponds to the ratio between the second time and the time period, and display in step 925 the candlestick.

Figure 10:
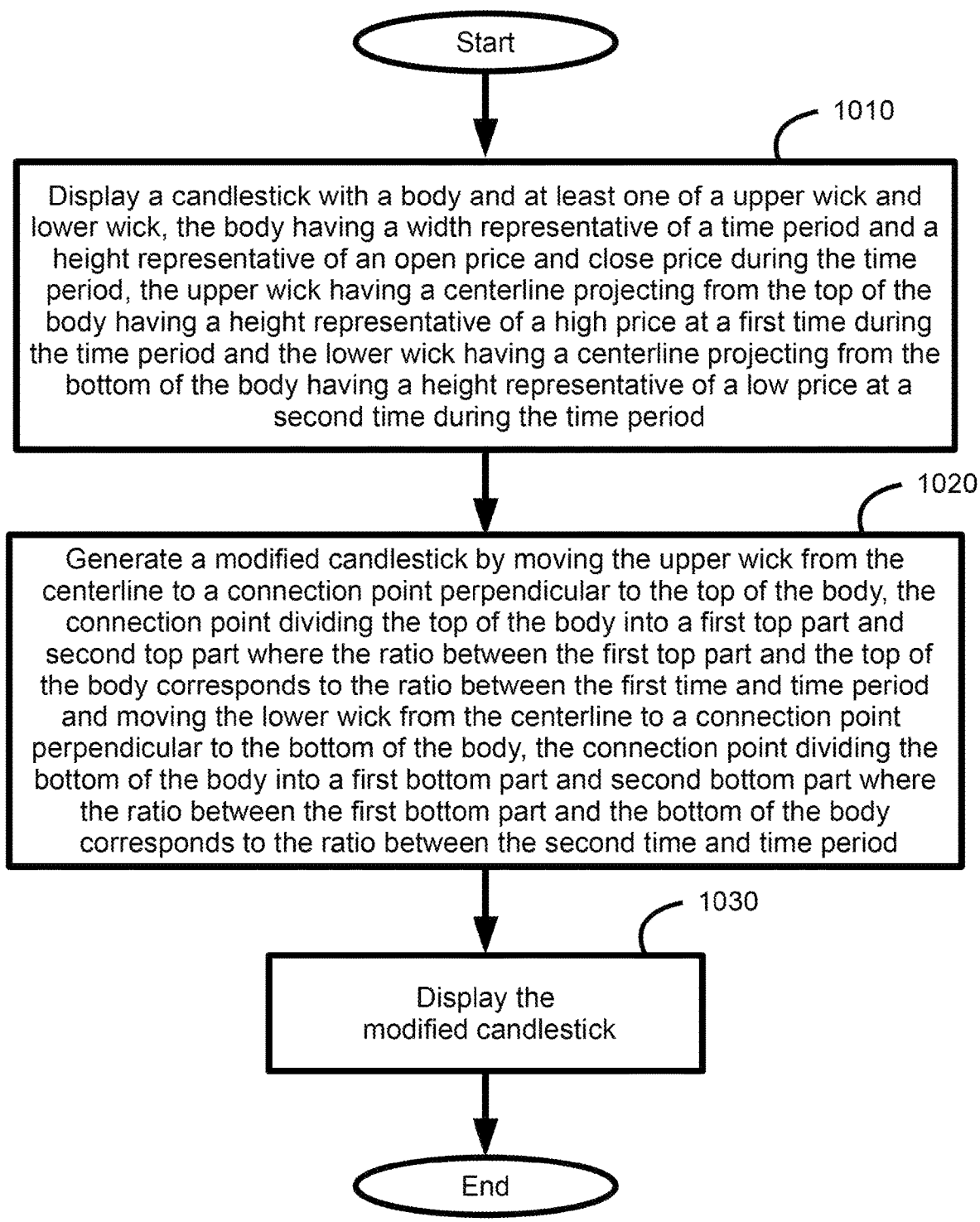
FIG. 10 is a flowchart illustrating the steps performed for generating or modifying the display of a candlestick in accordance with the present invention.

FIG. 10 is a flowchart illustrating the steps performed for modifying the display of a candlestick in accordance with the present invention. When a displayed candlestick is identified in step 1010 with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period the modified candlestick can be generated in step 1020 by moving the upper wick from the centerline to a connection point substantially perpendicular to the top of the body, the connection point dividing the top of the body into a first top part and second top part where the ratio between the first top part and the top of the body corresponds to the ratio between the first time and time period and moving the lower wick from the centerline to a connection point substantially perpendicular to the bottom of the body, the connection point dividing the bottom of the body into a first bottom part and second bottom part where the ratio between the first bottom part and the bottom of the body corresponds to the ratio between the second time and time period. The modified candlestick can then be displayed in step 1030.

Unlike conventional candlesticks that display the wick(s) along a centerline vertical axis one hundred percent of the time, the freedom of the instant invention to move the upper and lower wicks along the body of the candlestick would make enhanced candlesticks with wick(s) along a centerline vertical axis rare and could only happen when either or both of the high price and low price occur near or around half of the given time period.

Though it is generally preferred that the wicks are displayed vertical the term substantially perpendicular is used to allow for alternate aspects of the instant invention. The wicks can be adapted to be slightly rotated or tilted forward or backward to indicate price direction or momentum during the time period or near the time of the high price or low price. Further, tilting each wick along the centerline of a conventional candlestick can indicate which of a high price and low price had occurred first during the time period. The degree a tilt or rotational can be proportional to the length of time between the occurrence of the high and low price within the given time period.

There are different types of market data available used to render and display an enhanced candlestick chart such as real-time streaming live data when a given market is open and historical data used for research, technical analysis, and back-testing. Enhanced OHLC data 810 will be particularly useful for historical data to enable users to visualize enhanced candlesticks over longer time periods spanning years or decades if need be.

The methods shown above can be employed from points of view of publisher/provider and subscriber/user. For instance, the data provider device 230 of a publisher can receive a request to download an enhanced candlestick chart data feed and send a flash object that includes the enhanced candlestick chart to the network access device 210 of a user or subscriber that can be opened and displayed in a browser or embedded into an electronic document. Further, the network access device 210 could store in memory an enhanced candlestick price chart display applet that runs in a standard Java virtual machine (JVM) executing within a browser or make API calls to receive real-time streaming enhanced OHLC data 810 and/or enhanced candlestick chart publishing data from the charting engine of the data provider device. Further API connections 330 can integrate a real-time streaming enhanced candlestick chart or OHLC price bar chart module directly with brokerage trading software including trading portfolios, order management systems, and accounting systems.

Such enhanced OHLC data flow can be operatively communicated between publisher/provider and subscriber/user via a Hyper Text Transfer Protocol (HTTP) based query that can utilize a Hyper Text Markup Language (HTML), an eXtensible Markup Language (XML), Dynamic-HTML (DHTML), Asynchronous JavaScript and XML (AJAX), JavaScript, Applets, or some other suitable communication protocol or content format. Further open source charting libraries such as Chart.js, Chartist.js, D3.js, Google Charts, n3-charts, and the like can be modified with newly integrated function calls to be used for the dynamic generation and rendering of OHLC and HLC type symbols discussed in the instant invention throughout. In one embodiment, a cloud server can serve as a publisher platform for a Charting as a Service (CaaS) for subscribers to gain access to such new enhanced price charts that can further be integrated into interfaces of trading software and systems for market participants.

Due to the expanded visual symbol set of unique enhanced candlesticks, a chart pattern recognition and analysis module 355 can be applied upon enhanced candlestick, OHLC price bar, or HLC price bar sequences of varying pattern length and use Artificial Intelligence type (AI) deterministic algorithms including machine learning algorithms, Bayesian networks, neural networks, or fuzzy systems. In some embodiments, any number of stochastic algorithms may be implemented including: genetic algorithms or Monte Carlo algorithms. By applying such methods, greater insight can be revealed as to the greater likelihood of the next type of enhanced candlestick or price bar that could occur in a current unfolding sequence or progression of emerging enhanced candlestick patterns.

The present invention includes dynamically generating and displaying a widening candlestick by repetitively displaying a current vertical line from a OHLC data of a current intra-time period adjacent (to the right) to all prior displayed generated vertical lines of all prior intra-time periods and repetitively generating a current body and at least one of a current upper wick and lower wick wherein the width of the current body is equal to the sum of the width of the current intra-time period and each width of all the prior intra-time periods and further includes generating and displaying a final candlestick having a final body and at least one of a final upper wick and lower wick wherein the width of the final body is equal to the width of the time period. The invention can further include generating OHLC data in real-time after each intra-time period from time/sales data streamed during the intra-time period and determining from configuration settings 335 whether at least one of an upper and lower wick is displayed at either the start, middle, or end of the width of the body for each intra-time period or time period. A time period can range from a fraction of a second to decades.

All the techniques of using the width of a candle body as an intra-time axis to proportionately shift the display of upper and lower wicks as well as the dynamic generation techniques of widening the candle body for each intra-time period can be applied to HLC and OHLC price bars and charts as well.

FIG. 11-A is an illustration of an enhanced HLC price bar that can be generated in accordance with the present invention. The illustration visually compares the prior art of FIG. 1-A, where an OHLC bar has a single vertical line 110 that shows the high price 114 and the low price 118 of a time period with the open price 122 marked by a tick mark on the left of the vertical line 110, and the close price 126 marked by a tick mark on the right of the vertical line 110. This prior art chart is of a price axis only for a discrete interval of time during a time period. Rather than using the vertical line centric to showing OHLC it can be appreciated that the new HLC price bar 1100 of the instant invention splits the vertical high-low price line into two separate vertical lines of a high price bar 1110 and a low price bar 1115 both of which connect and centric to a horizontal close price bar 1120 the length of which serving as an intra-time axis for the time period so that a user viewing this new HLC bar can ascertain when the high price bar 1110 and low price bar 1115 have respectively occurred during the time period. Optionally a tick mark for an open price (not shown) could be drawn in this case to the left of the low price bar 1115 and turn the enhanced HLC price bar 1100 into an enhanced OHLC price bar.

FIG. 11-B is an illustration of enhanced OHLC price bars that can be generated in accordance with the present invention. A similar technique that was applied toward enhancing and changing the function of HLC price bars can also be applied toward enhancing OHLC price bars (1130,1160). The new OHLC price bar 1130 of the instant invention splits the vertical high-low price line into two separate vertical lines of a high price bar 1140 and a low price bar 1145 both of which connect and centric to a new open-close price bar 1150 the length of which serving as an intra-time axis for the time period so that a user viewing this new OHLC bar can ascertain when the high price bar 1140 and low price bar 1145 have respectively occurred during the time period. The open-close price bar 1150 is drawn as a rising diagonal in this case. This diagonal bar would be the same length and angle as if it served as a diagonal of a candle body (not shown) representative of the height between the open price and close price and the width of the time period. Another new OHLC price bar 1160 also splits the vertical high-low price line into two separate vertical lines of a high price bar 1170 and a low price bar 1175, in this case the high connects perpendicular to a horizontal close price bar 1180 and the low price bar 1175 connects perpendicular to a horizontal open price bar 1185. An additional connecting bar 1190 could be optionally drawn to connect the intersection of the low-open price bars (1175, 1185) with the high-close price bars (1170, 1180). The connecting bar 1190 illustrates the overall price flow during the time period in between high and low price events. Essentially the present invention includes drawing a line between the open-high perpendicular connection and the low-close perpendicular connection if the low price occurred after the high price and drawing a line between the open-low perpendicular connection and the high-close perpendicular connection if the low price occurred before the high price.

Figure 12:
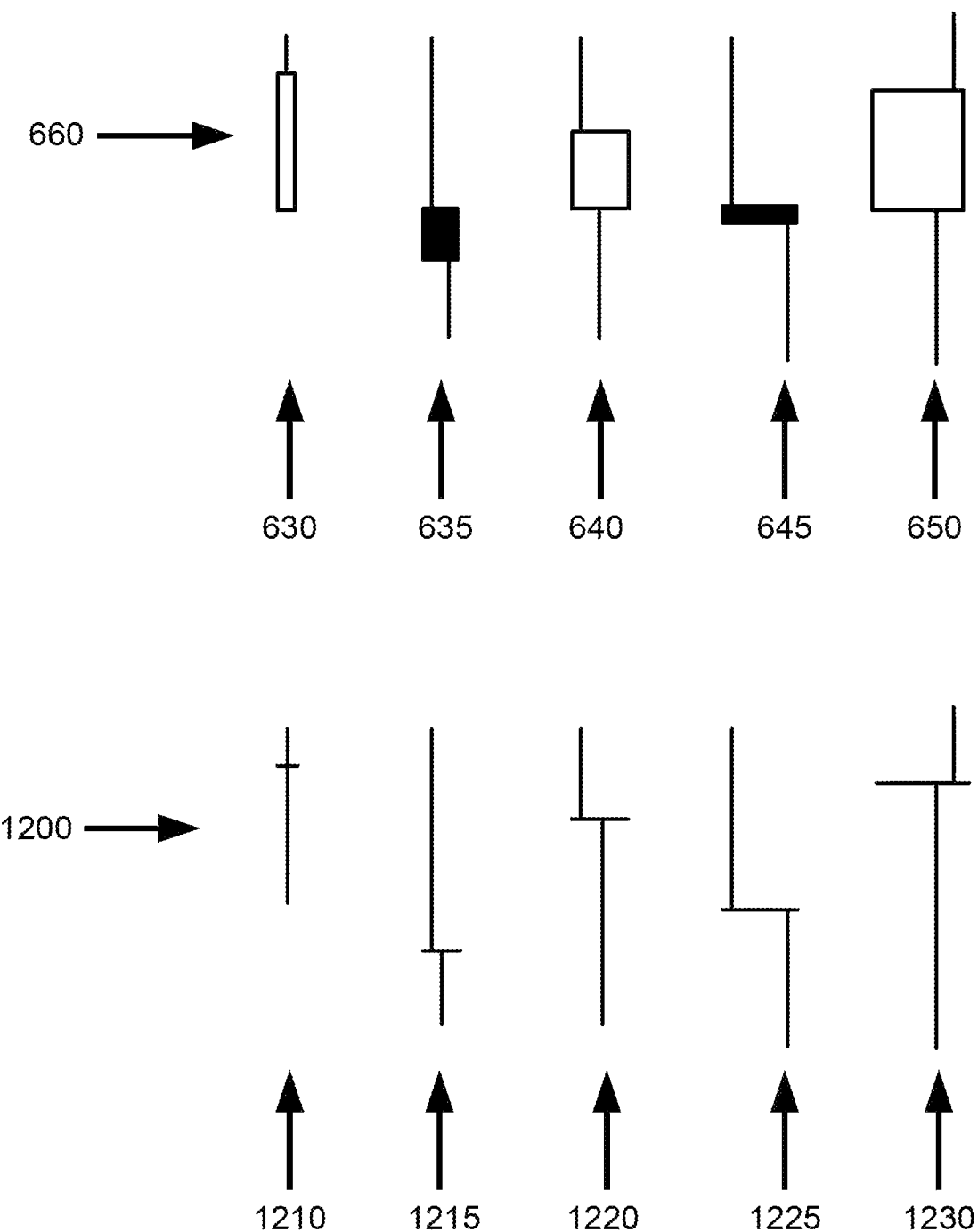
FIG. 12 is an illustration of enhanced OHLC price bars that can be dynamically generated in accordance with the present invention.

FIG. 12 is an illustration of enhanced OHLC price bars that can be dynamically generated in accordance with the present invention. Similar to how row 660 of FIG. 6, shows the progression of each intra-time period (630, 635, 640, 645, 650) where the width of the candlestick widens as wide as the width of the current and prior intra-time periods during the entire time period, such to does row 1200 show the progression of each intra-time period (1210, 1215, 1220, 1225, 1230) of enhanced HLC price bars where the width of the horizontal close bar progressively widens during the time period giving a user a visual sense of how much time has passed during the time period. The other exemplary distinction in accordance with the present invention is that the widening horizontal close bar shows more accurately when the high price or low price has occurred based on rendering the upper price bar in the highest known intra-time period and the lower price bar in the lowest known intra-time period. By modifying where the vertical price bars are positioned along the horizontal close bar provides more specific information as to when a high and low price have occurred during the time period without adding any additional graphic information. Such generation techniques can also apply to real-time dynamic generation of enhanced OHLC price bars (1130, 1160). For instance, the size and angle of the open-close price bar 1150 can dynamically change in relation to the difference between open price and close price for each intra-time period during the time period.

FIG. 13-A is an illustration of alternate enhanced candlesticks that can be generated in accordance with the present invention. Though it has been shown a best mode for carrying out the instant invention with candlesticks are to use the width of the candle body as an intra-time axis of a time period to more precisely break up the single centerline wick into an upper wick and lower wick that can be shifted along the candle body, that level of detail or granularity might not be needed particularly in the case of sparse computing resources. In this case, alternate candlesticks can also visually depict which came first, the high price or the low price in a given time period. Alternate enhanced candlestick 1310 shows how only the upper wick is shifted to the right which is enough to signify that the low price came first. Alternate enhanced candlestick 1315 shows how only the upper wick is tilted/rotated to the right which is enough to signify that the low price came first. Alternate enhanced candlestick 1320 shows how the centerline wick that represents both the depiction of an upper wick and lower wick is shifted clockwise can visually signify to the user that the low price came first. It of course would be apparent that shifting the centerline counter-clockwise would signify that the high price came first (not shown).

FIG. 13-B is an illustration of alternate enhanced OHLC price bars that can be generated in accordance with the present invention. Though it has been shown a best mode for carrying out the instant invention with OHLC price bars are to use the width of a price bar spanning from the open price to close price as an intra-time axis of a time period to more precisely break up the single centerline high-low price bar into an upper price bar and lower price bar that can be shifted along the open-close price bar, that level of detail or granularity might not be needed particularly in the case of sparse computing resources. In this case, alternate OHLC price bars can also visually depict which came first, the high price or the low price in a given time period. Alternate enhanced OHLC price bar 1330 shows how only the upper price bar representative of the high price is shifted to the right which is enough to signify that the low price came first. Alternate enhanced OHLC price bar 1335 shows how only the upper price bar is tilted/rotated to the right which is enough to signify that the low price came first. Alternate enhanced OHLC price bar 1340 shows how the centerline high-low price bar is shifted clockwise which can visually signify to the user that the low price came first. It of course would be apparent that shifting the centerline counter-clockwise would signify that the high price came first (not shown).

Figure 14:
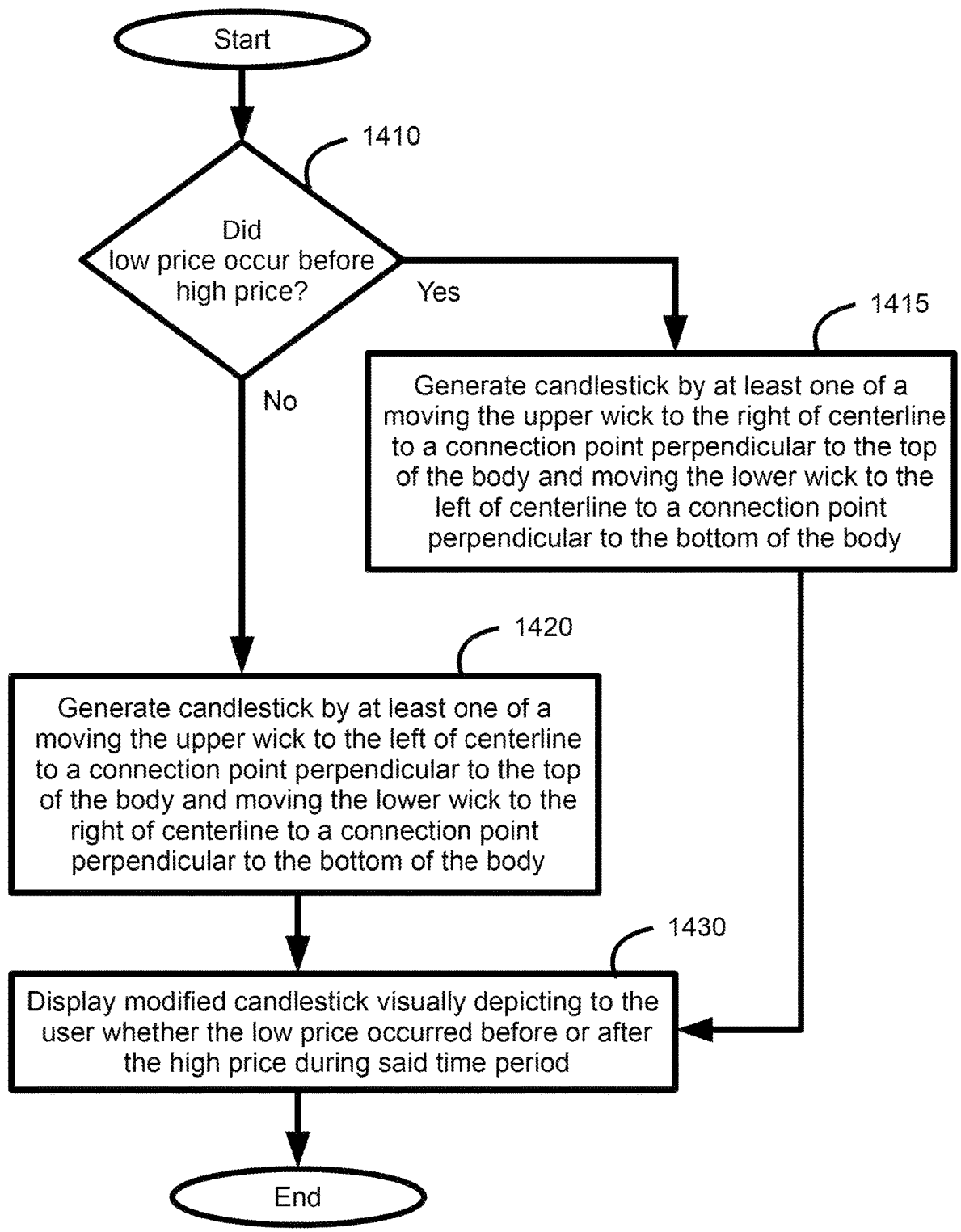
FIG. 14 is a flowchart illustrating the steps performed for generating or modifying the display of a candlestick in accordance with the present invention.

FIG. 14 is a flowchart illustrating the steps performed for generating or modifying the display of a candlestick in accordance with the present invention. When a candlestick is identified with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1410 whether the low price occurred before the high price during the time period. If the low price did occur first then the candlestick can be modified or generated in step 1415 by at least one of a moving the upper wick to the right of centerline to a connection point perpendicular to the top of the body and moving the lower wick to the left of centerline to a connection point perpendicular to the bottom of the body. However, if the high price occurred first then the candlestick can be modified or generated in step 1420 by at least one of a moving the upper wick to the left of centerline to a connection point perpendicular to the top of the body and moving the lower wick to the right of centerline to a connection point perpendicular to the bottom of the body. In either case, the charting engine can then display in step 1430 the modified candlestick (e.g., 1310) visually depicting to the user whether the low price occurred before or after the high price during the time period.

Figure 15:
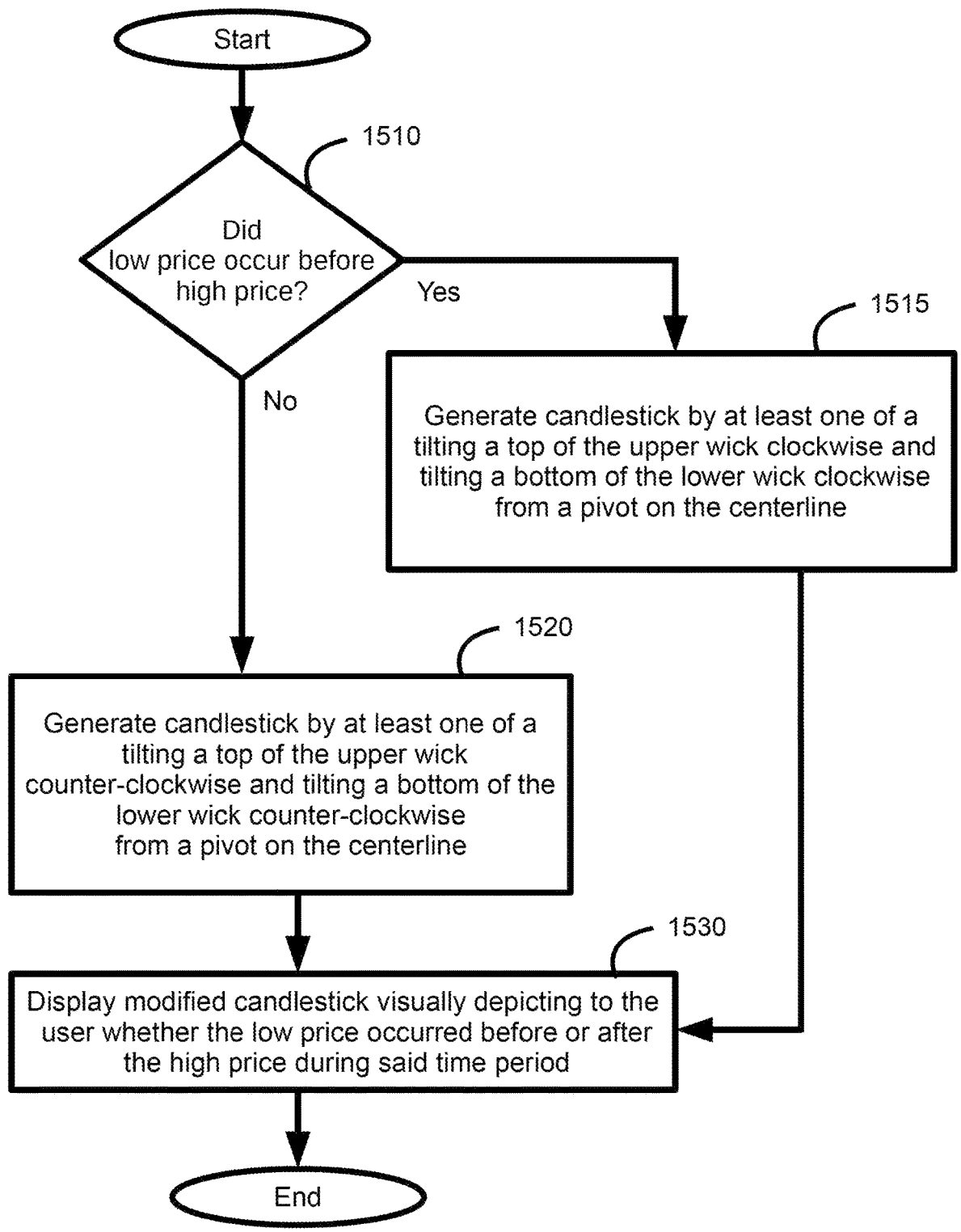
FIG. 15 is a flowchart illustrating the steps performed for generating or modifying the display of a candlestick in accordance with the present invention.

FIG. 15 is a flowchart illustrating the steps performed for generating or modifying the display of a candlestick in accordance with the present invention. When a candlestick is identified with a body and at least one of an upper wick and lower wick, the body having a width representative of a time period and a height representative of a range between an open price and close price during the time period, the upper wick having a centerline projecting from the top of the body having a height representative of a high price at a first time during the time period and the lower wick having a centerline projecting from the bottom of the body having a height representative of a low price at a second time during the time period it can be determined in step 1510 whether the low price occurred before the high price during the time period. If the low price did occur first then the candlestick can be modified or generated in step 1515 by at least one of a tilting a top of the upper wick clockwise and tilting a bottom of the lower wick clockwise from a pivot on the centerline. However, if the high price occurred first then the candlestick can be modified or generated in step 1520 by at least one of a tilting a top of the upper wick counter-clockwise and tilting a bottom of the lower wick counter-clockwise from a pivot on the centerline. In either case, the charting engine can then display in step 1530 the modified candlestick (e.g., 1315,1320) visually depicting to the user whether the low price occurred before or after the high price during the time period.

Figure 16:
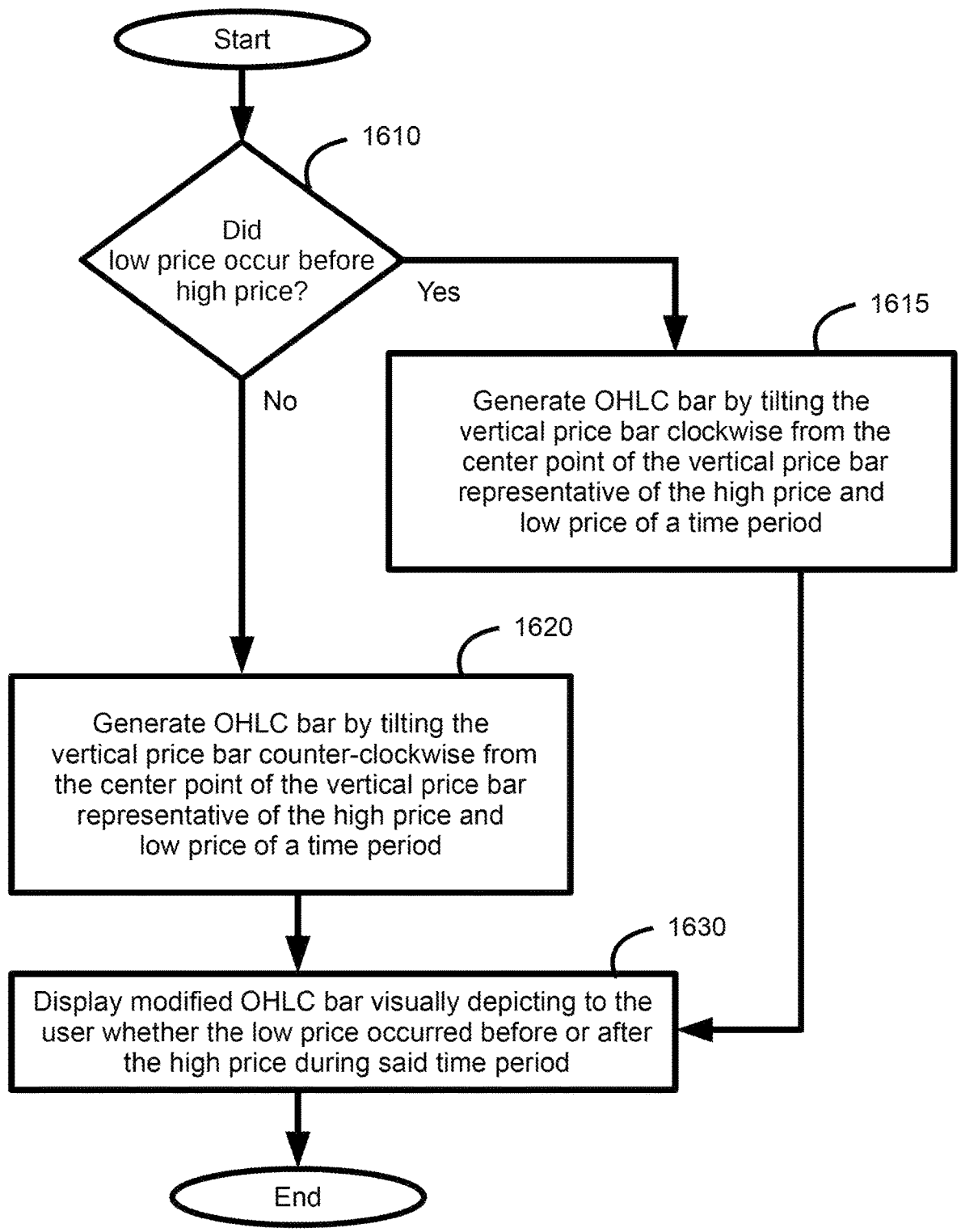
FIG. 16 is a flowchart illustrating the steps performed for generating or modifying the display of a OHLC price bar in accordance with the present invention.

FIG. 16 is a flowchart illustrating the steps performed for generating or modifying the display of a OHLC price bar in accordance with the present invention. When a OHLC price bar is identified with a vertical price bar having a center point and a height representative of a range between a high price and low price during the time period it can be determined in step 1610 whether the low price occurred before the high price during the time period. If the low price did occur first then the OHLC price bar can be modified or generated in step 1615 by by tilting the vertical price bar clockwise from the center point of the vertical price bar. However, if the high price occurred first then the OHLC price bar can be modified or generated in step 1620 by by tilting the vertical price bar counter-clockwise from the center point of the vertical price bar. In either case, the charting engine can then display in step 1630 the modified OHLC price bar (e.g., 1130,1340) visually depicting to the user whether the low price occurred before or after the high price during the time period.

Figure 17:
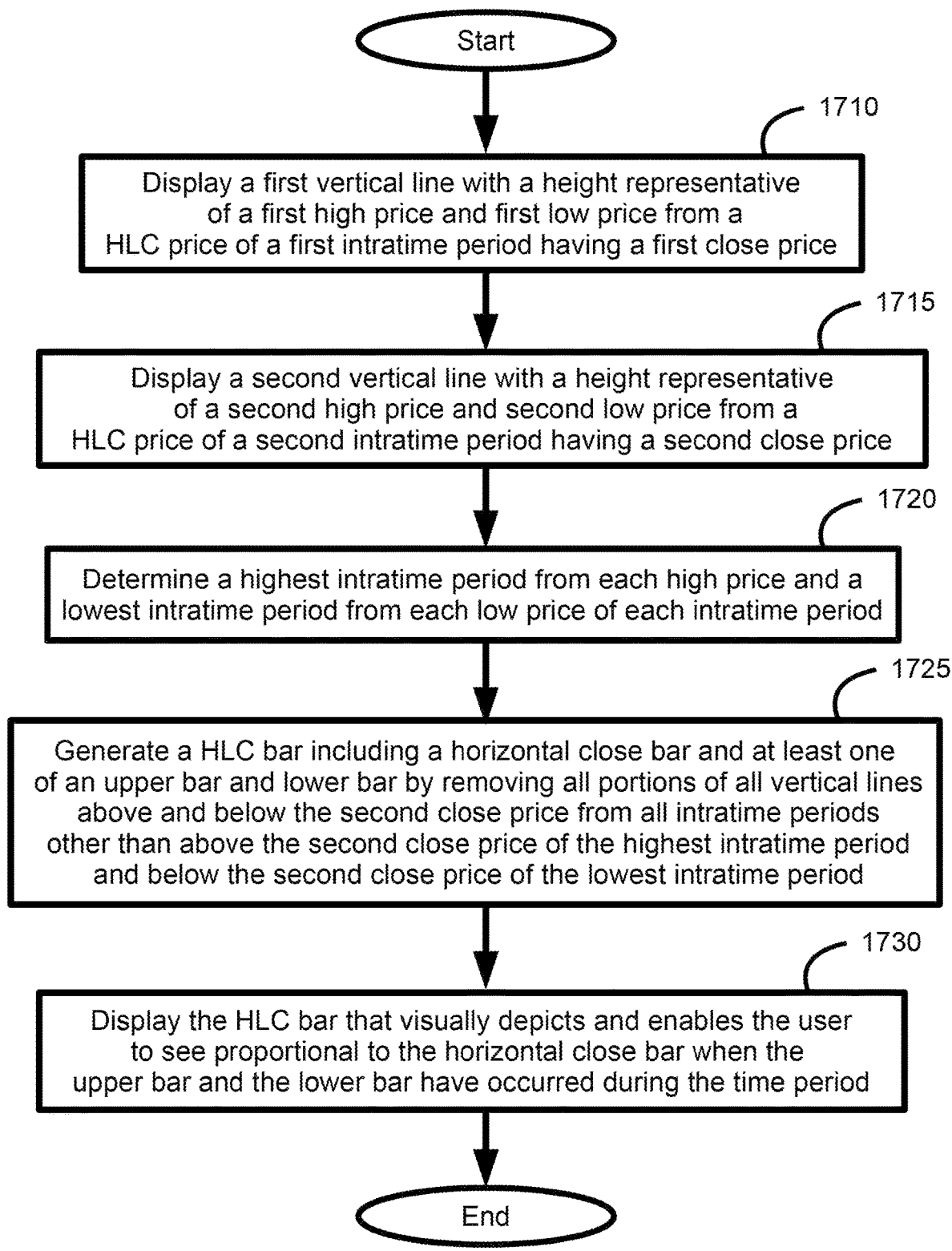
FIG. 17 is a flowchart illustrating the steps performed for generating and displaying a HLC price bar in accordance with the present invention.

FIG. 17 is a flowchart illustrating the steps performed for generating and displaying a HLC price bar in accordance with the present invention. When a network access device 210 receives security market data 225 including OHLC data 350 (or HLC data only if OHLC data is not available), a device processor 315 in operative communication with a charting engine 340 can generate and display in step 1710 a first vertical line with a height representative of a range between a first high price and first low price from the OHLC data of a first intra-time period and then generate and display in step 1715 a second vertical line with a height representative of a range between a second high price and second low price from a OHLC data of a second intra-time period.

A highest intra-time period from each high price and a lowest intra-time period from each low price of each intra-time period can be determined in step 1720 and a HLC bar can be generated in step 1725 including a horizontal close bar and at least one of an upper bar and lower bar by removing all portions of all vertical lines above and below the second close price from all intra-time periods other than above the second close price of the highest intra-time period and below the second close price of the lowest intra-time period. The HLC bar can then be displayed in step 1730 by the charting engine 340, the HLC bar visually depicting and enabling the user to see proportional to the horizontal close bar when the upper bar and the lower bar have occurred during the time period.

Figure 18:
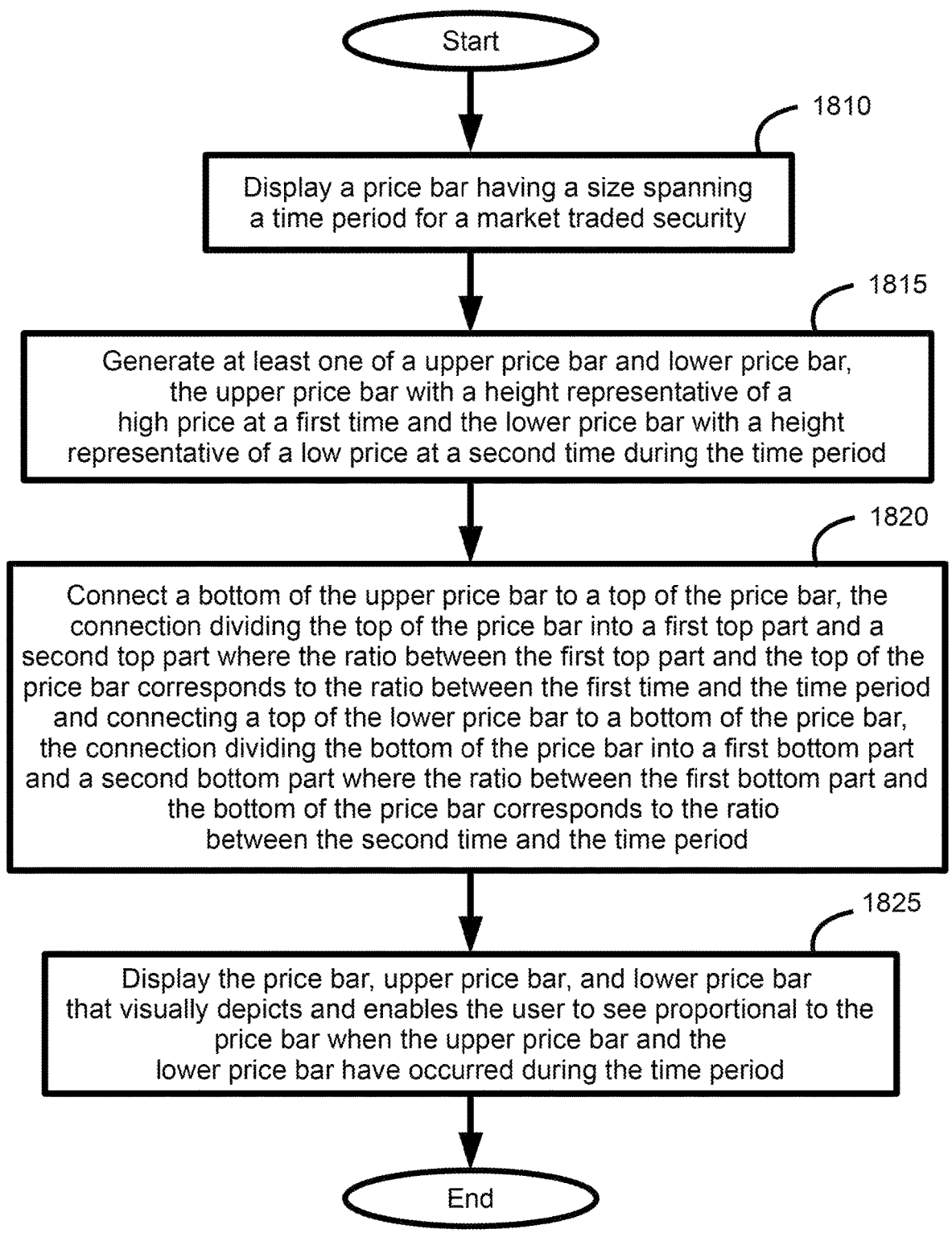
FIG. 18 is a flowchart illustrating the steps performed for generating and displaying an OHLC type of price bar in accordance with the present invention.

FIG. 18 is a flowchart illustrating the steps performed for generating and displaying an OHLC type of price bar in accordance with the present invention. When a network access device 210 receives security market data 225 including OHLC data 350, a device processor 315 in operative communication with a charting engine 340 can generate and display in step 1810 a price bar having a size spanning a time period for a market traded security and generate in step 1815 at least one of an upper bar and lower bar, the upper bar with a height representative of a high price at a first time and the lower bar with a height representative of a low price at a second time during the time period.

The upper bar and lower price bar can then be connected in step 1820 to the price bar by connecting a bottom of the upper bar to a top of the price bar, the connection dividing the top of the price bar into a first top part and a second top part where the ratio between the first top part and the top of the price bar corresponds to the ratio between the first time and the time period and connecting a top of the lower bar to a bottom of the price bar, the connection dividing the bottom of the price bar into a first bottom part and a second bottom part where the ratio between the first bottom part and the bottom of the price bar corresponds to the ratio between the second time and the time period. The price bar, upper bar, and lower bar can then be displayed in step 1825 that visually depicts and enables the user to see proportional to the price bar when the upper bar and the lower bar have occurred during the time period.

The price bar is representative of one of a close price, last price, open price, open-close price, and average price. The average price can be one of a simple moving average (SMA), exponential moving average (EMA), VWAP (Volume Weighted Average Price), TWAP (Time Weighted Average Price), mean price, median price, ATR (Average True Range) price and the like. The price bar is not vertical, for instance a price bar representing only a close price would be horizontal and a price bar representative of line drawn from an open price to a different close price would be diagonal. Such diagonal could be the equivalent of the same diagonal inside a body of the candle (if displayed) representing the same OHLC time period. The upper price bar and lower price bar are substantially vertical. The price bar, upper price bar, and lower price bar together visually depict to a user one of an enhanced HLC (high, low, close) bar and an enhanced OHLC (open, high, low, close) bar which can also be a current enhanced bar displayed adjacent to one or more previously displayed enhanced bars to form one of an enhanced HLC price chart and OHLC price chart. The enhanced HLC bar and enhanced OHLC bar can be rendered as one of a scalable vector graphic (SVG) and Canvas generated image. The price bar can also take the form of a body of a candle where the upper price bar is an upper wick and lower price bar is a lower wick that together visually depict to a user an enhanced candlestick which can be displayed adjacent to one or more previously displayed enhanced candlesticks to form an enhanced candlestick price chart. The enhanced candlestick can be rendered as one of a scalable vector graphic (SVG) and Canvas generated image with HTML and JavaScript using some commands such as rect( ), fillRect( ), strokeRect( ), clearRect( ), moveTo( ), lineTo( ), stroke( ), and fill( ), for example. The price bar can be a line drawn from the open price to the close price across the time period. The correspondence of the ratio between the first top part and the top of the price bar to the ratio between the first time and the time period is substantially equal. The charting engine can be in operative communication with at least one of a server device, client device, cloud device, and peer device.

Figure 19:
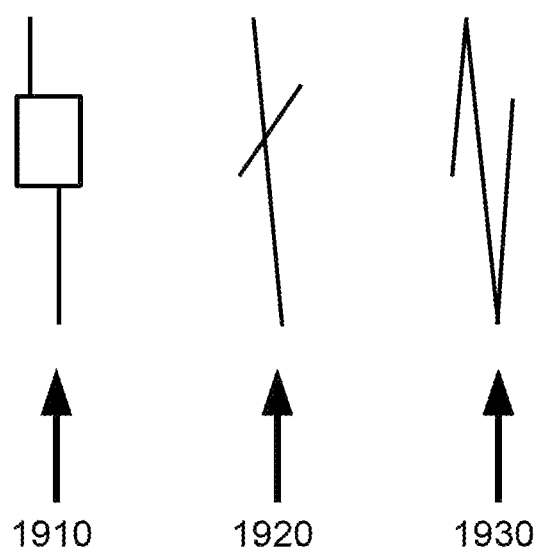
FIG. 19 is an illustration of enhanced OHLC price symbols that can be generated in accordance with the present invention.

FIG. 19 is an illustration of enhanced OHLC price symbols that can be generated in accordance with the present invention. Though it has been shown a preferred mode for carrying out the instant invention with OHLC price bars are to use the width of a price bar spanning from the open price to close price as an intra-time axis of a time period to more precisely break up the single centerline high-low price bar into an upper price bar and lower price bar that can be shifted along the open-close price bar, there alternate OHLC price symbols that can also visually depict which came first, the high price or the low price in a given time period. An enhanced candlestick 1910 including a shifted upper and lower wick to represent when the respective high price and low price occurred during a time period as already presented can be used as reference to the generation of new alternate OHLC price symbols. For instance, the two intersecting lines symbol 1920 represent the intersection of an open-close price line and a high-low price line. By superimposing the two intersecting lines over the enhanced candlestick 1910 one would see that the open-close price line would be the diagonal of the candle body drawn from lower left to upper right and that the high-low price line would connect the top of the upper wick to the bottom of the lower wick.

When an open price is lower than the close price the open-close price line would appear rotated counter-clockwise from a horizontal axis at an angle proportionate to the price difference between the close and open price. When an open price is higher than the close price the open-close price line would appear rotated clockwise from a horizontal axis at an angle proportionate to the price difference between the open and close price. Similarly, when a high price occurs before the low price the high-low price line would appear rotated counter-clockwise from a vertical axis at an angle proportionate to the price difference between the high and low price. When the high price occurs after the low price the high-low price line would appear rotated clockwise from a vertical axis at an angle proportionate to the price difference between the high and low price.

When a high price occurs before the low price in a time period, the three contiguous connected lines 1930 can depict the sequence of OHLC with a first price line connecting the open price to the high price, the second line connecting the high price to the low price and the third line connecting the low price to the close price. By superimposing the three contiguous connected lines over the enhanced candlestick 1910 one would see these lines match up to the open price, high price, low price, and close price respectively. When the high price occurs after the low price in the time period, a OHLC sequence can instead take place with the first price line connecting the open price to the low price, the second line connecting the low price to the high price and the third line connecting the high price to the close price.

Figure 20:
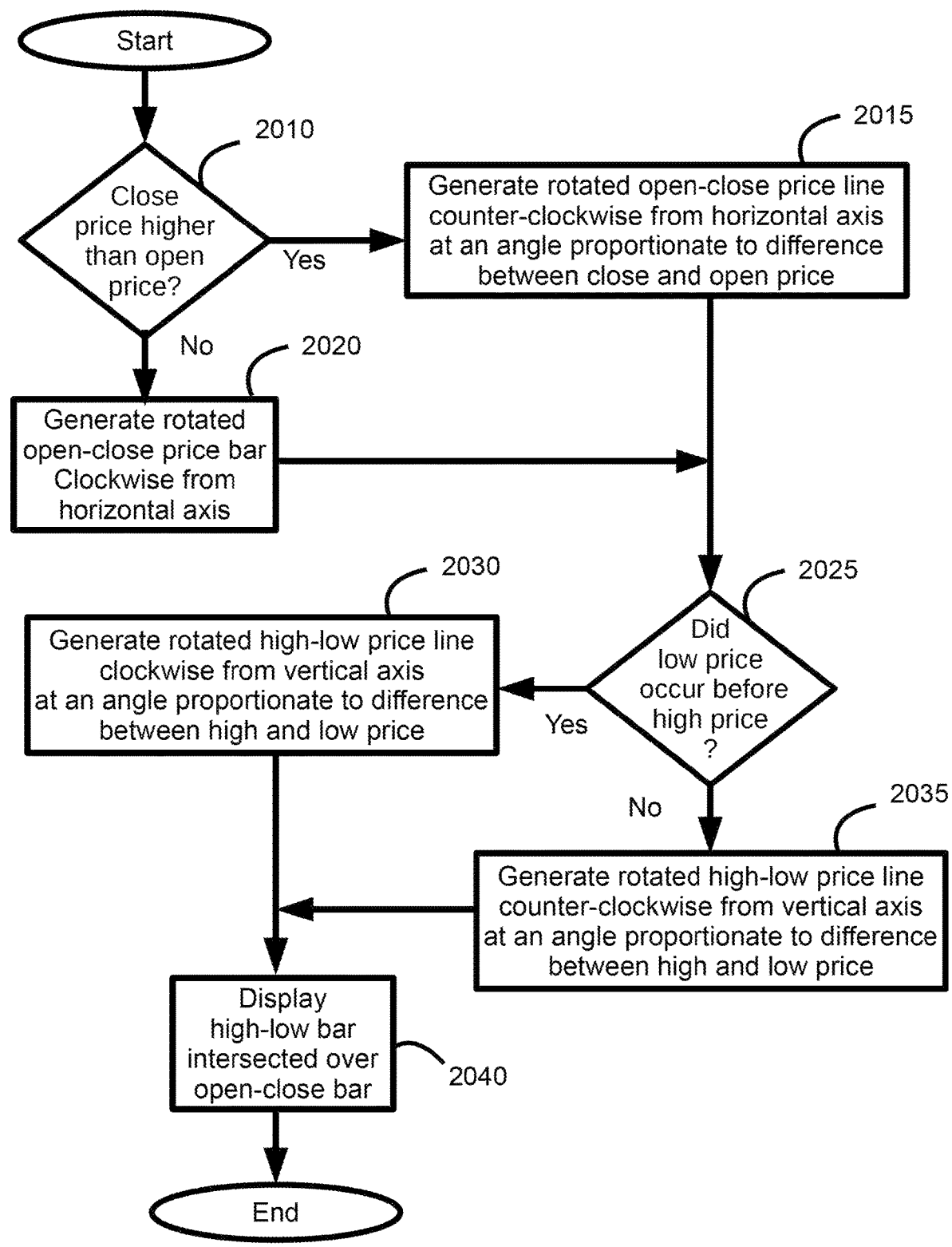
FIG. 20 is a flowchart illustrating the steps performed for generating or displaying an alternate OHLC price symbol in accordance with the present invention.

FIG. 20 is a flowchart illustrating the steps performed for generating or displaying an alternate OHLC price symbol in accordance with the present invention. When a network access device 210 receives security market data 225 including OHLC data 350, a device processor 315 in operative communication with a charting engine 340 can determine in step 2010 whether a close price is higher than the open price for a given time period. If so, an open-close price bar can be generated in step 2015 with a line drawn from an open price to a close price of the time period which is rotated counter-clockwise from a horizontal axis at an angle proportionate to the difference between the close price and open price otherwise the open-close price bar can be generated in step 2020 with a line drawn from the open price to the close price of the time period which is rotated clockwise from a horizontal axis at an angle proportionate to the difference between the close price and open price.

It can then be determined in step 2025 whether the low price occurred before the high price during the time period. If so, a high-low price bar can be generated in step 2030 with a line drawn from the high price at a first time to the low price at a second time for the given time period which is rotated clockwise from a vertical axis at an angle proportionate to difference between the high price and low price otherwise the high-low price bar can be generated in step 2035 with a line drawn from the high price at a first time to the low price at a second time for the given time period which is rotated counter-clockwise from a vertical axis at an angle proportionate to difference between the high price and low price. In either case, the new OHLC price symbol can be displayed in step 2040 where the high-low price bar is intersected over the open-close price bar.

Figure 21:
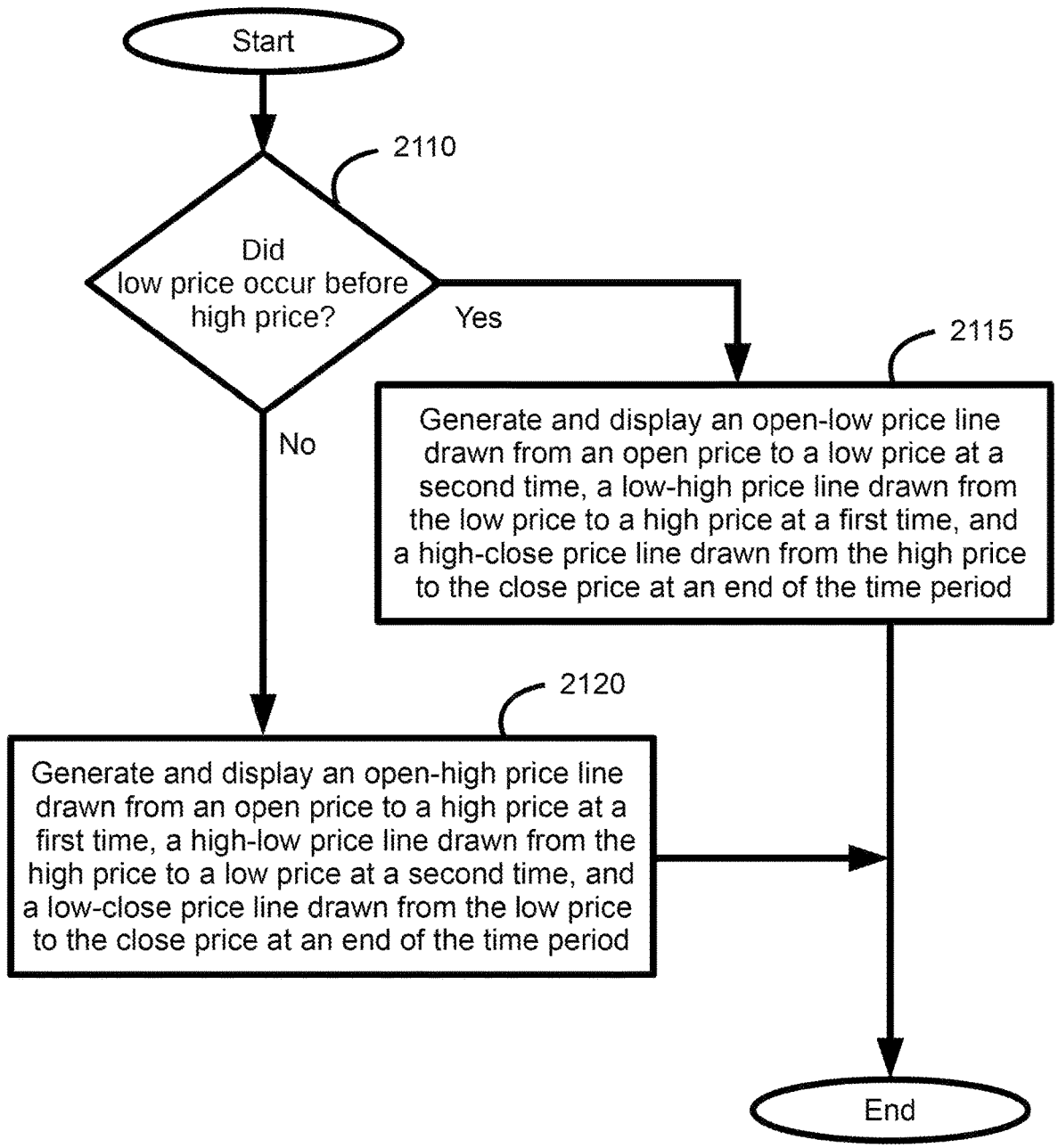
FIG. 21 is a flowchart illustrating the steps performed for generating or displaying another alternate OHLC price symbol in accordance with the present invention.

FIG. 21 is a flowchart illustrating the steps performed for generating or displaying an another alternate OHLC price symbol in accordance with the present invention. When a network access device 210 receives security market data 225 including OHLC data 350, a device processor 315 in operative communication with a charting engine 340 can determine in step 2110 whether the low price occurred before the high price during the time period. If so, the OHLC price symbol can be generated and displayed in step 2115 with an open-low price line drawn from an open price to a low price at a second time, a low-high price line drawn from the low price to a high price, and a high-close price line drawn from the high price to the close price at the end of the time period otherwise the OHLC price symbol can be generated and displayed in step 2120 with an open-high price line drawn from an open price to a high price at a second time, a high-low price line drawn from the high price to a low price, and a low-close price line drawn from the low price to the close price at the end of the time period.

The present invention includes when the close price is a last price during the time period and further includes dynamically generating and displaying a widening open-close price line by repetitively redrawing the open-close price line from the open price to the last price during the time period where the last price is a close price of an intra-time period within the time period and the duration of the intra-time period can be as small a change in the last price from a previous last price down to a single tick of data.

The present invention also includes when the close price is a last price during the time period and further includes dynamically generating and displaying a widening OHLC price bar by repetitively redrawing the low-close price line from the low price to the last price during the time period if the low price occurred after the high price and redrawing the high-close price line from the high price to the last price during the time period if the low price occurred before the high price.

The present invention can also apply to specific types of candlesticks such as Heikin-Ashi price bars which provide average prices for OHLC based on formulas to smooth noise and visually depict trend. For instance, a close price can represent an average price such as (Open+High+Low+Close)/4 or the high price equal to the maximum of High, Open, or Close or the low price equal to the minimum of Low, Open, or Close, and the open price equal to the (Open of previous bar+Close of previous bar)/2.

Such teachings presented in this instant invention can further apply to 3-D price bar charts where moving averages, volume, or volatility can be mapped along a surface of a third dimension for each discrete time period, for example. Further, frequency distribution of highs and lows can also be projected along a third dimension. The invention is not limited to the line based examples shown throughout of different modified candlesticks, price bars, and new OHLC and HLC symbols in the form of intersecting lines, triangles, quadrilaterals, contiguous connecting lines, and the like but can also further include replacing such lines and shapes with arcs, ovals, ellipses, and any other geometric shape that can connect between two or more price points. For instance, curved lines such as an arc instead of a straight line can be used to indicate a change in price momentum during at least a portion of the time period.

Figure 22:
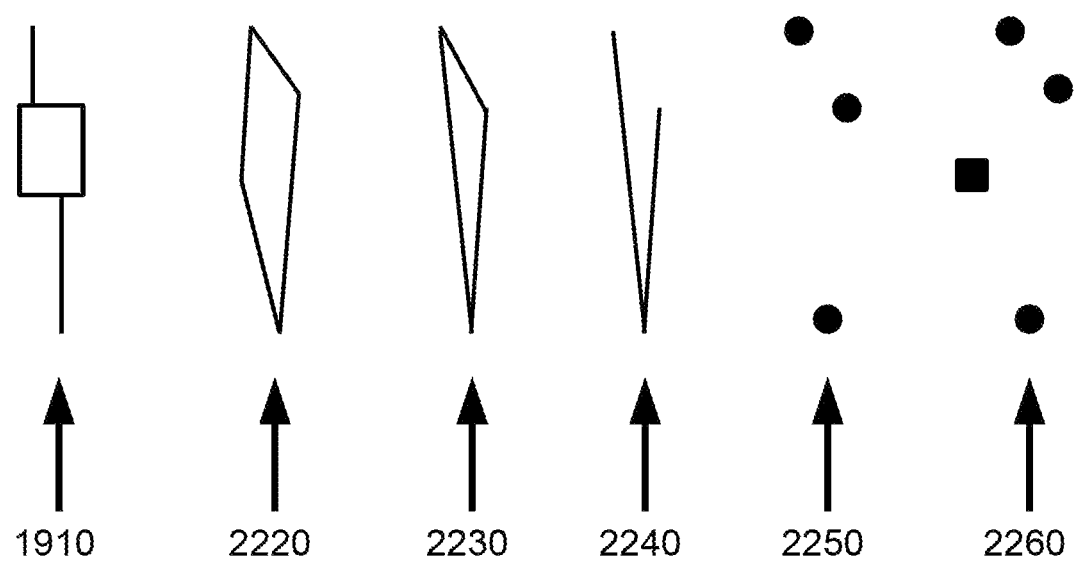
FIG. 22 is an illustration of enhanced OHLC symbol and HLC price symbol that can be generated in accordance with the present invention.

FIG. 22 is an illustration of enhanced OHLC type and HLC type symbols that can be generated in accordance with the present invention. There are yet further symbols that can also visually depict which came first, the high price or the low price in a given time period. As previously shown, an enhanced candlestick 1910 including a shifted upper and lower wick to represent when the respective high price and low price occurred during a time period as already presented can be used as reference to the generation of new alternate OHLC and HLC type symbols. For instance, the OHLC price symbol 2220 represents the spatiotemporal arrangement in price and time by making the open price, high price at a first time, low price at a second time and close price as vertices of a drawn quadrilateral. Similarly, the HLC price symbol 2230 represents the spatiotemporal arrangement in price and time by making the high price at a first time, low price at a second time and close price as vertices of a drawn triangle. By superimposing either symbol (2220, 2230) over the enhanced candlestick 1910 one would see a match in the position of its respective OHLC and HLC price points.

When a high price occurs before the low price in a time period, the two contiguous connected lines 2240 can depict the sequence of HLC with a first price line connecting the high price to the low price and the second line connecting the low price to the close price. When the high price occurs after the low price in the time period, a HLC sequence can instead take place with the first price line connecting the low price to the high price and the second line connecting the high price to the close price. The variety of OHLC type symbols and HLC type symbols as discussed in the instant invention are not dependent upon drawing any connections between points. The three dots 2250 illustrate the drawn spatiotemporal relationship between the high price, the low price, and the close price as a new HLC type symbol. In turn, a new OHLC type symbol 2260 includes a square to represent the open price (a dot could also be used) and a similar set of three dots representing the high, low, and close prices during the time period. A square can be used to differentiate from the other dots because it remains in a fixed position as the symbol is dynamically rendered as it does not change in price or in time during the time period.

A currently redrawn price symbol in accordance with price fluctuations during a given time period are technically considered partial HLC or OHLC type symbols, because they rely on a last price instead of a close price during the time period but before the end of the time period giving rise to a subset class of symbols known as HLL (high, low, last) type symbols and OHLL (open, high, low, last) type symbols which can be applied to all prior illustrated symbols shown throughout. The selection of which symbol types to display in a price chart can be chosen by a user selecting a symbol rendering method from configuration settings, which will be presented in more detail later.

Figure 23:
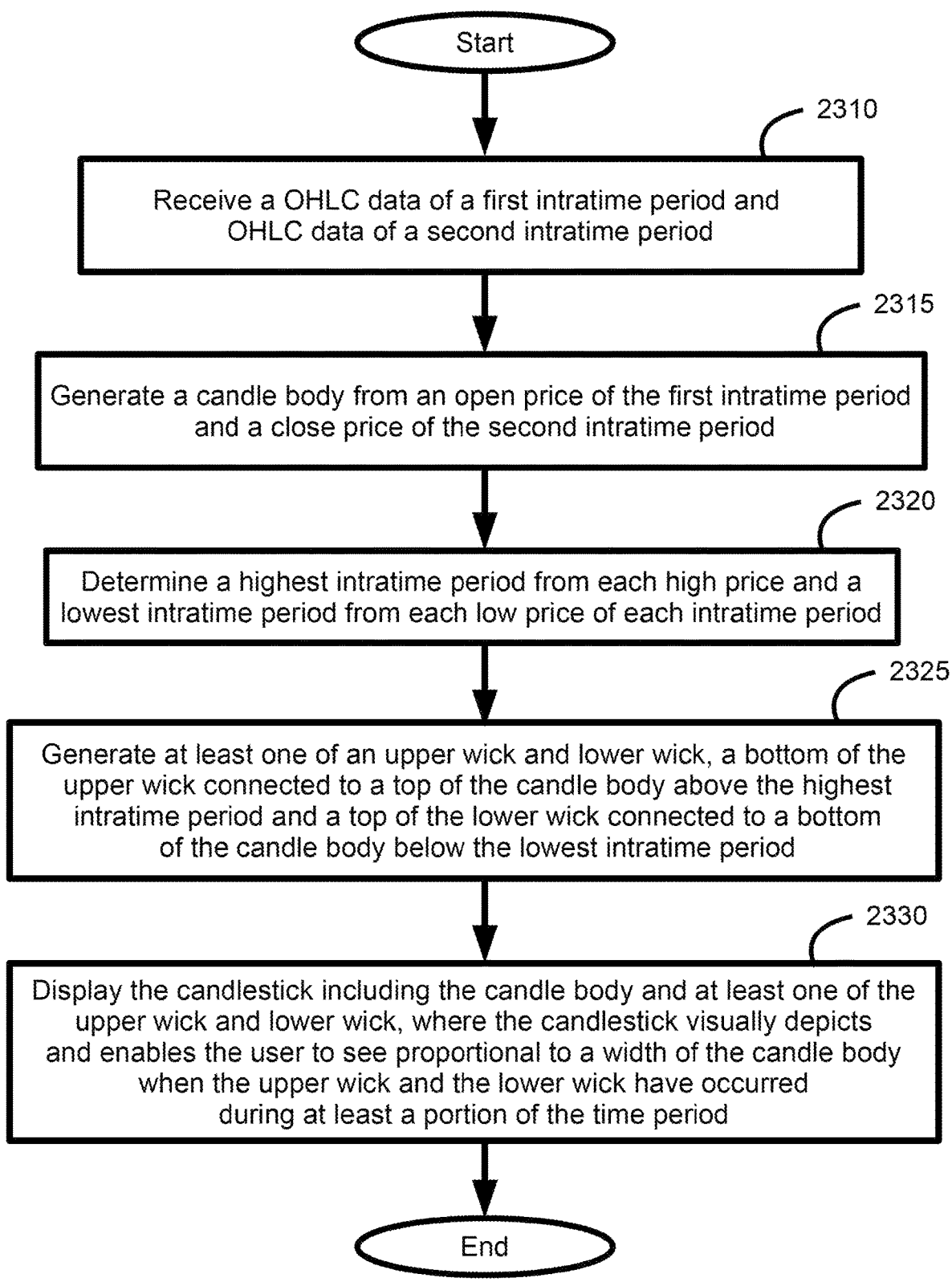
FIG. 23 is a flowchart illustrating the steps performed for generating and displaying a candlestick in accordance with the present invention.

FIG. 23 is a flowchart illustrating the steps performed for generating and displaying a candlestick in accordance with the present invention. Rather than the method of generating a widening candlestick by the successive repetitive drawing of adjacent vertical lines for each intra-time period and then erasing portions of lines to form a dynamic candlestick (see FIG. 5), an alternate method can also be used which is to erase a prior drawn candlestick and redraw and replace it with a current candlestick having a wider candle body after each intra-time period. When a network access device 210 receives real-time security market data 225 including OHLC data 350 (or generate OHLC data from market data in the absence of OHLC data, not shown) a device processor 315 in operative communication with a charting engine 340 can receive and/or generate in step 2310 a OHLC data of a first intra-time period and OHLC data of a second intra-time period and generate in step 2315 generate a candle body from an open price of the first intra-time period and a close price of the second intra-time period. A highest intra-time period from each high price and a lowest intra-time period from each low price of each intra-time period can then be determined in step 2320 and at least one of an upper wick and lower wick can be generated in step 2325 where a bottom of the upper wick connects to a top of the candle body above the highest intra-time period and a top of the lower wick connects to a bottom of the candle body below the lowest intra-time period. The candlestick can then be displayed in step 2330 that includes the candle body and at least one of the upper wick and lower wick, where the candlestick visually depicts and enables the user to see proportional to a width of the candle body when the upper wick and the lower wick have occurred during at least a portion of the time period.

These above steps can be repeated for each intra-time period within to dynamically generate and display a widening candlestick after passage of each current intra-time period by repetitively erasing the previous drawn candlestick and generating and displaying a current candlestick from a OHLC data of the current intra-time period, the current candlestick having a current candle body and at least one of a current upper wick and lower wick where the width of the current candle body is equal to the sum of the width of the current intra-time period and each width of all the prior intra-time periods. This can continue until the final intra-time period of the time period where the current candlestick is erased and a final candlestick is generated and displayed having a final candle body and at least one of a final upper wick and lower wick wherein the width of the final candle body is equal to the width of the time period.

Figure 24:
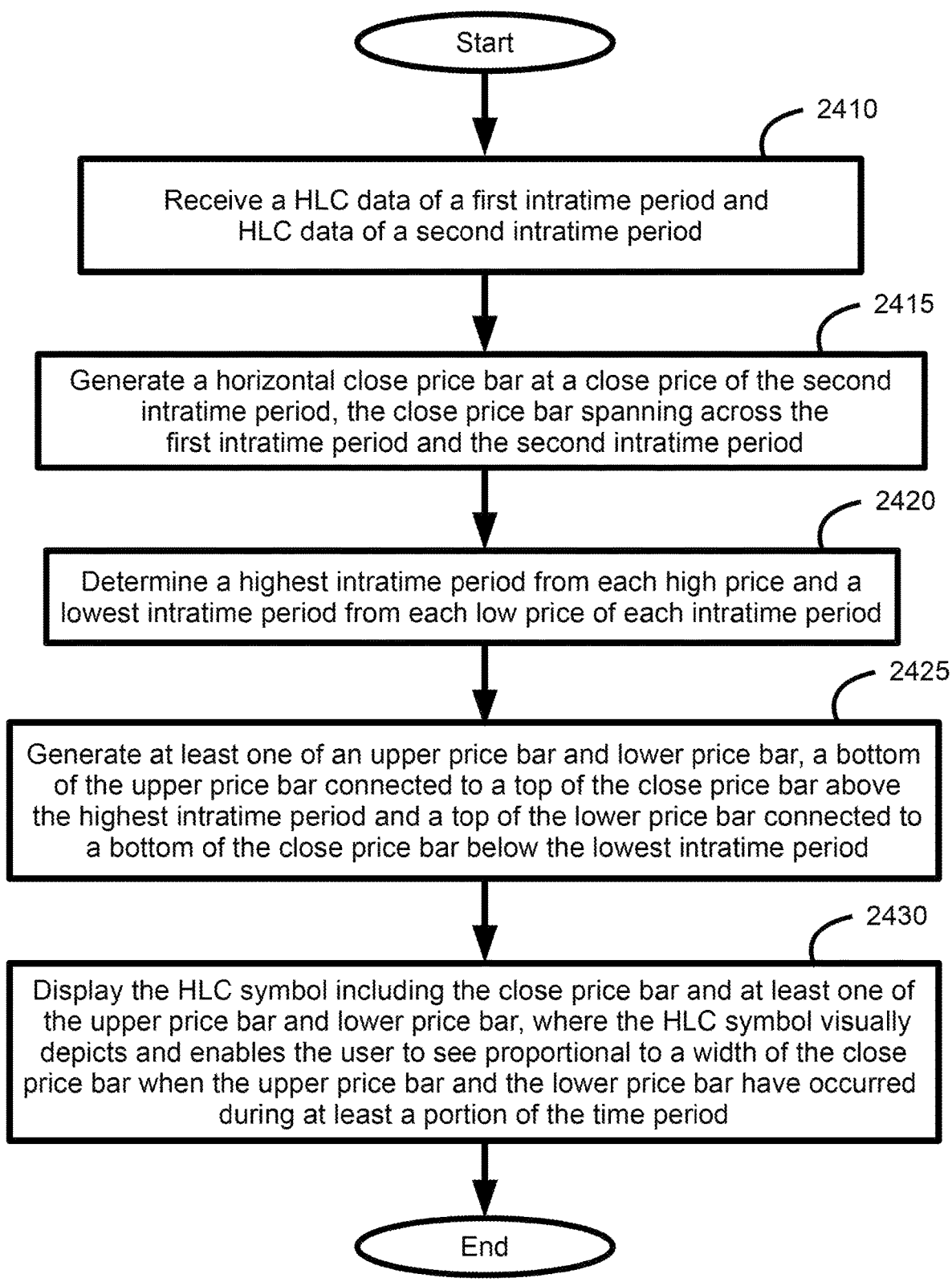
FIG. 24 is a flowchart illustrating the steps performed for generating and displaying a HLC symbol in accordance with the present invention.

FIG. 24 is a flowchart illustrating the steps performed for generating and displaying a HLC symbol in accordance with the present invention. Rather than the method of generating a widening HLC symbol by the successive repetitive drawing of adjacent vertical lines for each intra-time period and then erasing portions of lines to form a dynamic HLC symbol (see FIG. 17), an alternate method can also be used which is to erase a prior drawn HLC symbol and redraw and replace it with a current HLC symbol having a wider horizontal close price bar after each intra-time period. When a network access device 210 receives real-time security market data 225 including HLC data 350 (or generate HLC data from market data in the absence of HLC data, not shown) a device processor 315 in operative communication with a charting engine 340 can receive and/or generate in step 2410 a HLC data of a first intra-time period and HLC data of a second intra-time period and generate in step 2415 generate a horizontal close price bar at a close price of the second intra-time period, the close price bar spanning across the first intra-time period and the second intra-time period. A highest intra-time period from each high price and a lowest intra-time period from each low price of each intra-time period can then be determined in step 2420 and at least one of an upper price bar and lower price bar can be generated in step 2425 where a bottom of the upper price bar connects to a top of the close price bar above the highest intra-time period and a top of the lower price bar connects to a bottom of the close price bar below the lowest intra-time period. The HLC symbol can then be displayed in step 2430 that includes the close price bar and at least one of the upper price bar and lower price bar, where the HLC symbol visually depicts and enables the user to see proportional to a width of the close price bar when the upper price bar and the lower price bar have occurred during at least a portion of the time period.

These above steps can be repeated for each intra-time period within to dynamically generate and display a widening HLC symbol after passage of each current intra-time period by repetitively erasing the previous drawn HLC symbol and generating and displaying a current HLC symbol from a HLC data of the current intra-time period, the current HLC symbol having a current close price bar and at least one of a current upper price bar and lower price where the width of the current close price bar is equal to the sum of the width of the current intra-time period and each width of all the prior intra-time periods. This can continue until the final intra-time period of the time period where the current HLC symbol is erased and a final HLC symbol is generated and displayed having a final close price bar and at least one of a final upper price bar and lower price bar where the width of the final close price bar is equal to the width of the time period.

Figure 25:
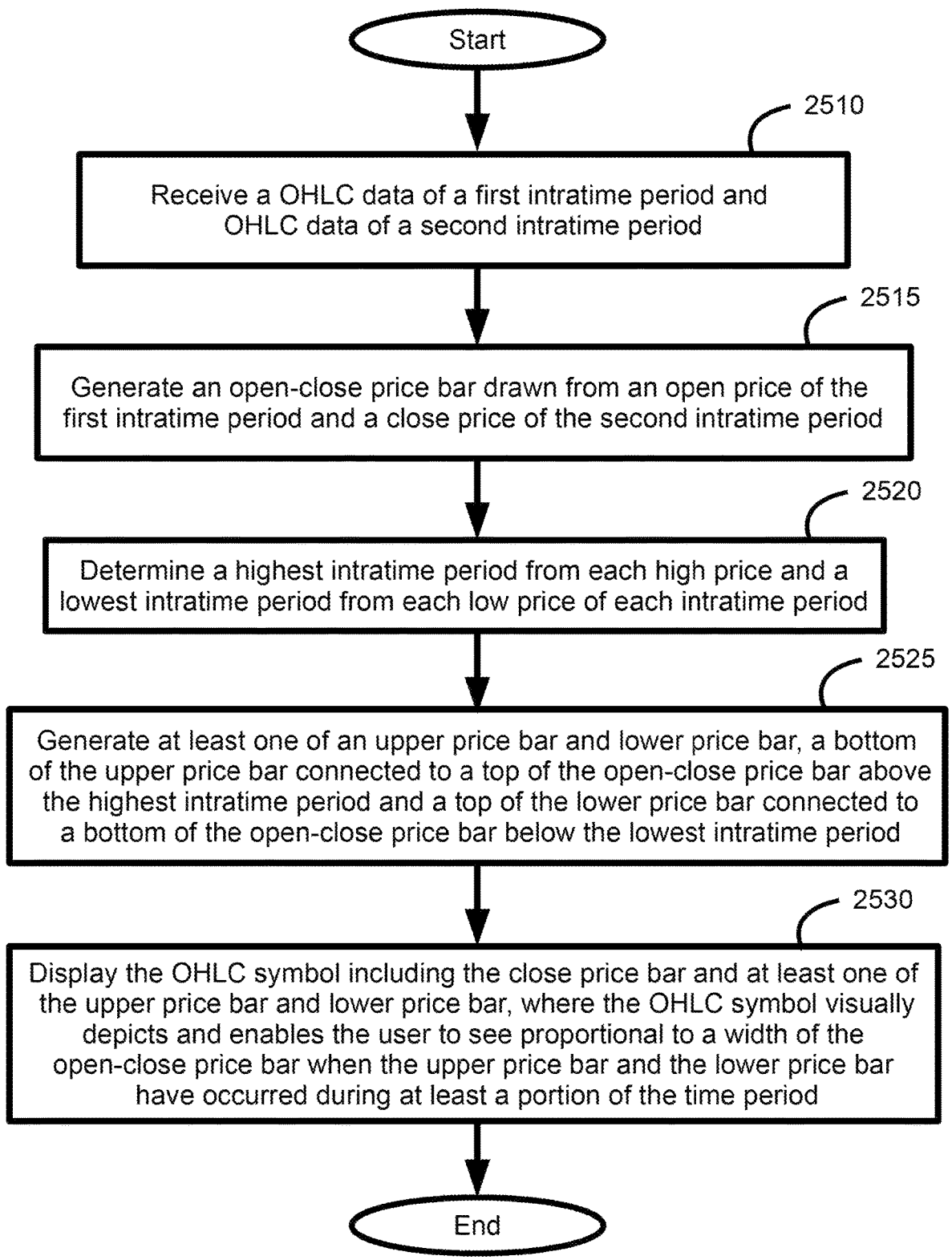
FIG. 25 is a flowchart illustrating the steps performed for generating and displaying a OHLC symbol in accordance with the present invention.

FIG. 25 is a flowchart illustrating the steps performed for generating and displaying a OHLC symbol in accordance with the present invention. Techniques described above (see FIG. 23, FIG. 24) can also be applied to the method of generating a widening OHLC symbol by the successive repetitive drawing of adjacent vertical lines for each intra-time period and then erasing portions of lines to form a dynamic OHLC symbol, an alternate method can also be used which is to erase a prior drawn OHLC symbol and redraw and replace it with a current OHLC symbol having a wider open-close price bar after each intra-time period. When a network access device 210 receives real-time security market data 225 including OHLC data 350 (or generate OHLC data from market data in the absence of OHLC data, not shown) a device processor 315 in operative communication with a charting engine 340 can generate and display in step 2510 a OHLC data of a first intra-time period and OHLC data of a second intra-time period and generate in step 2515 generate an open-close price bar drawn from an open price of the first intra-time period and a close price of the second intra-time period. A highest intra-time period from each high price and a lowest intra-time period from each low price of each intra-time period can then be determined in step 2520 and at least one of an upper price bar and lower price bar can be generated in step 2525 where a bottom of the upper price bar connects to a top of the open-close price bar above the highest intra-time period and a top of the lower price bar connects to a bottom of the open-close price bar below the lowest intra-time period. The OHLC symbol can then be displayed in step 2530 that includes the open-close price bar and at least one of the upper price bar and lower price bar, where the OHLC symbol visually depicts and enables the user to see proportional to a width of the open-close price bar when the upper price bar and the lower price bar have occurred during at least a portion of the time period.

These above steps can be repeated for each intra-time period within to dynamically generate and display a widening OHLC symbol after passage of each current intra-time period by repetitively erasing the previous drawn OHLC symbol and generating and displaying a current OHLC symbol from a OHLC data of the current intra-time period, the current OHLC symbol having a current open-close price bar and at least one of a current upper price bar and lower price where the width of the current open-close price bar is equal to the sum of the width of the current intra-time period and each width of all the prior intra-time periods. This can continue until the final intra-time period of the time period where the current OHLC symbol is erased and a final OHLC symbol is generated and displayed having a final open-close price bar and at least one of a final upper price bar and lower price bar where the width of the final open-close price bar is equal to the width of the time period.

The present invention can also include generating OHLC data and/or HLC data in real-time after each intra-time period from time/sales data streamed during the intra-time period or after each change in last price from time/sales data where the time period can range from a fraction of a second to decades and the intra-time period can visually depict price and time as small as in a one pixel wide column of one or more pixels. Though a time period as generally presented above references a selected predetermined time period for representing a final completed HLC type symbol or OHLC type symbol whether by default settings or by user selection, one can also implement the instant invention from the context of having a variable time period as will be shown.

FIG. 26-A is a flowchart illustrating the steps performed for generating a price range symbol in accordance with the present invention. When a network access device 210 receives in step 2610 real-time market price data 225 a device processor 315 in operative communication with a charting engine 340 can process the stream of fluctuating prices, each price occurring at a different corresponding time and determine from the price stream in step 2615 an open price occurring at an initial time and a last price occurring at a last time, the (v variable) time period extending from the initial time to the last time. As each new price or price change is processed and current enhanced OHLC data is calculated and updated so to does the variable time period increment and get successively longer in duration based on the last time of the last price. This variable time period can also be a variable intra-time period within a longer fixed predetermined time period. A highest price occurring at a first time within the time period and a lowest price occurring at a second time within the time period can then be determined in step 2620 from the price stream and generate, by a charting engine in step 2625, a symbol based on the open price, the last price, the highest price, and the lowest price. The charting engine can then display in step 2630, the symbol, which includes a first indicator indicating the first time corresponding to the highest price and a second indicator indicating the second time corresponding to the lowest price.

FIG. 26-B is a flowchart illustrating the steps performed for generating a candlestick in accordance with the present invention. After a highest price occurring at a first time within the time period and a lowest price occurring at a second time within the time period is determined (2620) from the price stream, a candle body can be generated in step 2650 from the open price and the last price where a height of the candle body indicates a difference between the open price and the last price, and a width of the candle body indicates a difference between the last time and the initial time. An upper wick and a lower wick can then be generated in step 2655 based on the open price, the last price, the highest price, and the lowest price. The charting engine can then display in step 2660 the candlestick, which includes the candle body, the upper wick, and the lower wick, where the upper wick extends from an upper surface of the candle body at a first point corresponding to the first time and the lower wick extends from a lower surface of the candle body at a second point corresponding to the second time.

Though certain examples above present how an upper wick and lower wick are generated and displayed. It can be the case at times when only the upper wick is drawn (e.g., when the open price equals the lowest price) or when only the lower wick is drawn (e.g. when the open price equals the highest price) or in rare cases when no wicks are drawn (e.g. the open price equals the lowest price and the close price equals the highest price). The invention is not dependent on either or both wicks being drawn. In the case of no wicks (when prices do nothing but go up over time), the candle body would rise in height but also widen relative to the last time with respect to the current time period. The invention is about the spatiotemporal relationships to the highest price and the time of the highest price, the lowest price and the time of the lowest price, and the last price and the time of the last price. In the case at the end of the period when the last price equals the close price then the relationship extends to the close price and the time of the close price. These relationships can also be in relationship to the open price at the start of the time period though the invention is not dependent upon the open price.

FIG. 27-A is an illustration of an enhanced candlestick including a plurality of upper and lower wicks that can be generated in accordance with the present invention. A candlestick is shown having a candle body 2703 with a plurality of upper wicks (2705, 2707, 2709) projecting upward from a first set of connection points connecting to the top surface of the candle body 2703 and a plurality of lower wicks (2713, 2715, 2717) projecting downward from a second set of connection points connecting to the bottom surface of the candle body 2703. The highest price is represented as the highest upper wick 2705, the second-most highest price is represented as the second-most upper wick 2707, and the third-most highest price is represented as the third-most upper wick 2709. In turn, the lowest price is represented as the lowest lower wick 2713, the second-least lowest price is represented as the second-least lower wick 2715, and the third-least lowest price is represented as the third-least lower wick 2717.

FIG. 27-B is a flowchart illustrating the steps performed for generating and displaying a candlestick including a second upper wick and second lower wick in accordance with the present invention. When a network access device 210 receives in step 2720 real-time market price data 225 a device processor 315 in operative communication with a charting engine 340 can process the stream of fluctuating prices, each price occurring at a different corresponding time and determine from the price stream the highest price at a first time, the lowest at a second time, the second highest price at a third time, the second lowest price at a fourth time, and a last (traded) price at a fifth time, it is then determined in step 2725 whether the last price is greater than the open price. When it is determined that the last price is greater than the open price then a candle body with a plurality of upper and lower wicks can be generated in step 2730 with a first upper wick that indicates a difference between the highest price and the last price, a first lower wick that indicates a difference between the last price and the open price, a second upper wick that indicates a difference between the second-most highest price and the last price, and a second lower wick that indicates a difference between the second-least lowest price and open price. When it is determined that the last price is not greater than the open price then a candle body with a plurality of upper and lower wicks can be generated in step 2735 with a first upper wick that indicates a difference between the highest price and the open price, a first lower wick that indicates a difference between the lowest price and the last price, a second upper wick that indicates a difference between the second-most highest price and the open price, and a second lower wick that indicates a difference between the second-least lowest price and last price.

The charting engine can then display in step 2740, a candlestick type symbol which includes the candle body, the plurality of the upper wicks, and the plurality of lower wicks. It will be appreciated that similar methods can be applied to displaying a third upper wick of a third-most highest price and a third lower wick of a third-least lowest price, and so on through to a Nth upper wick of a Nth-most highest price and a Nth lower wick of a Nth-least lowest price. For instance, the present invention can also include determining an Nth-most highest price at an Nth highest time and an Nth-least lowest price at an Nth lowest time and displaying an Nth-most upper wick corresponding to the Nth highest time along with the plurality of upper wicks and displaying an Nth-least lower wick corresponding to the Nth lowest time along with the plurality of lower wicks.

FIG. 27-C is a flowchart illustrating the steps performed for generating and displaying a candlestick including a plurality of upper wicks and lower wicks in accordance with the present invention. When a network access device 210 receives in step 2750 real-time market price data 225 a device processor 315 in operative communication with a charting engine 340 such as OHLC (open, high, low, close) data for each intra-time period of the plurality of intra-time periods, a charting engine can then generate in step 2755, a candle body from an open price of a first intra-time period to a close price of a last intra-time period of the plurality of intra-time periods, based on the received OHLC data. All upper wick intra-time periods from which intra-time periods of the plurality of intra-time periods have an intra-time high price greater than the open price of the first intra-time period and greater than the close price of the last intra-time period can be determined in step 2760 and further determine in step 2765 all lower wick intra-time periods from which intra-time periods of the plurality of intra-time periods have an intra-time low price lower than the open price of the first intra-time period and lower than the close price of the last intra-time period. A charting engine can then generate in step 2770, an upper wick for each upper wick intra-time period and a lower wick for each lower wick intra-time period, a bottom of each upper wick being connected to a top of the candle body within each upper wick intra-time period, and a top of each lower wick being connected to a bottom of the candle body within each lower wick intra-time period and then display in step 2775, the candlestick including the candle body and at least one of the generated upper wicks and the generated lower wicks.

FIG. 28-A is a diagram depicting an exemplary configuration settings interface in accordance with the present invention. A user modifiable configuration settings interface 335 can include settings for the user to select that control whether the current symbol width 2820 is magnified and whether the prior symbol(s) width 2825 are magnified. A user can further select (not shown) how many prior symbols to magnify. User selection can also further control whether an end of time period demarcation indicator 2830 is displayed, whether to display multiple high and low indicators 2835 (e.g., upper wicks and lower wicks, see FIG. 27-A), whether to enable display of dimmed ghost price range symbols 2837 that represent synthetic last price estimates in the absence of last price data from illiquid assets, and whether to display closed market time gaps 2839 such as when a market is closed overnight, or for the weekend and holidays. Further settings can include a symbol rendering method 2840 for a user to select from a plurality of OHLC type symbols and HLC type symbols such as candlesticks, cross sticks, HLC bars, quadrilaterals, triangles, contiguous lines, right angles, and dots in which to render and display a price range during a given time period, a time period 2845 for a user to select from a plurality of time periods, and a time gap fill method 2848 for a user to select what context sensitive content (e.g., news, advertisements, ghost symbol price estimates) to place in empty chart time gaps due to a closed market such as overnight, weekends, and holidays.

The user can also select from a plurality of intra-time period resolution values 2850. This becomes critical when applying the instant invention toward historical HLC or OHLC type data. Chart libraries that do not receive enhanced OHLC data directly to access upper and lower wick position values can still be adapted to generate enhanced HLC or OHLC type symbols with the selected intra-time period resolution value 2850. For example, when a user selects a one-minute time period for each symbol as well as select the number sixty as the intra-time period resolution value, these parameters can be used to instruct the charting engine to fetch sixty time slices of OHLC data that are one second each which allows the engine to render a single one minute candle that is a composite of what typically would have been sixty candles with a one second time period (as will be shown in FIG. 28-B).

The symbol rendering method are sets of instructions in the chart library to draw the newly discovered price range symbols which have been presented throughout the instant invention. For instance, cross sticks is a label for the price range symbol (1920), HLC bars is a label for the price range symbols (1100, 1200), quadrilateral is a label for the price range symbol (2220), triangle is a label for the price range symbol (2230), contiguous lines is a label for the price range symbols (1930, 2240), right angles is a label for the price range symbol (1160), and dots is a label for the price range symbols (2250, 2260).

FIG. 28-B is a flowchart illustrating the steps performed for generating and displaying an OHLC type symbol from obtained OHLC data in accordance with the present invention. When a time period having a first duration T and an intra-time-period resolution value N are received in step 2860, a second duration can be calculated in step 2865 by dividing T by N then N rows of OHLC data, can be obtained in step 2870 where each row of the obtained OHLC data is representative of price changes over a time period having the second duration. An OHLC type symbol can then be generated and displayed in step 2875 based on the received N rows of OHLC data. These steps are critical particularly when charting engines do not have access to enhanced OHLC data. Typically, when a user wishes to review a price chart on a different time scale, the user will select the time period T (2845). The user can then also select the intra-time-period resolution value N (2850) but is not required to as settings can be further configured to create default value pairs between the time period T and intra-time-period resolution value N. For instance, when T equals one minute a default N can equal sixty which would fetch sixty one second interval OHLC data and combine them into a single OHLC data of one minute interval with the ability to approximate the highest and lowest position value (e.g., upper wick and lower wick of a candlestick) that can be used to instruct how the symbol is rendered and displayed.

In another example, when T equals one day a default N can equal thirty nine. Since there are three hundred ninety minutes in a trading day, thirty nine OHLC data each of a ten minute interval can then be retrieved. Though it is contemplated that the newly taught price range symbols of the instant invention has a majority of cases most useful to traders and active managers, an example of a use case for wealth management and investor approaches to money management could display a candlestick price chart by selecting a T that equals one week corresponding to a default N of five, the result would be a weekly price chart where each candlestick can have five different upper and lower wick positions so in a single glance a user can observe trends as to which day of the week might be best to buy or sell. The present invention includes receiving the intra-time-period resolution value N in response to a user selecting the time period having the first duration T, where the intra-time-period resolution value N is a default value corresponding to the first duration T and receiving the intra-time-period resolution value N includes retrieving the intra-time-period resolution value N from a default N-value/T-duration pair list. The present invention also includes receiving the intra-time-period resolution value N in response to a user selecting the intra-time-period resolution value N where the value N is an integer greater than one and the second duration is an integer.

FIG. 29-A is an illustration of an end of time period demarcation indicator in accordance with the present invention. By revisiting row 660 of FIG. 6, which shows the progression of each intra-time period (630, 635, 640, 645, 650) where the width of the candlestick widens as wide as the width of the current and prior intra-time periods during the entire time period, an end of time period demarcation indicator 2910 is drawn adjacent to the current partial OHLC type symbol or also known as an OHLL type symbol that is being updated and redrawn. The demarcation indicator 2910 serves as a reference point to the user, to visually gain a sense of what portion of the current time period has lapsed and how much time in the current time period remains. So as the OHLL type symbol widens, the symbol gets closer and closer to the demarcation indicator. The OHLL type symbol transforms into a final historical completed OHLC type symbol when the last price is also the close price marking the end of the time period. The demarcation indicator 2910 can then be erased which would further signal that the price range symbol is a completed OHLC type symbol and no longer a partial OHLC type symbol or rather OHLL type symbol.

FIG. 29-B is an illustration of a price chart including price range symbols with a plurality of fixed widths in accordance with the present invention. There appears to be a trend of user growth in using a smart phone device to access a trading application for trading and monitoring assets via price charts. The trend of chart usage on smaller size screens can present an obstacle to the number of symbols that can be displayed. For a trader, the constant redrawing of a current price range symbol of a current time period is the most visually informing, particularly for the type of trader known as a "trade what you see" trader. The instant invention solves the problem of limited screen size, by magnifying the width of the current price symbol 2920 when the magnify current symbol width 2820 has been selected. Though one could use a demarcation indicator (2910) as discussed above to have a visual sense where in the current time period, the current price symbol 2920 has currently widened to based upon the last price at a last time, the demarcation is not needed as the current price symbol 2920 can visually be compared to the prior most completed price range symbol when the magnify one or more prior symbols width (2825) has been selected. For instance, when symbols each have a thirty minute time period and one can visually estimate that the magnified width of the current price range symbol is about one half of the magnified width of the prior price range symbol, one can estimate that roughly fifteen minutes of time have lapsed into the current time period. One can compare these magnified symbols to a plurality of prior price range symbols 2930 that have no magnification of their respective width or selections can be made in configuration settings 335 (not shown) to uniformly reduce the respective width of each completed historical symbol. By using this approach to the display of price charts can enable a user to see a longer span of time which becomes more important regarding the display on smaller sized screens.

FIG. 29-C is a prior art illustration of a candlestick price chart with time axis labels in the middle of each time period. Illustrated are three ten minute candlesticks, the first candlestick occurring at 3 pm, the second candlestick occurring at 3:10 pm, and the third candlestick occurring at 3:20 pm with a display of current time at 3:24 pm. Upon closer review, another flaw can be seen in how the time axis is labeled. The 3 pm marking is in the middle of the time period when in actuality at that time is truly 3:05 pm. In essence, the current system of candlestick price charting is marked by one half of a given time period late. Further, the third candlestick is shown as full width implying that the full ten minutes have past when it is simply not the case with the display of the current time of 3:24 pm. To reiterate a previously presented flaw, is that there is no way to visually know when the high price or the low price has occurred during the time period. This prior art illustration is shown to contrast the most visually accurate way to draw candlesticks and overcome these deficiencies as will be shown in FIG. 29-D.

FIG. 29-D is an illustration of a candlestick price chart with time axis labels at the start of each time period in accordance with the present invention. There are clear contrasts in this illustration compared to the prior art price chart (see FIG. 29-C). For instance, the time axis is labeled more visually accurate with a start of the time period of the candlestick positioned vertically below a left-most surface of the candle body which can be seen for each candlestick at 3 pm and ten minute intervals thereafter. Further, the upper and lower wicks are shifted along the width of each candle body to present a more visually accurate representation of actual price action during each time period. Lastly the incomplete candlestick or OHLL having a partial candle body width starting at the 3:20 pm mark reflects the width progression to the current time of 3:24 pm where the width is 40% of the total width and would reach full width at the 3:30 pm mark when the incomplete candlestick would complete and convert from a OHLL type symbol to an OHLC type symbol. An optional demarcation indicator 2910 is displayed to illustrate that it can serve as a reference point to the user, to visually gain a sense of what portion of the current time period has lapsed and how much time in the current time period remains.

FIG. 29-E is a flowchart illustrating the steps performed for generating and displaying a price chart including a plurality of regions in accordance with the present invention. A first region including one or more historical completed price-range-over-time-range-type symbols can be displayed in step 2950, by a charting engine as well as a second region that can be displayed in step 2955 adjacent to the first region with the second region including a current uncompleted price range-over-an-uncompleted-time-range-type symbol corresponding to an uncompleted time range. In response to determining that the uncompleted time range has completed, a new historical completed price-range-over-time-range-type symbol adjacent to the one or more historical completed-price-range-over-time-range-type symbols can be generated and displayed in step 2960, by the charting engine, in the first region as well as erase (step 2960) in the second region, the current uncompleted price-range-over-an-uncompleted-time-range-type symbol.

In one example, both the first region and second region each display price range symbols, where each symbol has the same time period. The price chart can be configured to make the first region scrollable and the second region non-scrollable. The first region and second region are seamless and the user could not visually distinguish that there are regions. The non-scrollable second region helps place emphasis on the dynamic redrawing of a current uncompleted symbol which can also include both a magnified symbol width (2820) and a demarcation indicator (2910) to observe the widening symbol width approach the end of the current time period. Take an example of limited screen size, where the maximum number of symbols that can be drawn in a first region is fifty. When the first region is at full capacity and fifty historical completed symbols fully populate the first region, the moment it is discovered that the last price of streaming live open market data is in fact the close price of the current time period, the entire first region is redrawn to include forty nine of the most recent symbols from the fifty cited historical symbols earlier referenced and the newly completed fiftieth symbol is drawn adjacent to the redrawn forty nine symbols (to avoid scrolling) and at the same time erase the current uncompleted symbol in the second region to start a new partial symbol in a new time period. The first region would then have the option to be scrollable now that there are fifty one completed symbols drawn.

FIG. 30-A is a flowchart illustrating the steps performed for generating and displaying a demarcation indicator in accordance with the present invention. When a network access device 210 receives in step 3010 real-time market price data 225 a device processor 315 in operative communication with a charting engine 340 can process the stream of fluctuating prices, each price occurring at a different corresponding time and determine from the price stream the highest price at a first time, the lowest price at a second time, a last (traded) price at a third time, and the third time is before an end of the time period, then a demarcation indicator corresponding to a current HLL type symbol can be generated in step 3015 by drawing a spatiotemporal relationship between the highest price, the lowest price, and the last price in accordance with a selected symbol rendering method (2840), where a width of the HLL type symbol indicates a difference between the third time and an earlier of when the highest price occurred and when the lowest price occurred. The generated HLL type symbol can be displayed in step 3020 as well as the display of the demarcation indicator adjacent to the right of the generated HLL type symbol. The demarcation indicator is positioned at the end time of the time period where a width between a right most surface of the HLL type symbol and the demarcation indicator is a difference between the third time and the end of the time period.

FIG. 30-B is a flowchart illustrating the steps performed for generating and displaying a magnified width of a portion of a plurality of price range symbols in accordance with the present invention. When a network access device 210 receives in step 3030 real-time market price data 225 a device processor 315 in operative communication with a charting engine 340 can process the stream of fluctuating prices, each price occurring at a different corresponding time and determine from the price stream the highest price at a first time, the lowest price at a second time, a last (traded) price at a third time, and the third time is before an end of the time period, then a first portion of the OHLC type symbols, which have a first fixed width corresponding to the prior time period along with a second portion of the OHLC type symbols, which have a second fixed width corresponding to the prior time period, where the second fixed width is wider than the first fixed width can be generated and displayed in step 3035. The current OHLL type symbol can then be generated in step 3040 by drawing a spatiotemporal relationship between the open price, the highest price, the lowest price, and the last price in accordance with a selected symbol rendering method (2840), where a height of the current OHLL symbol indicates a difference between the highest price and the lowest price and a width of the current OHLL symbol indicates a difference between the start of the current time period and the third time, and a difference between the start of the current time period and an end of the current time period is equal to the second fixed width. The charting engine can then display in step 3040 the generated current OHLL type symbol adjacent to the plurality of displayed OHLC type symbols. It should be apparent that this can be applied to any set of price range symbols such as HLC and HLL type symbols as well.

FIG. 31-A is a flowchart illustrating the steps performed for generating an OHLL type symbol in accordance with the present invention. When a network access device 210 receives in step 3110 real-time market price data 225 a device processor 315 in operative communication with a charting engine 340 can process the stream of fluctuating prices, each price occurring at a different corresponding time and determine from the price stream the highest price at a first time, the lowest price at a second time, a last (traded) price at a third time, and the third time is before an end of the time period, an OHLL type symbol can then be generated in step 3115 by drawing a spatiotemporal relationship between the open price, highest price, the lowest price, and the last price according to a selected symbol rendering method, where a height of the OHLL type symbol indicates a difference between the highest price and the lowest price, a width of the OHLL type symbol Indicates a difference between the start of the time period and the third time a width between the highest price and lowest price indicates a difference between the first time and the second time. The generated OHLL type symbol can be displayed in step 3120.

The present invention can include that a width between the highest price and the last price indicates a difference between the first time and the third time, and a width between the lowest price and the last price indicates a difference between the second time and the third time where the spatiotemporal relationship is a spatiotemporal relationship between the highest price, the lowest price, and the last price relative to a fixed position of the open price.

The open price is a known static fixed point that marks the start of a time period or intratime period and is unchanging. An aspect of the present invention examines the relationship of the open price with respect to the changing prices during a time period or intratime period of the highest price, the lowest price, and the last price until a close price is determined marking the end of the time period or intratime period.

As a time period progresses, received price changes that fluctuate can be updated by redrawing an ever widening OHLL (open, high, low, last) type symbol. An OHLL type symbol is a partial or uncompleted OHLC type symbol which remains so until a close price is determined transforming the OHLL type symbol into a final OHLC type symbol at the end of the time period. When a symbol is completed, it is considered the past and historical. OHLC data of that time period can be archived, stored in memory, and appended to historical enhanced OHLC data and the price chart can scroll all the completed OHLC type symbols to the left and make room for drawing and updating a new current OHLL type symbol that widens as time progresses during the current time period.

The invention does not need to depend upon the open price. The drawing and updating of the ever changing spatiotemporal relationships between a highest price, lowest price and last price of price fluctuations during the course of a time period is a root of the present teachings. Similarly, an HLL type symbol is a partial or uncompleted HLC type symbol which remains so until a close price is determined transforming the HLL type symbol into a final HLC type symbol. Upon such a completed symbol, the price chart can scroll all completed HLC type symbols to the left so that they become historical in the past and make room for drawing and updating a new current HLL type symbol that widens as time progresses during the current time period.

Though the last price is generally known as the most recent sale price or last traded price, regarding the instant invention, the last price is broadened to further mean any price between and including a bid price and an ask price. There are many stocks and options that have small liquidity and very little sale activity. There can be relatively longer periods of time between one sale price and the next, where the only price data that is available would be the bid/ask prices. There are some cases when it would be useful to treat an average price between the bid price and ask price the same as a last price, which can yield better price chart continuity. Such an average could be considered a proxy last price as a substitute and give a better sense as to approximate price action when no sales are taking place.

FIG. 31-B is a flowchart illustrating the steps performed for generating a ghost symbol in accordance with the present invention. When a network access device 210 receives in step 3121 real-time market price data 225 a device processor 315 in operative communication with a charting engine 340 can process the stream of fluctuating prices, each price occurring at a different corresponding time where a highest price occurred at a first time within the time period, a lowest price occurred at a second time within the time period, and a last price occurred at a third time within the time period, in which the last price is lower than the highest price and higher than the lowest price, and a bid price and an ask price corresponds to a fourth time within the time period and there is no new last price that corresponds to the fourth time then it can be determined in step 3123 whether the last price is lower than the bid price or higher than the ask price. In response to the determining that the last price is not lower than the bid price and not higher than the ask price, the last price can be updated in step 3125 to correspond to the fourth time, and generate, by a charting engine, a symbol by drawing, at a first luminosity level, a spatiotemporal relationship between the highest price, the lowest price, and the last price in accordance with a selected symbol rendering method. However, in response to the determining that the last price is lower than the bid price or higher than the ask price, then an estimated last price can be generated in step 3127 from the bid price and the ask price, and correspond the estimated last price to the fourth time, and generate, by a charting engine, the symbol by drawing, at a second luminosity level, a spatiotemporal relationship between the highest price, the lowest price, and the estimated last price in accordance with a selected symbol rendering method, and then display in step 3129, by the charting engine, the generated symbol at a particular position.

The second luminosity level can be dimmer than the first luminosity level and the generated symbol displayed at the second luminosity level can be more particularly called a "ghost symbol". The ghost symbol provides visual indication to the user that the symbol is generated based upon an estimated price rather than an actual price. The above steps can be performed when the display dimmed ghost price range symbols 2837 is selected and enabled in configuration settings 335. By default, the estimated price is the midpoint or average of the bid price and the ask price. The bid price and the ask price are received in real-time from bid/ask tick data 225 of a live open market streamed during the time period where the time period is one of a group of ticks and between a fraction of a second and decades.

FIG. 31-C is a flowchart illustrating the steps performed for generating an HLL type symbol in accordance with the present invention. When a network access device 210 receives in step 3130 real-time market price data 225 a device processor 315 in operative communication with a charting engine 340 can process the stream of fluctuating prices, each price occurring at a different corresponding time and determine from the price stream the highest price at a first time and the lowest price at a second time, a last price that occurred at a third time can be received in step 3135 where it is determined that the received last price is lower than the highest price and higher than the lowest price and the third time occurred before an end of the time period. In response to determining that the received last price is lower than the highest price and higher than the lowest price, the HLL type symbol can then be generated in step 3140 by drawing a spatiotemporal relationship between the highest price, the lowest price, and the last price in accordance with a selected symbol rendering method, where a height of the HLL type symbol indicates a difference between the highest price and the lowest price, a width of the HLL type symbol indicates a difference between the third time and an earlier of the first time and the second time, and a width between the highest price and the lowest price indicates a difference between the first time and the second time. The generated HLL type symbol can then be displayed in step 3145. The present invention can include that a width between the highest price and the last price indicates a difference between the first time and the third time, and a width between the lowest price and the last price indicates a difference between the second time and the third time.

Figure 32:
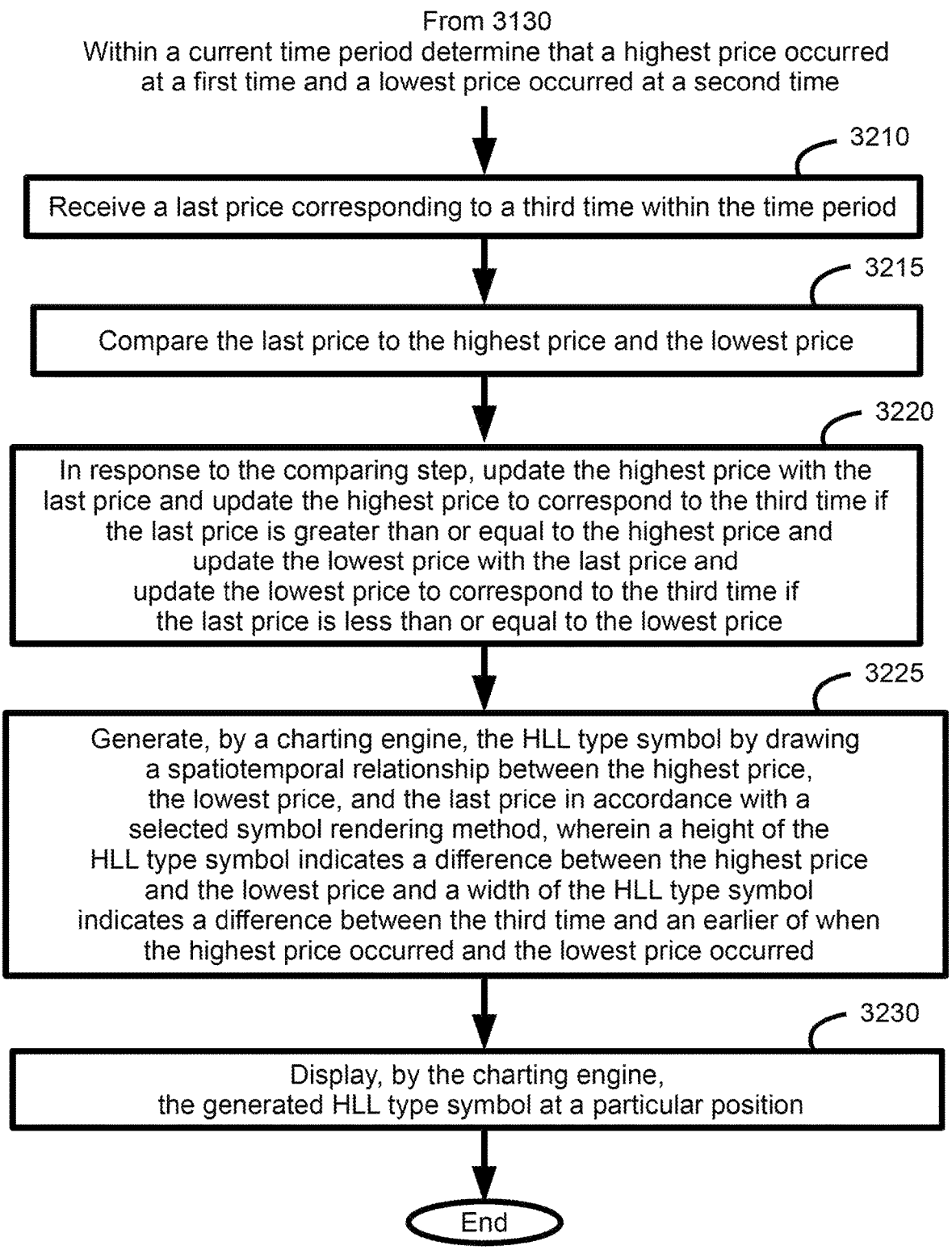
FIG. 32 is a flowchart illustrating the steps performed for generating a price range symbol in accordance with the present invention.

FIG. 32 is a flowchart illustrating the steps performed for generating a price range symbol in accordance with the present invention. After a network access device 210 receives (step 3130) real-time market price data 225 a device processor 315 in operative communication with a charting engine 340 can process the stream of fluctuating prices, each price occurring at a different corresponding time and determine from the price stream the highest price at a first time and the lowest price at a second time, a last price that occurred at a third time within the time period can be received in step 3210. The last price can then be compared in step 3215 to both the highest price and the lowest price. The highest price can be updated with the last price in step 3220 and also update the highest price to correspond to the third time if the last price is greater than or equal to the highest price and, in turn, the lowest price can be updated with the last price and also update the lowest price to correspond to the third time if the last price is less than or equal to the lowest price. A charting engine can then generate the HLL type symbol in step 3225 by drawing a spatiotemporal relationship between the highest price, the lowest price, and the last price in accordance with a selected symbol rendering method, where a height of the HLL type symbol indicates a difference between the highest price and the lowest price and a width of the HLL type symbol indicates a difference between the third time and an earlier of when the highest price occurred and the lowest price occurred. The charting engine can then display in step 3230, the generated HLL type symbol at a particular position.

The present invention can include the time period as a first time period, the first time period is an intra-time period within a second time period, and the second time period is longer in duration than the first time period and the changes in price are of a market-traded object representative of one of a physical asset, a digital asset, an asset pair, and a ratio between a plurality of different assets.

In cases, where the above method steps are repeated particularly when dynamically widening the width of a current price range symbol upon the continued stream of tick data or last sale data, the present invention can also include receiving a new last price corresponding to a new last time within the time period, wherein the new last time occurred later than the last time in the time period and the symbol is a prior symbol, comparing the new last price to the highest price and the lowest price, updating the highest price to be the new last price and updating the highest price to correspond to the new last time, when the new last price is greater than or equal to the highest price, updating the lowest price to be the new last price and updating the lowest price to correspond to the new last time, when the new last price is less than or equal to the lowest price, generating a new symbol based on the open price, the highest price, the lowest price, and the new last price, erasing the prior symbol at the particular position, and displaying the new symbol at the particular position, wherein a width of the new symbol is wider than a width of the previously displayed prior symbol.

The present invention can include determining that the last price is a close price that occurred at an end time of the time period and the generated HLL type symbol is a HLC (high, low, close) type symbol, when the third time equals the end time of the time period or in determining that the last price is not a close price and the generated HLL type symbol is a partial HLC type symbol and displaying a demarcation indicator positioned at an end time of the time period, when the third time does not equal the end time of the time period.

The present invention can include determining, based on a result of the comparing step, that the received last price is lower than the highest price and higher than the lowest price, where a width in the HLL type symbol between the highest price and the lowest price indicates a difference between the first time and the second time within the time period, a width in the HLL type symbol between the highest price and the last price indicates a difference between the first time and the third time within the time period, and a width in the HLL type symbol between the lowest price and the last price indicates a difference between the second time and the third time within the time period.

The present invention can include that the particular position at which the generated HLL type symbol is displayed is adjacent to a plurality of HLC type symbols. The present invention can include that the time period for each HLC type symbol of the plurality of HLC type symbols is of equal duration, a first portion of each of the HLC type symbols is drawn having a first fixed width corresponding to the time period, and the generated HLL type symbol and a second portion of the HLC type symbols are drawn having a second fixed width corresponding to the time period, wherein the second fixed width is greater than the first fixed width.

The present invention can include that new HLL type symbol is displayed adjacent to one or more HLC type symbols where the time period is between a fraction of a second and decades and the selected symbol rendering method is selected from one of a triangle, HLC bars, dots, and contiguous. The present invention can include generating HLC data in real-time from streaming time/sales data and updating a data structure with each new generated HLC data. In the case, of any OHLC or OHLL type of price range symbols, the present invention can include that the selected symbol rendering method is selected from one of a candlestick, cross sticks, quadrilateral, dots, and contiguous.

The present invention can include that an open price occurred at a start of the time period and the HLL type symbol is a OHLL (open, high, low, last) type symbol, which is generated by drawing the spatiotemporal relationship between the open price, the highest price, the lowest price, and the last price in accordance with a selected symbol rendering method, wherein a height of the OHLL type symbol indicates a difference between the highest price and the lowest price, and a width of the OHLL type symbol indicates a difference between the start of the time period and the third time within the time period.

FIG. 33-A is a flowchart illustrating the steps performed for generating a data structure used to generate a HLC or OHLC type symbol in accordance with the present invention. When a network access device 210 receives in step 3310 real-time market price data 225 a device processor 315 in operative communication with a charting engine 340 can process the stream of fluctuating prices, each price occurring at a different corresponding to a unique time within a time period and determine from the received plurality of the prices in step 3315, an open price corresponding to a start of the time period, a highest price corresponding to a first time within the time period, a lowest price corresponding to a second time within the time period, and a close price corresponding to an end of the time period. A highest symbol position value indicating when the first time occurred between the start of the time period and the end of the time period can be calculated in step 3320 as well as a lowest symbol position value indicating when the second time occurred between the start of the time period and the end of the time period can be calculated in step 3325. The time period, the open price, the highest price, the lowest price, the close price, the highest symbol position value, and the lowest symbol position value can be stored in step 3330 in association with one another in the data structure on a non-transitory computer readable medium.

For example, when a candlestick is selected as the OHLC type symbol from the symbol rendering method 2840, the highest symbol position value can be considered an upper wick position value, and the lowest symbol position value considered as a lower wick position value. The present invention can further including generating the data structure in real-time from time/sales data of a live open market streamed during the time period as well as generate the HLC or OHLC type symbol from data stored in the data structure.

FIG. 33-B is a flowchart illustrating the steps performed for generating a data structure used to generate a HLL or OHLL type symbol in accordance with the present invention. When generating HLL or OHLL type symbols instead of HLC or OHLC type symbols, the last price is used instead of the close price. After a network access device 210 receives (step 3310) real-time market price data 225 a device processor 315 in operative communication with a charting engine 340 can process the stream of fluctuating prices, each price occurring at a different corresponding to a unique time within a time period and determine from the received plurality of the prices in step 3335, an open price corresponding to a start of the time period, a highest price corresponding to a first time within the time period, a lowest price corresponding to a second time within the time period, and a last price corresponding to a third time within the time period. A highest symbol position value indicating when the first time occurred between the start of the time period and the end of the time period can then be calculated (step 3320).

FIG. 33-C is a flowchart illustrating the steps performed for calculating a symbol partial-width value based upon when the last price occurred during a time period in accordance with the present invention. After a lowest symbol position value indicating when the second time occurred between the start of the time period and the end of the time period is calculated (step 3325), a symbol partial-width value indicating when the third time occurred between the start of the time period and the end of the time period can be calculated in step 3340. The time period, the open price, the highest price, the lowest price, the last price, the highest symbol position value, the lowest symbol position value, and the symbol partial-width value can then be stored in step 3345 in association with one another in the data structure on a non-transitory computer readable medium. The symbol partial-width value forever widens upon each successive last price or price change and is used to accurately draw price range symbol width of a HLL or OHLL type symbol, which can also be considered a partial or incomplete HLC or a partial or incomplete OHLC type symbol.

Similarly, when OHLL type symbol is a partial enhanced candlestick, the highest symbol position value can be considered an upper wick position value, the lowest symbol position value considered as a lower wick position value, and the symbol partial-width value is a candle-body partial-width value. The present invention can also generate the HLL or OHLL type symbol from data stored in the data structure.

FIG. 33-D is a flowchart illustrating the steps performed for generating a data structure corresponding to a plurality of intra-time periods used to generate a HLC or OHLC type symbol in accordance with the present invention. When a network access device 210 receives in step 3360 real-time market price data 225 a device processor 315 in operative communication with a charting engine 340 such as OHLC (open, high, low, close) data for each intra-time period of the plurality of intra-time periods, where each piece of the OHLC data corresponds to a unique intra-time period within a time period, it can then be determined in step 3365, from the received plurality of the OHLC data, an open price corresponding to a start of the time period, a highest price corresponding to a first intra-time period, a lowest price corresponding to a second intra-time period, and a close price corresponding to an end of the time period. A highest symbol position value indicating when the first intra-time period occurred between the start of the time period and the end of the time period can be calculated in step 3370 as well as a lowest symbol position value indicating when the second intra-time period occurred between the start of the time period and the end of the time period can be calculated in step 3375. After which, the time period, the open price, the highest price, the lowest price, the close price, the highest symbol position value, and the lowest symbol position value can then be stored (step 3330) in association with one another in the data structure on a non-transitory computer readable medium.

Figure 34:
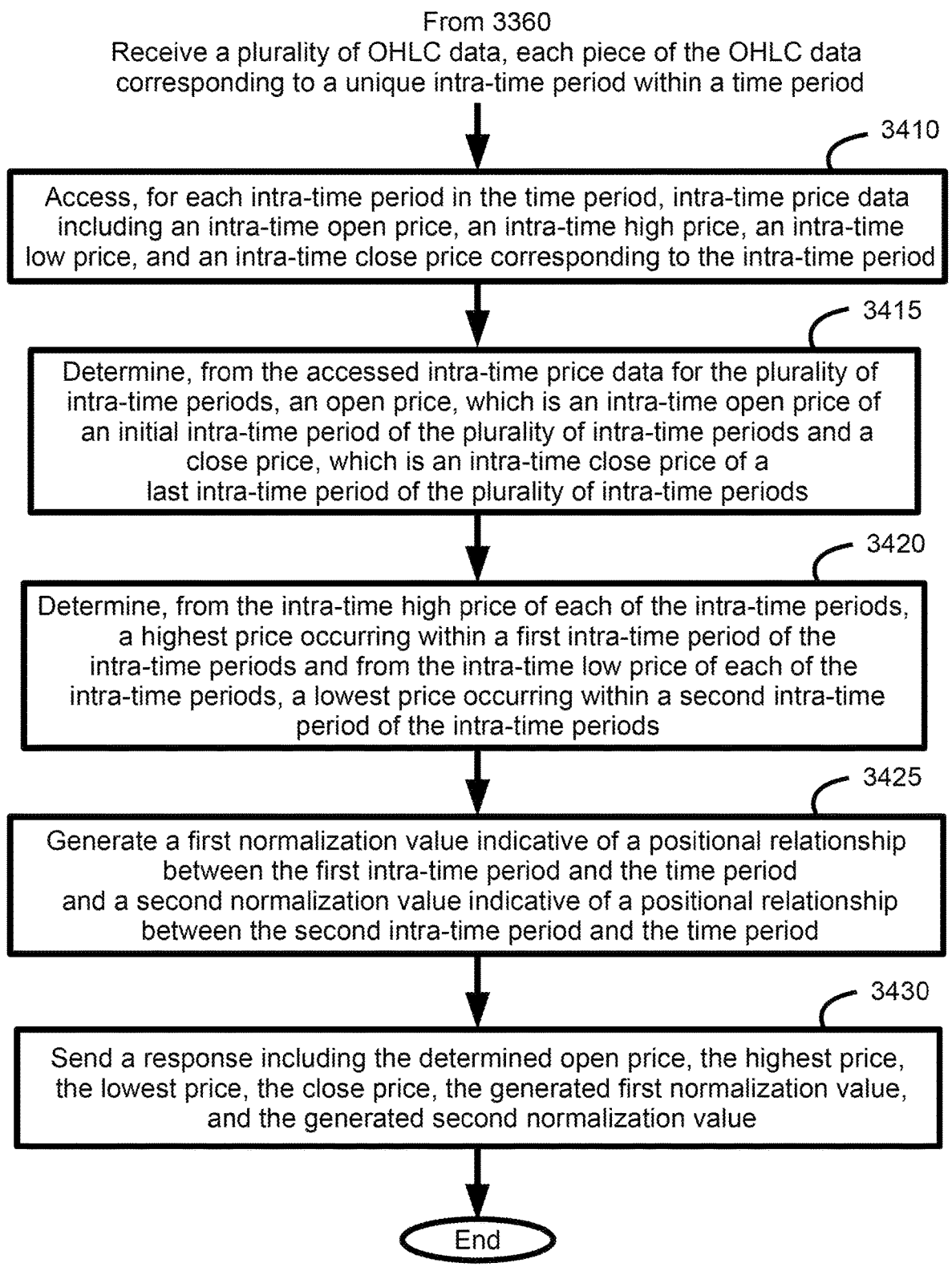
FIG. 34 is a flowchart illustrating the steps performed of an apparatus configured to generate normalization values indicative of a positional relationship in accordance with the present invention.

FIG. 34 is a flowchart illustrating the steps performed for an apparatus configured to generate normalization values indicative of a positional relationship in accordance with the present invention. An apparatus can include processing circuitry configured to receive, from a requestor, (3360) a request to obtain OHLC data representative of a time period and then access, for each intra-time period of a plurality of intra-time periods in the time period, in step 3410 intra-time price data including an intra-time open price, an intra-time high price, an intra-time low price, and an intra-time close price corresponding to the intra-time period. It can then be determined in step 3415, from the accessed intra-time price data for the plurality of intra-time periods, an open price, which is an intra-time open price of an initial intra-time period of the plurality of intra-time periods and a close price, which is an intra-time close price of a last intra-time period of the plurality of intra-time periods. It can then be further determined in step 3420, from the intra-time high price of each of the plurality of intra-time periods, a highest price occurring within a first intra-time period of the plurality of intra-time periods and from the intra-time low price of each of the plurality of intra-time periods, a lowest price occurring within a second intra-time period of the plurality of intra-time periods.

A first normalization value indicative of a positional relationship between the first intra-time period and the time period and a second normalization value indicative of a positional relationship between the second intra-time period and the time period can be generated in step 3425. A response including the determined open price, the determined highest price, the determined lowest price, the determined close price, the generated first normalization value, and the generated second normalization value can then be sent in step 3430 to the requestor.

The plurality of intra-time periods in the time period is determined from an intra-time period resolution value 2850 and the generated first normalization value can be used to render a highest HLC or OHLC type symbol position and the generated second normalization value is used to render a lowest HLC or OHLC type symbol position. The data structures presented above were already shown (see FIG. 8-B) where the high time percentage 830 is similar to the highest position value or upper wick position or the first generated normalization value and the low time percentage 835 is similar to the lowest position value or lower wick position or the second generated normalization value.

Most markets are not open 24/7. When a live open market closes overnight or closes for the weekend or for a holiday, a price gap will most probably occur upon next market open. A time gap also occurs but charting engines do not display and remove time gaps from price charts and show only the price gaps. The removal of time gaps enable more open live market time periods to be displayed on a screen particularly of limited size. However, some who use chart analysis on price charts believe that the time gaps must be taken into account for more accurate technical analysis. But even if a charting engine (or standalone program) displayed such time gaps, it would be in the form of blank space to mark time in between live open market trading sessions.

FIG. 35-A is an illustration of a OHLC type price chart including time gaps during a closed market in accordance with the present invention. OHLC type symbols, in this case candlesticks are illustrated in the price chart and represent a time period of a single trading day and are sometimes referred to as a daily candle. Some markets are open 24/7 as is the case for cryptocurrencies, others are open 24/5 as is the case in forex or foreign exchange. Most stock exchanges have live open markets during the day and are closed overnight, the weekends, and holidays, yet all charting engines of brokerages and exchanges suppress closed market time gaps by default. Such that the close price on a Friday is immediately followed by the open price on a Monday usually displaying a price gap but not the time gap.

When the display closed market time gaps 2839 or the time gap fill method 2848 in configuration settings 335, is selected closed market time gaps are shown 3510. On either side of the time gaps is a first week of five daily candles shown in 3515, where each candle represents one trading day of the first trading week, and a second week of five daily candles shown in 3520, where each candle represents one trading day of the second trading week. If the gap fill method is not selected, the entire time gap region shown in 3510 would be removed showing time continuity between the first week and the second week with all gaps suppressed. Context sensitive content can be generated to populate the time gap with content relating to the company shown in the price chart. For instance, weekend news pertaining to company ABC could be placed in the time gap of the price chart of ABC company. Advertising could be carried out similarly whether displaying discounts on products the company sells or competitor ads relating to ABC company can be displayed as well. Ghost symbols of ABC company can also be displayed in the closed market time gap region based on estimated pricing on ABC company. Pricing can be estimated by retrieving a degree of correlation value between ABC company and say a cryptocurrency such as Bitcoin, which trades 24/7. For instance, statistical methods can be applied by building a model to predict probabilistic pricing based on past correlation history.

FIG. 35-B is a flowchart illustrating the steps performed displaying content within closed market time gaps in accordance with the present invention. When a request to display a price chart is received, it is determined in step 3540 whether a configuration option to include a display of one or more closed market time gaps 2839 is selected. In response to determining that the configuration option to include the display of the one or more closed market time gaps 2839 is not selected, a first price range that occurred during a first live open market is displayed in step 3545 as well as displaying a second price range that occurred during a second live open market adjacent to the first price range, where the second live open market occurred after the first live open market. In response to determining that the configuration option to include the display of the one or more closed market time gaps 2839 is selected, then the first price range that occurred during the first live open market is displayed in step 3550 as well as displaying the closed market time gap including content in accordance with a selected time gap fill method adjacent to the first price range, and displaying the second price range adjacent to the content of the closed market time gap.

The present invention includes that the time gap fill method is selected from one of a one or more ghost symbols and at least one of a news and an advertisement, the at least one of a news and advertisement context sensitive to one of an at least one event occurring during the closed market time gap and a traded asset corresponding to the first price range and the second price range.

Although the invention has been shown and described with respect to a certain preferred aspect or aspects, it is obvious that equivalent alterations and modifications will occur to others skilled in the art upon the reading and understanding of this specification and the annexed drawings. In particular regard to the various functions performed by the above described items referred to by numerals (components, assemblies, devices, compositions, etc.), the terms (including a reference to a "means") used to describe such items are intended to correspond, unless otherwise indicated, to any item which performs the specified function of the described item (e.g., that is functionally equivalent), even though not structurally equivalent to the disclosed structure which performs the function in the herein illustrated exemplary aspect or aspects of the invention. In addition, while a particular feature of the invention may have been described above with respect to only one of several illustrated aspects, such feature may be combined with one or more other features of the other aspects, as may be desired and advantageous for any given or particular application.

The description herein with reference to the figures will be understood to describe the present invention in sufficient detail to enable one skilled in the art to utilize the present invention in a variety of applications and devices. It will be readily apparent that various changes and modifications could be made therein without departing from the spirit and scope of the invention as defined in the following claims.

I claim:
1. A method for displaying a price chart, the price chart including a plurality of regions, the method comprising:
   displaying, by a charting engine, a first region including one or more historical completed price-range-over-time-range-type symbols;
   displaying, by the charting engine, a second region adjacent to the first region, the second region including a current uncompleted price range-over-an-uncompleted-time-range-type symbol corresponding to an uncompleted time range; and
   in response to determining that the uncompleted time range has completed, generating and displaying, in the first region, by the charting engine, a new historical completed price-range-over-time-range-type symbol adjacent to the one or more historical completed-price-range-over-time-range-type symbols, and erasing, in the second region, the current uncompleted price-range-over-an-uncompleted-time-range-type symbol.
2. The method of claim 1, wherein the first region is scrollable and the second region is non-scrollable.
3. The method of claim 1, wherein the one or more historical completed price-range-over-time-range-type symbols and the current uncompleted price-range-over-an-uncompleted-time-range-type symbol are selected from at least one symbol rendering method.

4. The method of claim 3, wherein the selected symbol rendering method is selected from one of a candlestick, cross sticks, quadrilateral, triangle, HLC bars, dots, and contiguous.

5. The method of claim 1, wherein the one or more historical completed price-range-over-time-range-type symbols and the current uncompleted price-range-over-an-uncompleted-time-range-type symbol are representative of changes in price during a time period, the changes in price are of a market-traded object representative of one of a physical asset, a digital asset, an asset pair, and a ratio between two different assets.

6. The method of claim 5, wherein the time period is a first time period, the first time period is an intra-time period within a second time period, and the second time period is longer in duration than the first time period.

7. The method of claim 5, wherein the time period is one of a group of ticks and between a fraction of a second and decades.

8. An apparatus for displaying a price chart, the price chart including a plurality of regions, the apparatus comprising:
processing circuitry configure to
display, by a charting engine, a first region including one or more historical completed price-range-over-time-range-type symbols;
display, by the charting engine, a second region adjacent to the first region, the second region including a current uncompleted price range-over-an-uncompleted-time-range-type symbol corresponding to an uncompleted time range; and
in response to the determination that the uncompleted time range has completed, generate and display, in the first region, by the charting engine, a new historical completed price-range-over-time-range-type symbol adjacent to the one or more historical completed-price-range-over-time-range-type symbols, and erase, in the second region, the current uncompleted price-range-over-an-uncompleted-time-range-type symbol.

9. The apparatus of claim 8, wherein the first region is scrollable and the second region is non-scrollable.

10. The apparatus of claim 8, wherein the one or more historical completed price-range-over-time-range-type symbols and the current uncompleted price-range-over-an-uncompleted-time-range-type symbol are selected from at least one symbol rendering method.

11. The apparatus of claim 10, wherein the selected symbol rendering method is selected from one of a candlestick, cross sticks, quadrilateral, triangle, HLC bars, dots, and contiguous.

12. The apparatus of claim 8, wherein the one or more historical completed price-range-over-time-range-type symbols and the current uncompleted price-range-over-an-uncompleted-time-range-type symbol are representative of changes in price during a time period, the changes in price are of a market-traded object representative of one of a physical asset, a digital asset, an asset pair, and a ratio between two different assets.

13. The apparatus of claim 12, wherein the time period is a first time period, the first time period is an intra-time period within a second time period, and the second time period is longer in duration than the first time period.

14. The apparatus of claim 12, wherein the time period is one of a group of ticks and between a fraction of a second and decades.

15. A non-transitory computer readable storage medium having instructions stored thereon that, upon execution by processing circuitry, cause the processing circuitry to perform a method for displaying a price chart, the price chart including a plurality of regions, the method comprising:
displaying, by a charting engine, a first region including one or more historical completed price-range-over-time-range-type symbols;
displaying, by the charting engine, a second region adjacent to the first region, the second region including a current uncompleted price range-over-an-uncompleted-time-range-type symbol corresponding to an uncompleted time range; and
in response to determining that the uncompleted time range has completed, generating and displaying, in the first region, by the charting engine, a new historical completed price-range-over-time-range-type symbol adjacent to the one or more historical completed-price-range-over-time-range-type symbols, and erasing, in the second region, the current uncompleted price-range-over-an-uncompleted-time-range-type symbol.

16. The non-transitory computer readable storage medium of claim 15, wherein the first region is scrollable and the second region is non-scrollable.

17. The non-transitory computer readable storage medium of claim 15, wherein the one or more historical completed price-range-over-time-range-type symbols and the current uncompleted price-range-over-an-uncompleted-time-range-type symbol are selected from at least one symbol rendering method.

18. The non-transitory computer readable storage medium of claim 17, wherein the selected symbol rendering method is selected from one of a candlestick, cross sticks, quadrilateral, triangle, HLC bars, dots, and contiguous.

19. The non-transitory computer readable storage medium of claim 15, wherein the one or more historical completed price-range-over-time-range-type symbols and the current uncompleted price-range-over-an-uncompleted-time-range-type symbol are representative of changes in price during a time period, the changes in price are of a market-traded object representative of one of a physical asset, a digital asset, an asset pair, and a ratio between two different assets.

20. The non-transitory computer readable storage medium of claim 19, wherein the time period is a first time period, the first time period is an intra-time period within a second time period, and the second time period is longer in duration than the first time period.

21. The non-transitory computer readable storage medium of claim 19, wherein the time period is one of a group of ticks and between a fraction of a second and decades.

* * * * *